US012585160B2

(12) United States Patent
Lee et al.

(10) Patent No.: US 12,585,160 B2
(45) Date of Patent: Mar. 24, 2026

(54) LIQUID-CRYSTALLINE MEDIUM

(71) Applicant: Merck Patent GmbH, Darmstadt (DE)

(72) Inventors: Hoo-Yong Lee, Pyeongtaek (KR); Hyun-Jin Yoon, Pyeongtaek (KR)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 17/376,702

(22) Filed: Jul. 15, 2021

(65) Prior Publication Data

US 2022/0025265 A1 Jan. 27, 2022

(30) Foreign Application Priority Data

Jul. 16, 2020 (EP) .................................... 20186240

(51) Int. Cl.

| | |
|---|---|
| ***G02F 1/137*** | (2006.01) |
| ***B32B 17/10*** | (2006.01) |
| ***C09K 19/20*** | (2006.01) |
| ***C09K 19/30*** | (2006.01) |
| ***G02F 1/1333*** | (2006.01) |
| ***G02F 1/1337*** | (2006.01) |
| ***G02F 1/139*** | (2006.01) |

(52) U.S. Cl.

CPC .... *G02F 1/13712* (2021.01); *B32B 17/10504* (2013.01); *C09K 19/2007* (2013.01); *C09K 19/3003* (2013.01); *G02F 1/133331* (2021.01); *G02F 1/133742* (2021.01); *G02F 1/133769* (2021.01); *G02F 1/1397* (2013.01); *C09K 2019/301* (2013.01)

(58) Field of Classification Search

CPC ........... G02F 1/13712; G02F 1/133742; G02F 1/133331

See application file for complete search history.

(56) References Cited

U.S. PATENT DOCUMENTS

| | | | | |
|---|---|---|---|---|
| 9,238,775 | B2 | 1/2016 | Junge | |
| 10,626,666 | B2 | 4/2020 | Junge et al. | |
| 10,655,067 | B2 | 5/2020 | Junge et al. | |
| 10,723,950 | B2 | 7/2020 | Junge et al. | |
| 11,762,241 | B2 * | 9/2023 | Junge | G02F 1/133746 349/16 |
| 11,841,591 | B2 | 12/2023 | Junge | |
| 2010/0045924 | A1 * | 2/2010 | Powers | G02B 5/23 349/190 |
| 2011/0007255 | A1 * | 1/2011 | Yaroshchuk | C23C 16/36 349/123 |
| 2016/0319592 | A1 * | 11/2016 | Junge | C09K 19/3003 |
| 2017/0361575 | A1 * | 12/2017 | Kusudou | E06B 3/6707 |
| 2019/0016955 | A1 * | 1/2019 | Junge | C09K 19/3068 |
| 2019/0031959 | A1 * | 1/2019 | Junge | C09K 19/0208 |
| 2019/0162991 | A1 * | 5/2019 | Hagiwara | G02F 1/1335 |
| 2019/0227357 | A1 * | 7/2019 | Williams | G02F 1/1347 |
| 2020/0055281 | A1 * | 2/2020 | Yoon | C03C 17/36 |
| 2021/0165284 | A1 * | 6/2021 | Lim | G02F 1/133636 |
| 2021/0181585 | A1 * | 6/2021 | Junge | E06B 9/24 |
| 2022/0105710 | A1 * | 4/2022 | Ishii | B32B 17/10504 |

FOREIGN PATENT DOCUMENTS

| | | | |
|---|---|---|---|
| CN | 103180409 | A | 6/2013 |
| WO | 2012052100 | A1 | 4/2012 |
| WO | 2015/090506 | A1 | 6/2015 |
| WO | 2017/118464 | A1 | 7/2017 |
| WO | 2017/118465 | A1 | 7/2017 |
| WO | 17118464 | A1 | 7/2017 |
| WO | 2020120533 | A1 | 6/2020 |

OTHER PUBLICATIONS

Search report in corresponding EP 21185184 dated Dec. 22, 2021 (pp. 1-6).

R. Baetens et al., "Properties, Requirements and Possibilities of Smart Windows for Dynamic Daylight and Solar Energy Control in Buildings: A State-of-the-Art Review", Solar Energy Materials & Solar Cells, vol. 94 (2010) pp. 87-105.

China National Intellectual Property Administration Office Action dated Apr. 14, 2025 issued in corresponding application 202110798210 and English translation.

Japan Patent Office Office Action dated Apr. 22, 2025 issued in corresponding application 2021-117126 and English translation.

* cited by examiner

*Primary Examiner* — Jia X Pan

(74) *Attorney, Agent, or Firm* — Millen, White, Zelano & Branigan, P.C.; Brion P. Heaney

(57) ABSTRACT

A liquid-crystalline media having a negative dielectric anisotropy and a high clearing point as specified herein, is suitable for use of in switchable optical cells in window elements, in particular laminated window elements.

14 Claims, No Drawings

LIQUID-CRYSTALLINE MEDIUM

The invention relates to liquid-crystalline media having a negative dielectric anisotropy and a high clearing point as specified herein, and to the use of said media in switchable optical cells in window elements, in particular laminated window elements.

Devices for controlling or modulating the transmission of light are commonly used in display applications, but they may also be used e.g. in so-called smart windows applications. R. Baetens et al. in "Properties, requirements and possibilities of smart windows for dynamic daylight and solar energy control in buildings: A state-of-the-art review", Solar Energy Materials & Solar Cells, 94 (2010) on pages 87-105 review different dynamic smart windows. As described therein, smart windows can make use of several technologies for modulating the transmittance of light such as devices based on electrochromism, liquid crystal devices and electrophoretic or suspended-particle devices.

Light shutters and optical intensity modulators, in particular liquid crystal-based light modulators, may be used in switchable windows for architectural, automotive, railway, avionic and nautical applications.

In such devices the transmission of light may be reversibly changed wherein the intensity of incident light can be attenuated, dimmed or tinted. These devices may thus be operated in and switched between a bright state and a dark state, i.e. between a state of relatively higher light transmission and a state of relatively lower light transmission.

While switching in liquid crystal-based devices between the different optical states may also be thermally controlled, it is in many cases advantageous and suitably preferred that the devices adopt the different optical states using electrical switching, where the application of voltage controls the switching. Such liquid crystal-based devices in principle employ a change in the orientation of liquid crystal (LC) molecules between two conductive electrodes by applying an electric field which results in a change of the transmittance.

In principle, several modes or configurations may be employed to provide such reversible transmission change. For twisted nematic (TN), super-twisted nematic (STN) and vertical alignment (VA) liquid crystal cells polarizers are commonly used to control the light transmission. It is also possible to use guest-host liquid crystal cells which are based on a liquid crystal host which is doped with dichroic dye molecules. These guest-host systems can be used without any polarizers to alter the light transmission. However, in some embodiments and applications guest-host liquid crystal cells are also used in combination with at least one polarizer.

WO 2015/090506 A1 and WO 2017/118464 A1 describe the use of dichroic dye-doped liquid crystalline media having a negative dielectric anisotropy in devices for regulating the passage of light.

WO 2017/118465 A1 describes devices for regulating the entry of light into a room comprising a switchable layer which contains a dichroic dye-doped liquid crystalline medium and which in one of the switching states has a twisted configuration.

There is still a need in the art for versatile and adaptable devices for regulating the passage of light and in particular switchable windows and for liquid-crystalline media useful in the production and operation of such devices.

An object of the present invention is therefore to provide a liquid-crystalline medium which has an advantageous performance during the production as well as the operation of the switchable devices, e.g. in terms of stability and reliability, and which can give further benefits in terms of the electro-optical characteristics of the switchable devices.

It is a further object of the present invention to provide switchable devices, in particular switchable window elements and especially laminated window elements, that are versatile and adaptable in that they can be installed in different settings and used also under demanding working conditions while providing the desired electro-optical performance. It is another object to provide an efficient and facile process for preparing such devices. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above object and eventually provide additional advantages.

A first aspect of the present invention provides a window element which comprises a switchable optical cell having a layer structure comprising in this order

- a first transparent substrate,
- a switchable layer, and
- a second transparent substrate, wherein the switchable layer comprises a liquid-crystalline medium having a negative dielectric anisotropy, a clearing point of 115° C. or more, and an optical anisotropy $\Delta n$ of 0.10 or less.

The switchable optical cell is used for the modulation of light and it is preferably and advantageously configured as a cell formed of two walls, in particular two transparent substrates, which are spaced apart and which are provided with electrodes, and wherein the cell contains a light modulation material.

In an alternative embodiment, instead of equipping both substrates with electrodes, one of the substrates may be equipped with two electrode structures and the other substrate is not equipped with an electrode.

In the present invention it was recognized that it can be desirable to provide a switchable device and in particular a switchable window element which can be used in different settings and under different environmental conditions while giving a safe and reliable performance.

By providing in the switchable layer the liquid-crystalline medium as specified, a favorable optical and electro-optical performance can be obtained, in particular in terms of the bright state and the dark state, the achievable contrast between these states and the viewing angle dependence, even at elevated temperatures. Such stable functional behavior also at higher temperatures can be beneficial for example in cases where the window element is exposed to direct and prolonged irradiation by sunlight.

According to the present invention it is preferred that the switchable optical cell is laminated to a third substrate.

It was presently recognized that it can be beneficial to incorporate the switchable optical cell as specified herein in a laminate structure. In particular, such a composite structure may favorably enhance the versatility and applicability of the switchable device, e.g. by combining thin substrates with thicker substrates and/or substrates made of plastic with glass substrates. In this way for example benefits in terms of weight, strength and accessible shapes and geometries can be achieved.

It has surprisingly been found that the materials and in particular the liquid-crystalline media as presently provided can be advantageously amenable to typical lamination conditions, such as high temperature and high pressure.

Therefore, in a further aspect of the present invention there is provided a process for the preparation of a window element comprising the steps of providing a switchable optical cell containing the liquid-crystalline medium as specified herein disposed in a switchable layer between a first transparent substrate and a second transparent substrate, and of laminating the switchable optical cell to a third substrate.

Another aspect relates to a window element obtained by or respectively obtainable from carrying out the process according to the invention.

A further aspect of the present invention provides a liquid-crystalline medium which has a negative dielectric anisotropy, a clearing point of 115° C. or more, and an optical anisotropy Δn of 0.10 or less and which comprises one or more compounds of formula IIA

IIA

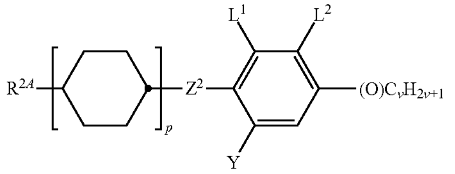

wherein $R^{2A}$ denotes H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

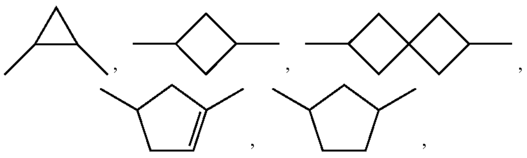

—C≡C—, —$CF_2$O—, —O$CF_2$—, —OC—O— or —O—CO— in such a way that O atoms are not linked directly to one another, $L^1$ and $L^2$ each, independently of one another, denote F, Cl, $CF_3$ or $CHF_2$, preferably F, Y denotes H, F, Cl, $CF_3$, $CHF_2$ or $CH_3$, preferably H or $CH_3$, particularly preferably H, $Z^2$ denotes a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF— or —CH═CH$CH_2$O—, preferably a single bond, p denotes 0, 1 or 2, (O)$C_vH_{2v+1}$ denotes O$C_vH_{2v+1}$ or $C_vH_{2v+1}$, and v denotes 1 to 7.

The presently provided liquid-crystalline medium containing the compounds as specified herein favorably combines a negative dielectric anisotropy with a suitably high clearing point as defined together with a specifically set and limited optical anisotropy Δn.

It has surprisingly been found that the presently provided liquid-crystalline medium can favorably contribute to obtaining an advantageous electro-optical performance, e.g. in terms of the achievable contrast and the viewing angle dependence, while exhibiting functionality, reliability and stability also at high temperatures and at low temperatures. In addition to these benefits in the long-term operation of the device, the medium can advantageously further facilitate the production process of the device, and in particular it has suitable performance for the lamination process.

The favorable chemical and physical properties of the liquid-crystalline medium as provided according to the invention can thus lead to significant benefits in the device performance and characteristics as well as in the production process of the device.

Preferably, the liquid-crystalline medium as described herein is arranged and used in a switching layer. The switching layer thus comprises, preferably consists of, the medium. The switching layer is arranged between two substrates such as to give a switching element which is electrically switchable and operable in an optically bright state and a dark state. Preferably, electrodes are arranged as conductive layers on or respectively above the inner surface of each substrate.

Another aspect of the present invention relates to the use of the window element according to the invention in a window of a building or a vehicle, e.g. a sunroof or a side window, or also in an automotive mirror.

According to the invention advantageous switching elements are provided which can be used in switchable windows for automotive applications, e.g. cars and commercial vehicles, and other transport applications, such as in trains, airplanes, ships and boats, and for architectural applications, for example in a window of an external facade, but also in the inside of rooms, for example in dividing walls between rooms and in elements for separating individual compartments of rooms or spaces.

The devices can be conveniently switched between the states by applying an electrical voltage. Furthermore, the switching can be fast, in particular in the order of a few seconds and even down to a second or even less.

The switching element and in particular the window element according to the invention is useful for regulating or modulating the passage of light, in particular the passage of sunlight but also of light from artificial light sources like lamps and light fixtures.

Without limiting the present invention thereby, in the following the invention is illustrated by the detailed description of the aspects, embodiments and particular features, and particular embodiments are described in more detail.

Herein, halogen denotes F, Cl, Br or I, preferably F or Cl, and more preferably F.

Herein, an alkyl radical and/or an alkoxy radical is taken to mean straight-chain or branched alkyl. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetra-decyl, pentadecyl, methoxy, octyloxy, nonyloxy, decyloxy, undecyloxy, dodecyloxy, tridecyloxy or tetradecyloxy.

Herein, oxaalkyl preferably denotes straight-chain 2-oxapropyl (=methoxy-methyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Herein, alkenyl, i.e. an alkyl radical in which one $CH_2$ group has been replaced by —CH═CH—, may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

Herein, an alkyl or alkenyl radical which is at least monosubstituted by halogen, is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the w-position.

Herein, a mono- or polyfluorinated alkyl or alkoxy radical having 1, 2 or 3 C atoms or a mono- or polyfluorinated alkenyl radical having 2 or 3 C atoms is particularly preferably F, Cl, $CF_3$, $CHF_2$, $OCF_3$, $OCHF_2$, $OCFHCF_3$, $OCFHCHF_2$, $OCFHCH_2F$, $OCF_2CH_3$, $OCF_2CHF_2$, $OCF_2CH_2F$, $OCF_2CF_2CHF_2$, $OCF_2CF_2CH_2F$, $OCFHCF_2CF_3$, $OCFHCF_2CHF_2$, $OCF_2CF_2CF_3$, $OCF_2CF_2CClF_2$, $OCClFCF_2CF_3$, $OCF{=}CF_2$, $OCH{=}CF_2$ or $CH{=}CF_2$, very particularly preferably F or $OCF_3$, furthermore $CF_3$, $OCF{=}CF_2$, $OCHF_2$ or $OCH{=}CF_2$.

Herein, 1,4-cyclohexylene rings and 1,4-phenylene rings are depicted as follows:

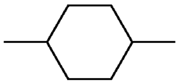 ,
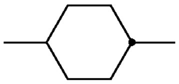 ,
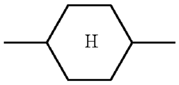 or
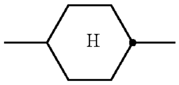 ;
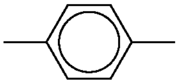 or
 .

The cyclohexylene rings are trans-1,4-cyclohexylene rings.

Liquid-crystal media, and in particular so-called liquid-crystal hosts, with negative dielectric anisotropy are widely used in displays for example of the vertical alignment (VA) mode (Song, J. (2014). Vertical alignment Liquid Crystal mode. In Handbook of Liquid Crystals (eds J. W. Good by, C. Tschierske, P. Raynes, H. Gleeson, T. Kato and P. J. Collings). doi:10.1002/9783527671403.hlc126). Suitable media are well described in the literature such as for example in US 20030071244 A1 or US 20100134751 A1.

According to the invention a process is provided in which the switchable optical cell as described herein is laminated to a third substrate. In a further embodiment it is also possible to laminate the switchable optical cell to a third substrate and a fourth substrate.

In this lamination process a composite is assembled which comprises multiple layers. It is possible to combine identical materials, such as glass, but also to use different materials, for example a plastic film and a glass sheet. The laminated product exhibits favorable characteristics, for example in terms of improved strength, stability or appearance.

In particular, the switchable optical cell is typically laminated to a substrate, preferably a carrier glass sheet, for protection of the switchable optical device and for mechanical rigidity. In this lamination process, a substrate, preferably a glass sheet, is bonded to a substrate of the switchable optical cell by means of a thermoplastic interlayer. In the lamination process, the interlayer is arranged between the first or second substrate of the switchable optical cell and the third substrate, preferably the carrier glass sheet. In a subsequent treatment, which usually involves application of heat and/or elevated pressure, the third substrate, the interlayer and the switchable optical cell are bonded.

In an embodiment of the present process heating to a temperature of 110° C. or more is carried out during the laminating.

Typical process conditions can involve pressure of up to 12 bar and even temperatures around 120° C. to 140° C. may be used. The time span in which the elevated temperature and pressure are applied can differ, but may usually be about 20 minutes.

Preferably, the lamination involves the use of a thermoplastic or elastomeric interlayer. Suitable lamination interlayers or lamination sheets include, for example, an ionoplast, ethylene vinyl acetate (EVA), polyvinyl butyral (PVB) or thermoplastic polyurethane (TPU). A suitable ionoplast is available under the trade name SentryGlas. In a preferred embodiment lamination sheets, in particular a PVB layer, additionally provide UV protection.

Lamination can provide product benefits for example in terms of weight, strength and accessible shapes and geometries, e.g. by combining thin substrates with thicker substrates and/or substrates made of plastic with glass substrates.

In a preferred embodiment a window element is produced and provided in which the switchable optical cell is laminated to a third substrate, and wherein in particular the first transparent substrate and the second transparent substrate are made of plastic and the third substrate is made of glass. It is particularly preferred that the third substrate is curved, and it is especially preferable that the entire window element is curved at least in one direction, more preferably in two directions.

According to the invention in the process and in the window element a liquid-crystalline medium is provided and used which exhibits a negative dielectric anisotropy, a clearing point of 115° C. or more, and an optical anisotropy Δn of 0.10 or less.

The liquid-crystalline medium according to the invention has a negative dielectric anisotropy Δε, i.e. perpendicular to the electric field.

Above and below, Δε denotes the dielectric anisotropy, wherein $\Delta\varepsilon=\varepsilon\|-\varepsilon_\perp$. The dielectric anisotropy Δε is preferably determined at 20° C. and 1 kHz. The liquid-crystalline medium preferably has a dielectric anisotropy Δε in the range of from −0.5 to −20, preferably from −1.0 to −10.

It is particularly preferred that the liquid-crystalline medium exhibits a dielectric anisotropy Δε in the range of from −1.0 to −5.0, even more preferably from −1.5 to −4.5. The liquid-crystalline medium thus provided can be especially useful as an effective, stable and reliable modulation medium.

The liquid-crystalline medium according to the invention has an optical anisotropy Δn of 0.10 or less.

Above and below, Δn denotes the optical anisotropy, wherein $\Delta n=n_e-n_o$, and wherein preferably the optical anisotropy Δn is determined at 20° C. and at a wavelength of 589.3 nm. The liquid crystalline medium preferably has an optical anisotropy Δn of 0.095 or less, more preferably of 0.090 or less, even more preferably in the range of from 0.065 to 0.095 and in particular from 0.070 to 0.090.

It was found that even with a comparatively small optical anisotropy an effective modulation medium can be obtained, which may provide further benefits, e.g. in terms of the viewing angle dependence.

The liquid-crystalline medium according to the invention has a clearing point of 115° C. or more.

The clearing point marks the temperature at which a phase transition from a nematically liquid crystalline state to an isotropic state occurs. The clearing point, in particular the phase transition temperature between the nematic phase and the isotropic phase, can be measured and determined by commonly known methods, e.g. using a Mettler oven or a hot-stage under a polarizing microscope, and herein preferably is determined using a Mettler oven.

The liquid-crystalline medium preferably has a clearing point, preferably a phase transition from a nematic liquid crystalline state to an isotropic state, above 116.5° C., more preferably above 118.0° C., particularly preferably above 120.0° C., very particularly preferably above 121.5° C., and most preferably above 123.0° C. In an embodiment the liquid-crystalline medium as used in the present invention preferably has a clearing point in the temperature range from 115° C. to 170° C. and in particular from 120° C. to 140° C.

The high clearing point of the medium as presently provided can contribute to an advantageous performance during the production as well as the operation of the switchable devices, e.g. in terms of stability, reliability and the electro-optical properties.

The liquid-crystalline medium as presently provided and used preferably also has a good low-temperature stability, for example at a temperature of −40° C. This means that the window element can be reliably used also under more extreme cold environmental conditions, which may be useful for example in automotive applications.

In the window element according to the invention, the switchable layer comprising the liquid-crystalline medium preferably has a thickness in the range from 1 μm to 100 μm, more preferably from 2 μm to 50 μm, even more preferably from 3 μm to 25 μm and in particular from 4 μm to 10 μm.

The substrates of the window element may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose).

The first and/or second and/or third substrate is preferably optically isotropic and transparent.

In one embodiment only glass substrates are used. In an alternative embodiment only plastic substrates are used. In an alternative and preferred embodiment the first transparent substrate and the second transparent substrate are made of plastic and the third substrate is made of glass.

Preferably, the thickness of the third substrate is in the range of from 0.7 mm to 25 mm, more preferably from 2 mm to 10 mm, wherein a range of from 2 mm to 6 mm is even more preferred.

Examples for a suitable glass include, for example, alkaline earth boro-aluminosilicate glass, chemically toughened glass, aluminosilicate glass, borosilicate glass and soda lime glass.

In an embodiment, the switchable optical device may also comprise one or more polarizers. In particular, in an embodiment at least one polarization layer and optionally at least one retardation layer is provided in the optical device. The polarizers in this case are preferably linear polarizers. Both absorptive and also reflective polarizers can optionally be employed. Preference is given to the use of polarizers which are in the form of thin optical films. Therefore, preferably a window element is provided in which the switchable optical cell further comprises one or more polarizer layers and optionally one or more optical retarder layers. Particularly preferably liquid crystal cells with two polarizers are used to control the light transmission.

Electrical switching between the optical states can be achieved by providing the substrates, e.g. glass substrates or plastic substrates, with electrodes. Preferably, electrically conductive layers are provided on the substrates, wherein the conductive layers comprise or are formed of a transparent conductive material, e.g. a transparent conductive oxide, preferably indium tin oxide (ITO), $SnO_2$:F or doped zinc oxide, in particular ITO, or a conductive polymer such as poly(3,4-ethylenedioxythiophene) (PEDOT), poly(3,4-ethylenedioxythiophene) polystyrene sulfonate (PEDOT:PSS) or poly(4,4-dioctyl cyclopentadithiophene), or a thin transparent metal and/or metal oxide layer, for example silver. It is preferred that the transparent conductive material is a transparent conductive oxide, more preferably indium tin oxide. The transparent electrode is preferably applied to the substrate by a coating process. For example, ITO may be sputtered to typically obtain a layer thickness in the range of from 5 nm to 250 nm or a sheet resistance in the range of from 5Ω/□ to 500Ω/□. A power supply apparatus which may include a driving signal generator and cables may be used to supply the voltage to the electrodes.

Preferably, the switchable optical device as produced and used in the present invention is based on a liquid crystal cell using homeotropic alignment, which is also known as vertical alignment (VA), in particular in combination with electrical switching. Therefore, preferably a first alignment layer and a second alignment layer are provided in the switchable optical cell such that the switchable layer is sandwiched between and in direct contact with the first alignment layer and the second alignment layer. Preferably the first alignment layer and the second alignment layer are polyimide-based layers. Therefore, in a preferred embodiment the alignment layers comprise polyimide, more preferably consist of polyimide.

In a preferred embodiment the window element comprising the switchable optical cell has a layer structure comprising in this order a first substrate,
a first electrode layer,
a first alignment layer,
a switchable layer,
a second alignment layer,
a second electrode layer, and
a second substrate, wherein the switchable layer is a homeotropically aligned liquid crystal layer comprising the liquid-crystalline medium as set forth herein, and wherein preferably the switchable optical cell is laminated to a third substrate.

In an embodiment the switchable optical device is configured as a vertically aligned (VA) cell.

In a further embodiment the switchable optical cell in the window element is electrically switchable, wherein in the presence of an electric field the switchable layer has a twisted configuration or a supertwisted configuration. Furthermore, in this embodiment the cell preferably has a homeotropically aligned liquid crystal layer in the unpowered state. This configuration can provide benefits in terms of the achievable contrast and give a suitably high transmittance in the bright state. For the twisted or supertwisted configuration the cell and cell alignment can be set accordingly, wherein preferably the liquid-crystalline medium comprises a chiral dopant.

It is preferred that the window element contains precisely one switchable optical cell. In a further embodiment it is however also possible that the window element includes two switchable optical cells, wherein more preferably both switchable optical cells are configured as described herein.

It is preferred that the liquid-crystalline medium as presently provided and used does not contain any dichroic dyes.

In an alternative embodiment it is however possible that the liquid-crystalline medium comprises one or more dichroic dyes, preferably two or more dichroic dyes, and more preferably three or more dichroic dyes.

Dichroic dyes are known to the skilled person and are well described in the literature, e.g. in Liquid Crystals: Applications and Uses, Volumes 1-3, edited by Birenda Bahadur, World Scientific, 1992. Chapter 11: Dichroic Liquid Crystal Displays and in Cowling, Stephen J., Liquid Crystal Dyes, in: Handbook of Liquid Crystals, Wiley-VCH Verlag GmbH & Co. KGaA (2014).

Preferred dyes are azo dyes, perylene dyes, anthraquinone dyes, benzothiazole dyes, thiadiazoloquinoxaline dyes and benzothiadiazole dyes, particularly preferred are azo dyes.

Typically, the total concentration of the optionally contained dichroic dyes in the liquid-crystalline medium is in the range of from 0% by weight to 10% by weight, more preferably from 0.1% by weight to 5% by weight, even more preferably from 0.3% by weight to 3% by weight, most preferably from 0.5% by weight to 2% by weight.

In an embodiment the absorption spectra of the dichroic dyes optionally contained in the medium or respectively the switchable layer preferably complement one another in such a way that the impression of a black color arises for the eye. Preferably two or more, more preferably three or more dichroic dyes are used in the liquid-crystalline medium to preferably cover a large part of the visible spectrum. The precise way in which a mixture of dyes which appears black or grey to the eye can be prepared is known in the art and is described, for example, in M. Richter, Einführung in die Farbmetrik [Introduction to Colorimetry], 2nd Edition, 1981, ISBN 3 11-008209-8, Walter de Gruyter & Co.

In another embodiment the setting of a different color is performed, e.g. red, green or blue.

The setting of the color location of a mixture of dyes is described in the area of colorimetry. To this end, the spectra of the individual dyes are calculated taking into account the Lambert-Beer law to give an overall spectrum and converted into the corresponding color locations and luminance values under the associated illumination, for example illuminant D65 for daylight, in accordance with the rules of colorimetry. The position of the white point is fixed by the respective illuminant, for example D65, and is quoted in tables, for example in the reference above. Different color locations can be set by changing the proportions of the various dyes.

The liquid-crystalline medium as provided and used according to the present invention preferably comprises one or more compounds selected from the compounds of formulae IIA-1 to IIA-53

IIA-1

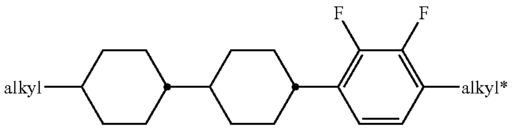

-continued

IIA-2

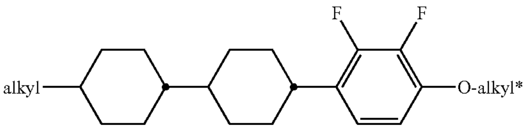

IIA-3

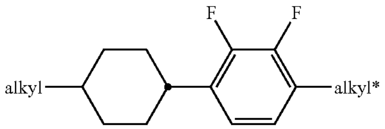

IIA-4

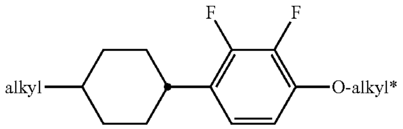

IIA-5

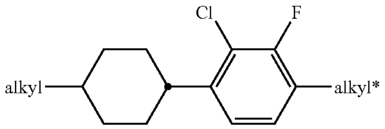

IIA-6

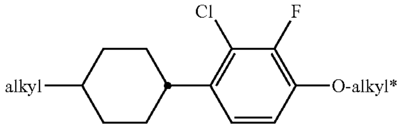

IIA-7

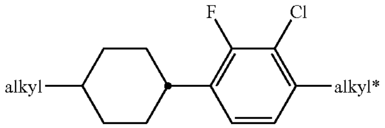

IIA-8

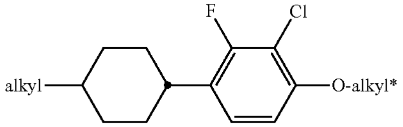

IIA-9

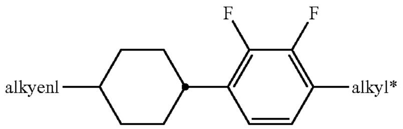

IIA-10

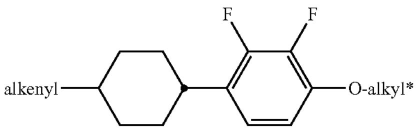

IIA-11

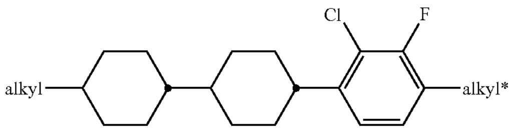

IIA-12

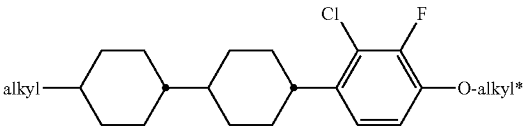

-continued
IIA-13
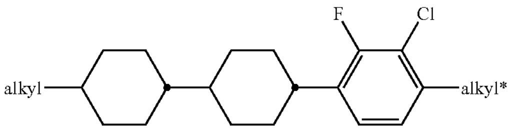
IIA-14
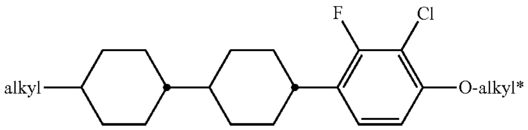
IIA-15
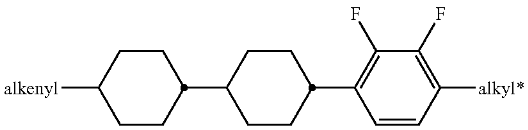
IIA-16
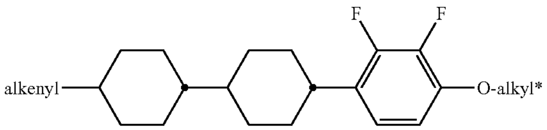
IIA-17
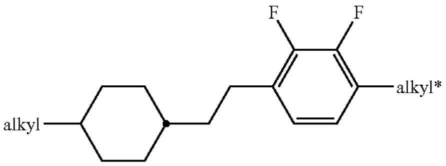
IIA-18
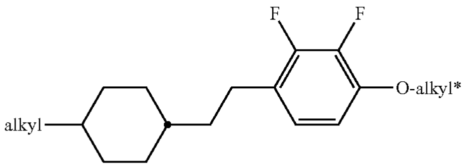
IIA-19
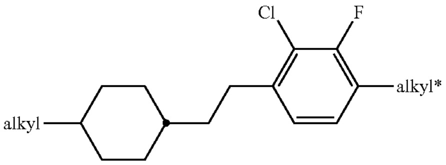
IIA-20
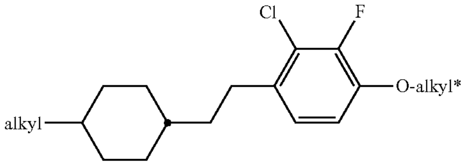
IIA-21
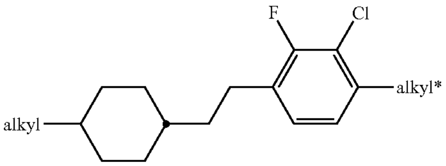
-continued
IIA-22
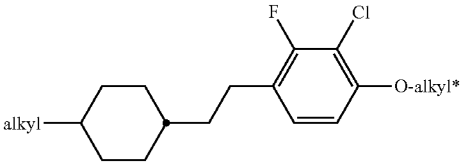
IIA-23
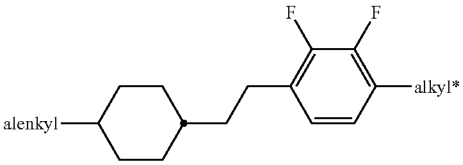
IIA-24
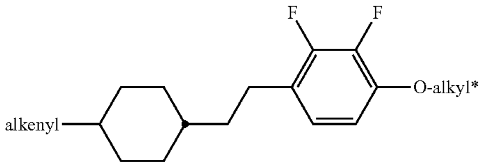
IIA-25
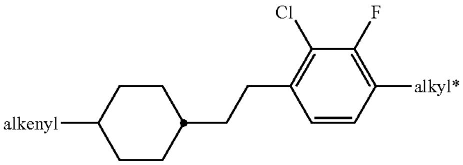
IIA-26
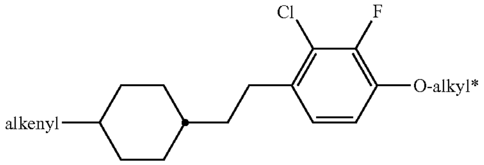
IIA-27
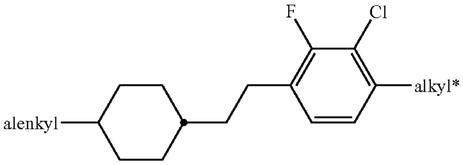
IIA-28
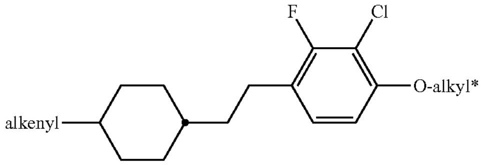
IIA-29
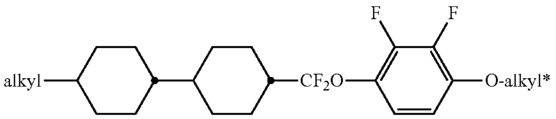
IIA-30
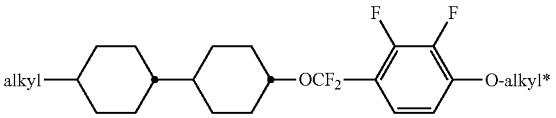

-continued
IIA-31
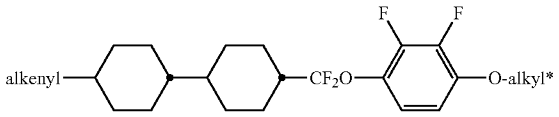
IIA-32
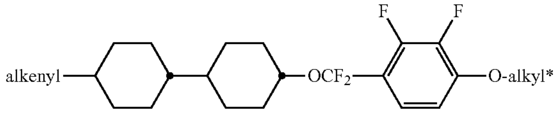
IIA-33
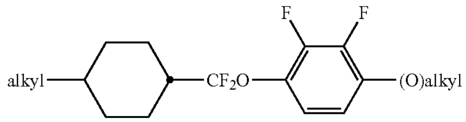
IIA-34
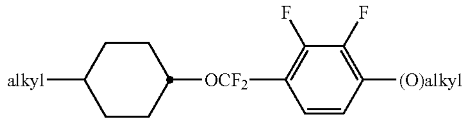
IIA-35
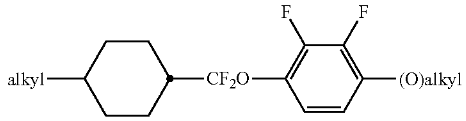
IIA-36
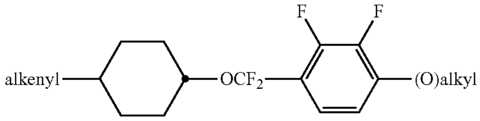
IIA-37
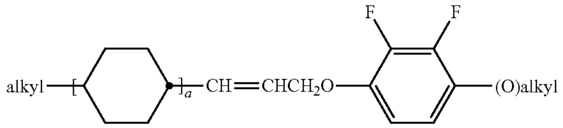
IIA-38
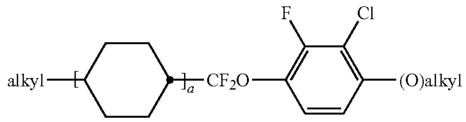
IIA-39
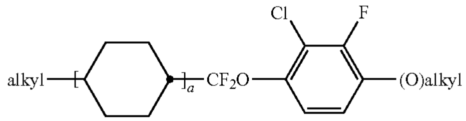
IIA-40
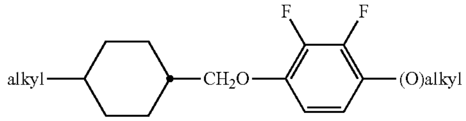
IIA-41
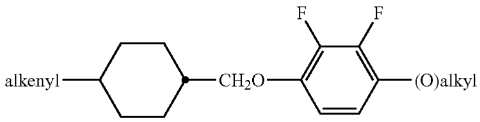
-continued
IIA-42
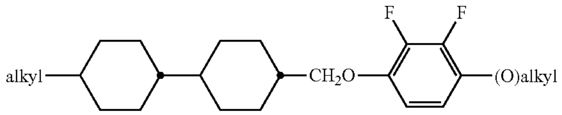
IIA-43
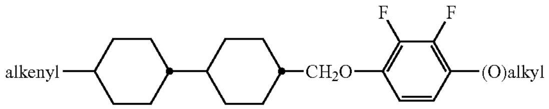
IIA-44
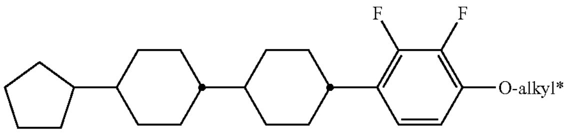
IIA-45
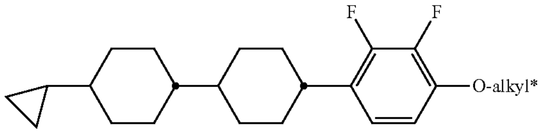
IIA-46
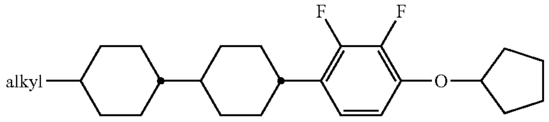
IIA-47
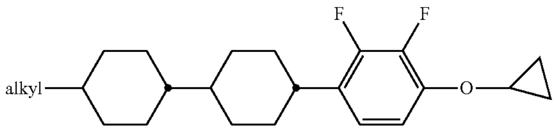
IIA-48
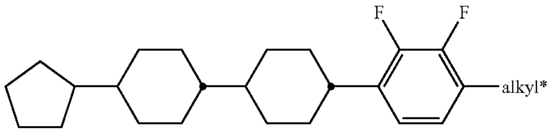
IIA-49
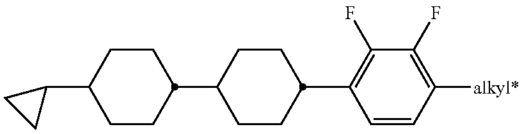
IIA-50
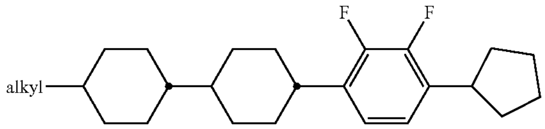
IIA-51
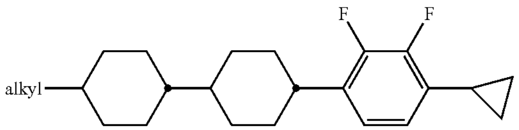

-continued

IIA-52

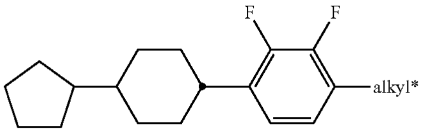

IIA-53

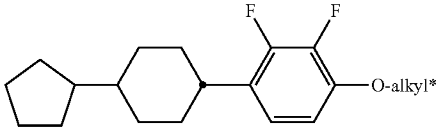

in which the parameter a denotes 1 or 2, alkyl and alkyl* each, independently of one another, denote a straight-chain alkyl radical having 1-7 C atoms, and alkenyl denotes a straight-chain alkenyl radical having 2-7 C atoms, and (0) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

It is particularly preferred that the liquid-crystalline medium comprises one or more compounds selected from the group of the compounds of formulae IIA-1 and IIA-2, wherein preferably alkyl and alkyl* each, independently of one another, denote a straight-chain alkyl radical having 1 to 7 C atoms.

The medium preferably comprises one or more compounds selected from the group of the compounds of formulae IIA-1 and IIA-2 in a total amount of at least 10% by weight, more preferably at least 20% by weight, even more preferably at least 25% by weight and in particular at least 30% by weight.

The medium preferably comprises one or more compounds of formula IIA-4, preferably in a total amount of at least 5% by weight, more preferably at least 10% by weight.

In an embodiment the liquid-crystal medium comprises the compound II-a-1

II-a-1

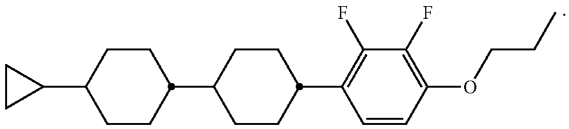

The liquid-crystalline medium preferably comprises one or more compounds of formula V

V

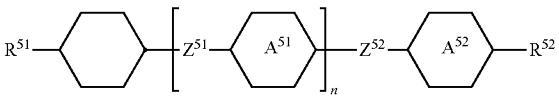

in which $R^{51}$ and $R^{52}$ each, independently of one another, have one of the meanings indicated for $R^{2A}$, and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

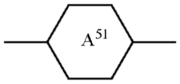 and 

identically or differently, denote

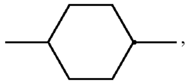, 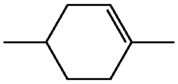

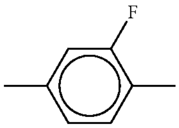 or 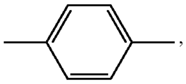, preferably

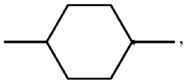, 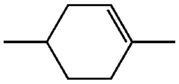 or

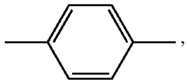, $Z^{51}$, $Z^{52}$ each, independently of one another, denote $—CH_2—CH_2—$, $—CH_2—O—$, $—CH{=}CH—$, $—C{\equiv}C—$, $—COO—$ or a single bond, preferably $—CH_2—CH_2—$, $—CH_2—O—$ or a single bond and particularly preferably a single bond, and n is 1 or 2.

The compounds of formula V are preferably selected from the compounds of the formulae V-1 to V-18:

V-1

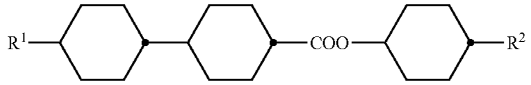

V-2

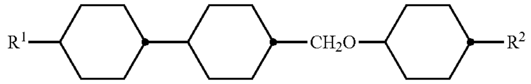

V-3

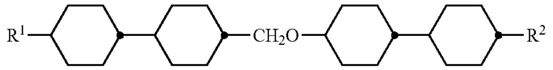

V-4

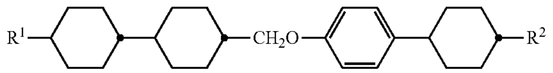

-continued

V-5

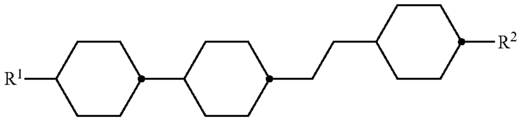

V-6

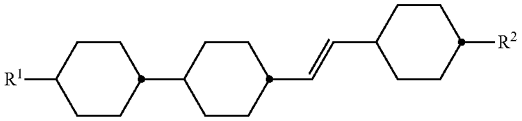

V-7

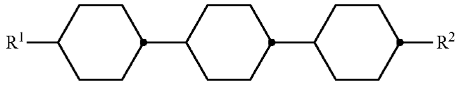

V-8

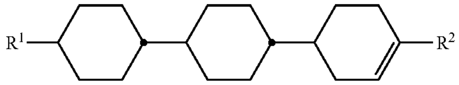

V-9

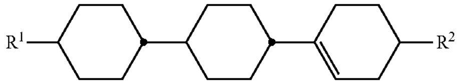

V-10

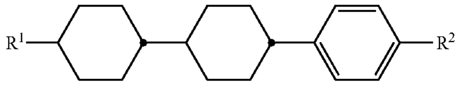

V-11

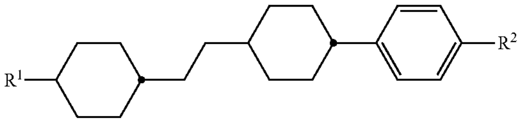

V-12

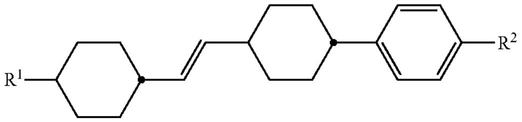

V-13

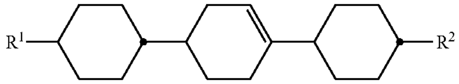

V-14

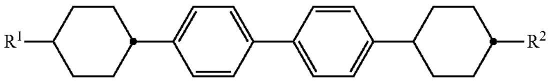

V-15

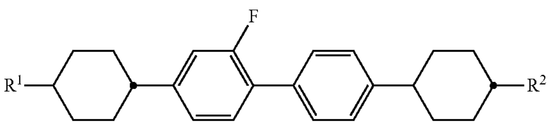

V-16

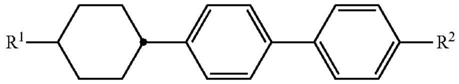

V-17

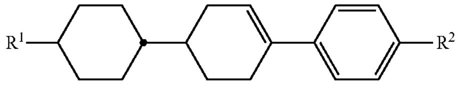

-continued

V-18

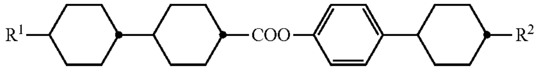

in which $R^1$ and $R^2$ have the meanings indicated for $R^{2A}$ above. $R^1$ and $R^2$ preferably each, independently of one another, denote straight-chain alkyl or alkenyl.

It is particularly preferred that the liquid-crystalline medium comprises one or more compounds of formula V-1

V-1

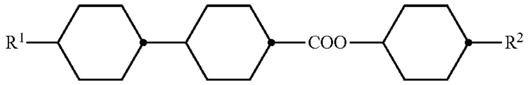

wherein $R^1$ and $R^2$ each, independently of one another, have the meanings indicated for $R^{2A}$.

The medium preferably comprises one or more compounds of formula V-1 in a total amount of 8% by weight or more, more preferably 10% by weight or more, even more preferably 12% by weight or more and in particular 15% by weight or more.

The medium preferably comprises one or more compounds of formula V-2, preferably in a total amount of at least 5% by weight, more preferably in the range of from 5% by weight to 7% by weight.

The medium preferably comprises one or more compounds of formula V-10, preferably in a total amount of at least 5% by weight, more preferably in the range of from 8% by weight to 15% by weight.

The medium preferably comprises one or more compounds of formula V-18, preferably in a total amount of at least 5% by weight, more preferably in the range of from 7% by weight to 13% by weight.

In a preferred embodiment the liquid-crystalline medium does not contain compounds of the formulae

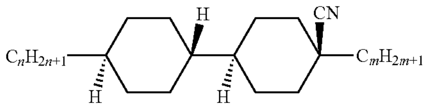

and

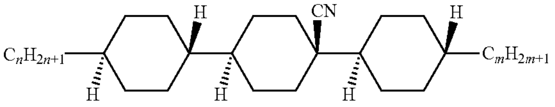

in which n and m each, independently of one another, denote 1 to 7.

It is particularly preferred that the liquid-crystalline medium does not contain any compounds which comprise cyclohexylene groups with axial cyano substituents.

In a preferred embodiment the liquid-crystalline medium comprises one or more compounds selected from the group of the compounds of formulae IIB, IIC and IID

IIB

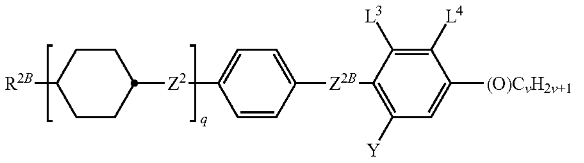

IIC

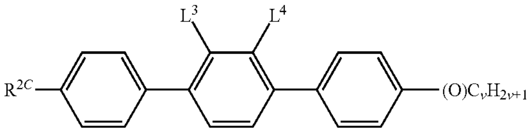

IID

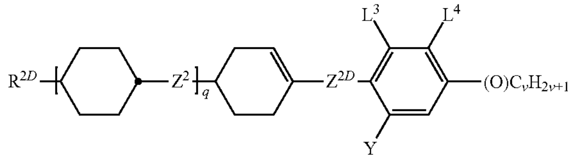

in which $R^{2B}$, $R^{2C}$ and $R^{2D}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

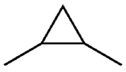, 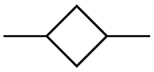, 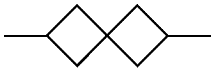, 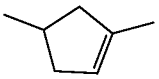, 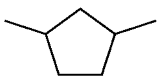,

—C≡C—, —$CF_2O$—, —$OCF_2$—, —OC—O— or —O—CO— in such a way that O atoms are not linked directly to one another, $L^3$ and $L^4$ each, independently of one another, denote F, Cl, $CF_3$ or $CHF_2$, preferably F, Y denotes H, F, Cl, $CF_3$, $CHF_2$ or $CH_3$, preferably H or $CH_3$, particularly preferably H, $Z^2$, $Z^{2B}$ and $Z^{2D}$ each, independently of one another, denote a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF— or —CH═$CHCH_2O$—, (O) is O or a single bond, q denotes 0 or 1, and v denotes 1 to 7.

In the compounds of the formulae IIA, IIB and IID, $Z^2$ may have identical or different meanings. In the compounds of the formula IIB, $Z^2$ and $Z^2$B may have identical or different meanings. In the compounds of the formula IID, $Z^2$ and $Z^{2D}$ may have identical or different meanings.

In the compounds of the formulae IIA, IIB, IIC and IID, $R^{2A}$, $R^{2B}$, $R^{2C}$ and $R^{2D}$ each preferably denote alkyl having 1 to 6 C atoms, in particular $CH_3$, $C_2H_5$, n-$C_3H_7$, n-$C_4H_9$, n-$C_5H_{11}$.

In the compounds of the formulae IIA, IIB and IID, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^2$B in the formulae IIA and IIB preferably each, independently of one another, denote a single bond, furthermore alternatively a —$C_2H_4$— group.

If, in the formula IIB, $Z^2$═—$C_2H_4$— or —$CH_2O$—, $Z^{2B}$ is preferably a single bond or, if $Z^{2B}$═—$C_2H_4$— or —$CH_2O$—, $Z^2$ is preferably a single bond.

In formula IID, $Z^{2D}$ is preferably a single bond.

In the compounds of the formulae IIA, IIB and IID, $(O)C_vH_{2v+1}$ preferably denotes $C_vH_{2v+1}$. In the compounds of the formula IIC, $(O)C_vH_{2v+1}$ preferably denotes $C_vH_{2v+1}$.

In the compounds of the formula IIC, $L^3$ and $L^4$ preferably each denote F.

Preferred compounds of the formulae IIB, IIC and IID are indicated below:

IIB-1

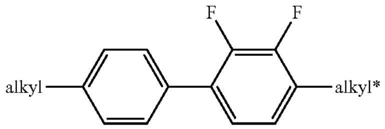

IIB-2

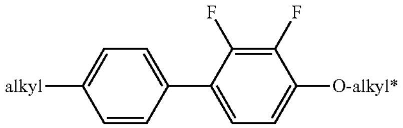

IIB-3

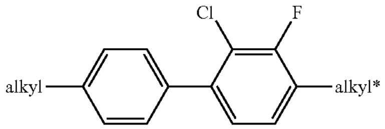

IIB-4

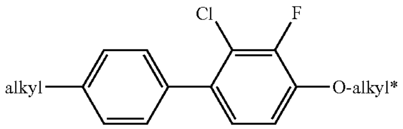

IIB-5

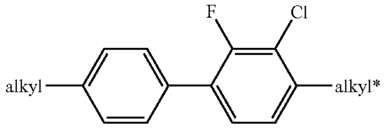

IIB-6

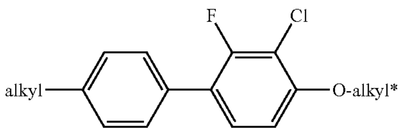

IIB-7

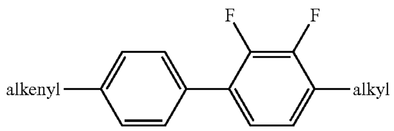

IIB-8

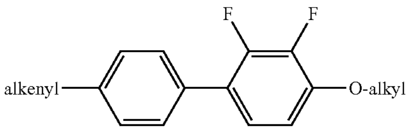

-continued
IIB-9
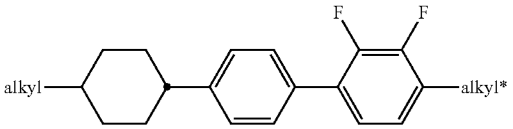
IIB-10
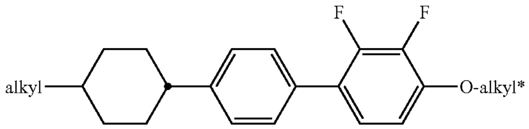
IIB-11
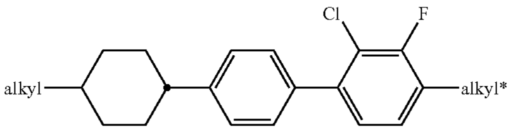
IIB-12
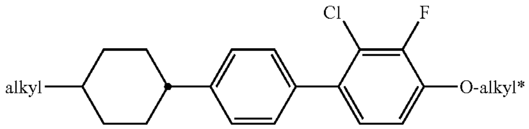
IIB-13
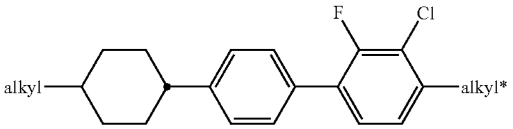
IIB-14
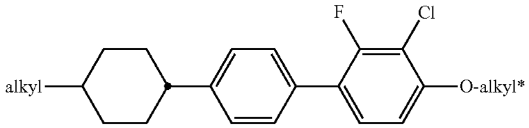
IIB-15
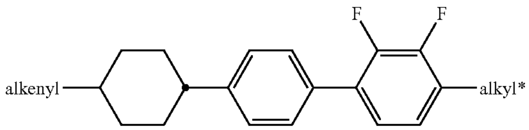
IIB-16
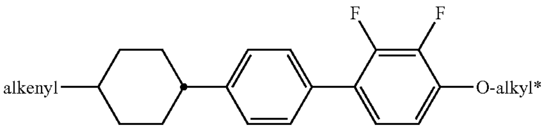
IIB-17
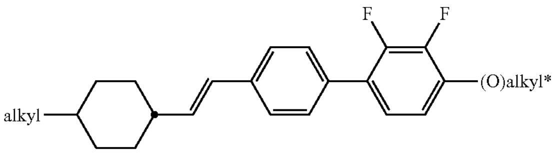
IIB-18
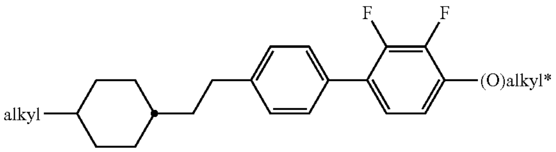
-continued
IIB-19
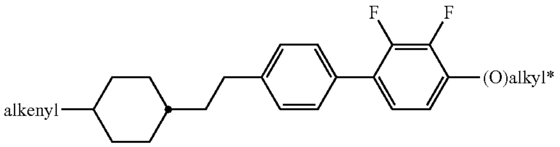
IIB-20
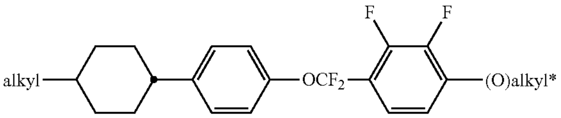
IIB-21
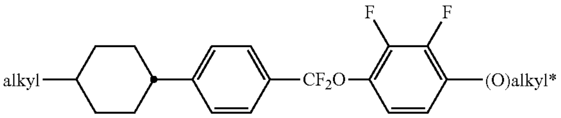
IIB-22
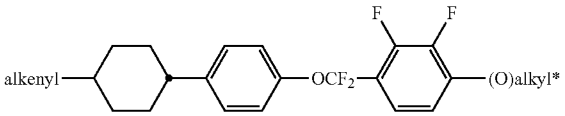
IIB-23
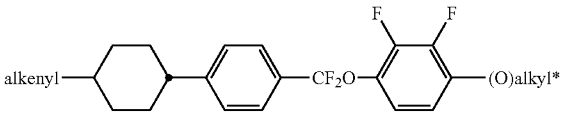
IIB-24
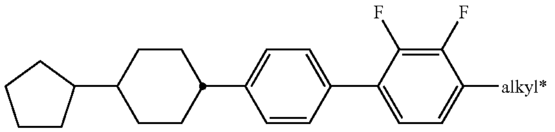
IIB-25
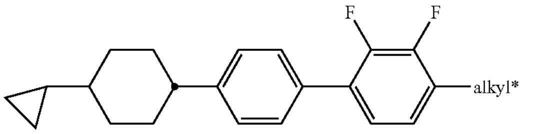
IIB-26
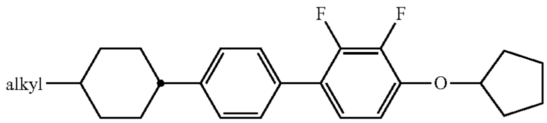
IIB-27
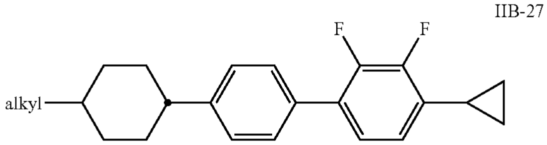
IIB-28
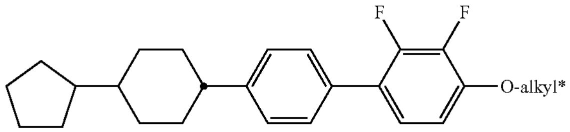

-continued

IIB-29

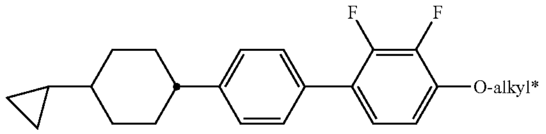

IIB-30

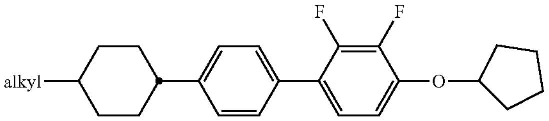

IIB-31

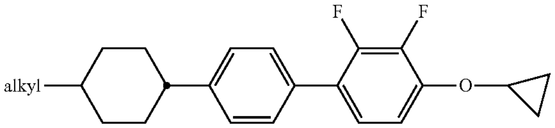

IIC-1

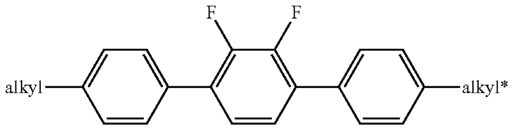

IID-1

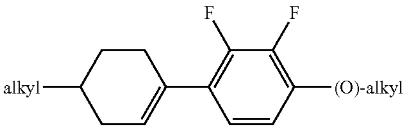

IID-2

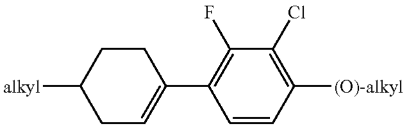

IID-3

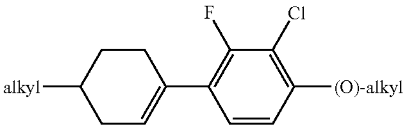

-continued

IID-4

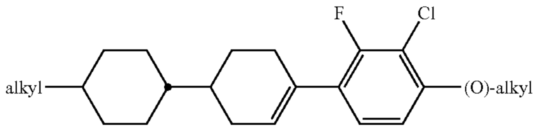

IID-5

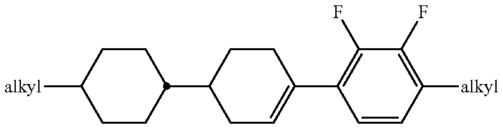

IID-6

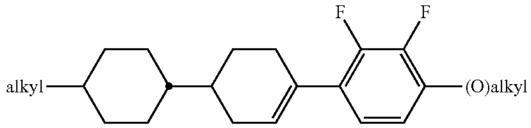

IID-7

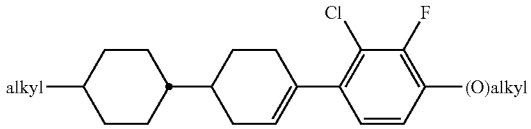

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

In a preferred embodiment the liquid-crystalline medium further comprises one or more additives, preferably a stabilizer and/or a chiral dopant.

In a particularly preferred embodiment of the present invention the liquid-crystalline medium comprises one or more stabilizers, preferably selected from the group consisting of compounds of the formulae ST-1 to ST-18

ST-1

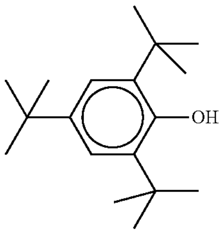

ST-2

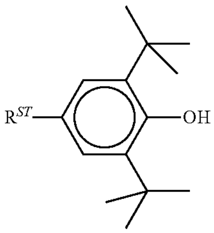

ST-3

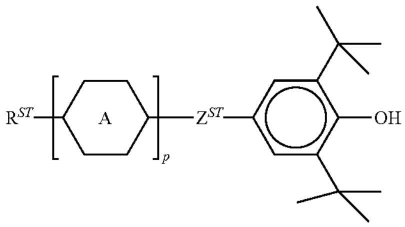

ST-4

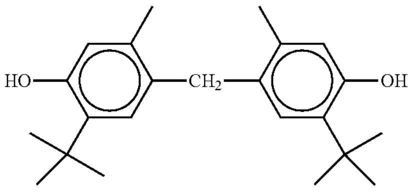

-continued
ST-5
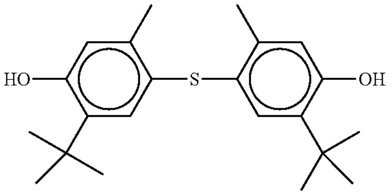
ST-6
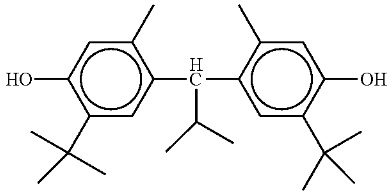
ST-7
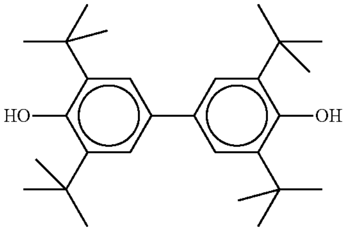
ST-8
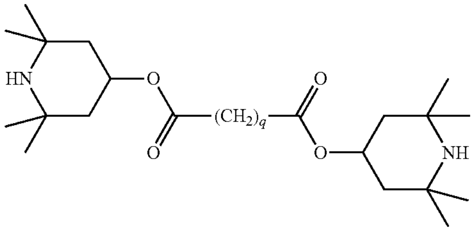
ST-9
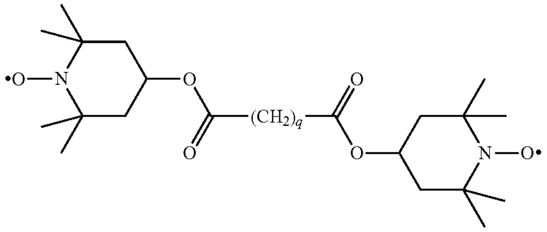
ST-10
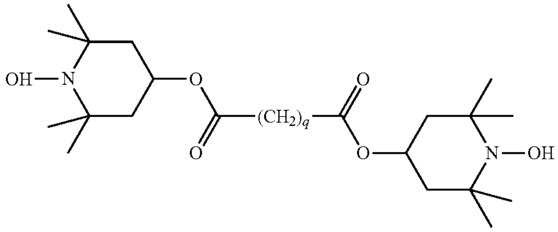
ST-11
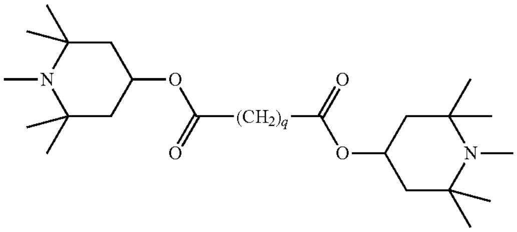
ST-12
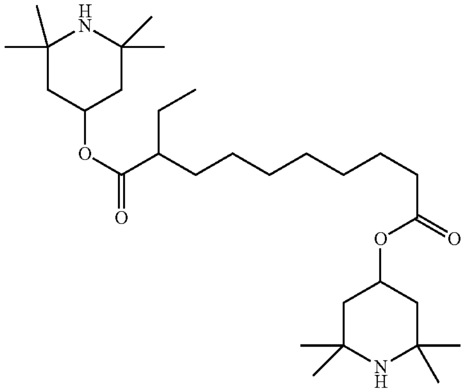
ST-13
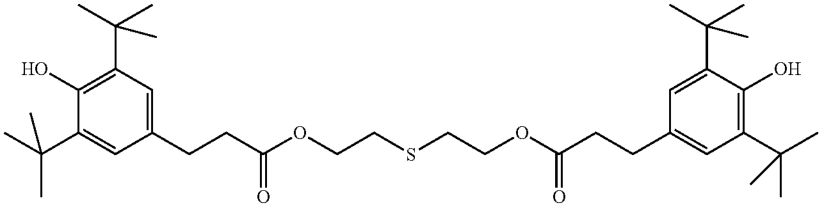

-continued

ST-14

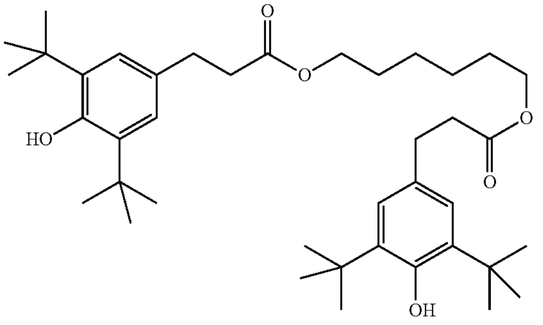

ST-16

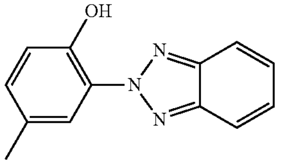

ST-17

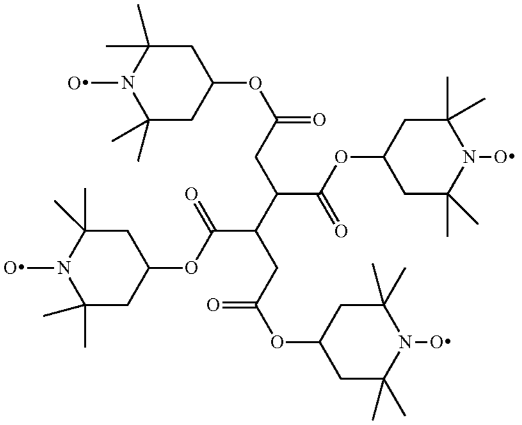

ST-18

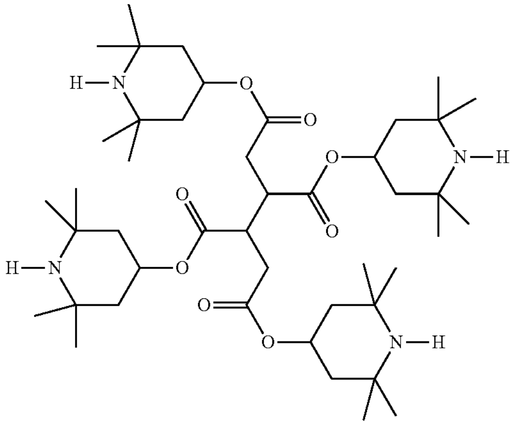

in which $R^{ST}$ denotes H, an alkyl or alkoxy radical having 1 to 15 C atoms, where, in addition, one or more $CH_2$ groups in these radicals may each be replaced, independently of one another, by —C≡C—, —$CF_2O$—, —$OCF_2$—, —CH═CH—,

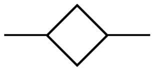 , 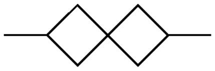 ,

—O—, —CO—O—, or —O—CO— in such a way that O atoms are not linked directly to one another, and in which, in addition, one or more H atoms may each be replaced by halogen,

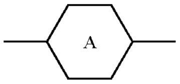 denotes 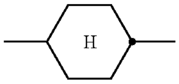 ,

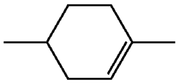 , 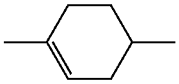 ,

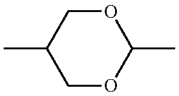 , 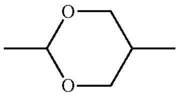 ,

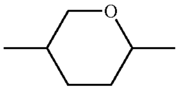 , 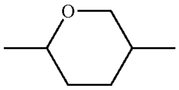 ,

-continued

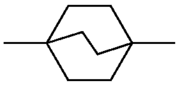 , 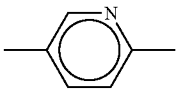 ,

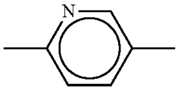 , 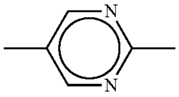 ,

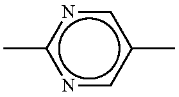 , 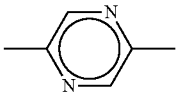 ,

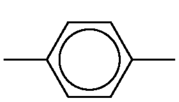 , 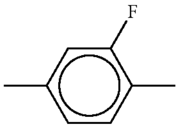 ,

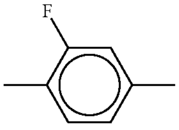 , 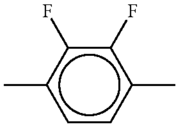 ,

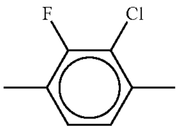 , 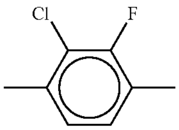 ,

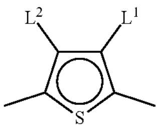 , 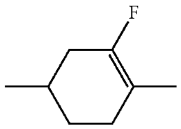 ,

-continued

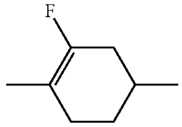
,
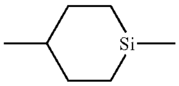
,
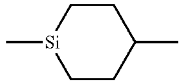
,
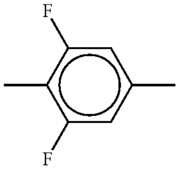
,
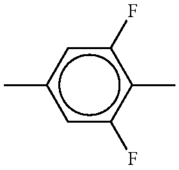
,
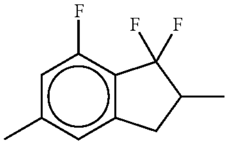
,
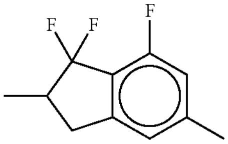
,
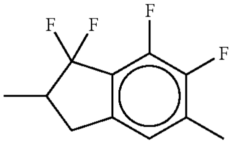
,
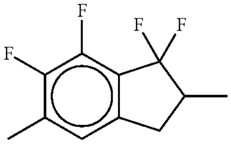
,
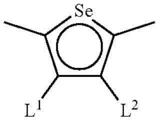
,
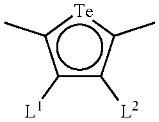
,
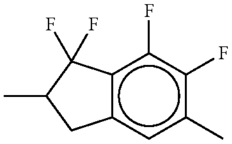
,
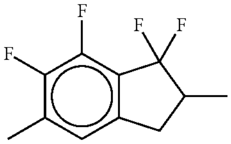
,
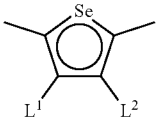
,
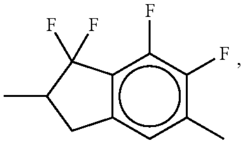
,
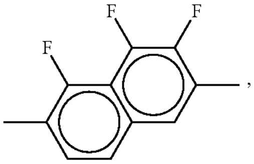
,
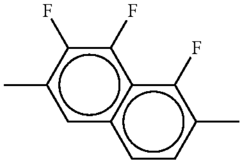
,
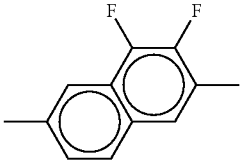
,
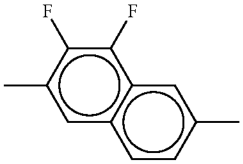
,
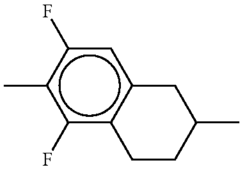
,
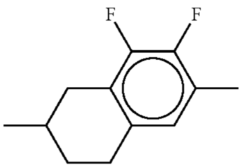
,
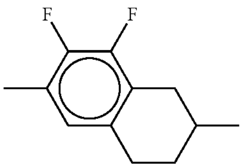
, -continued

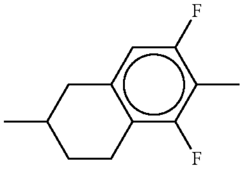
,
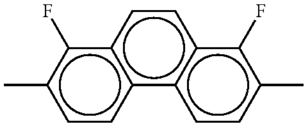
,
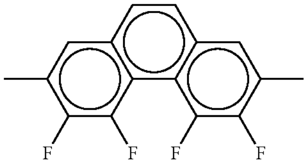
,
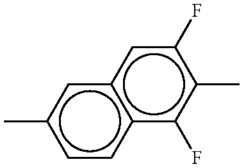
,
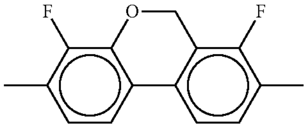
,
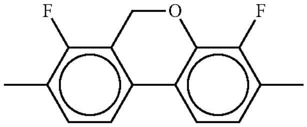
,
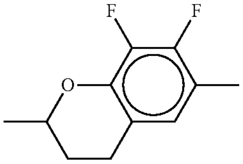
,
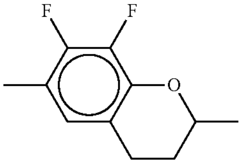
,
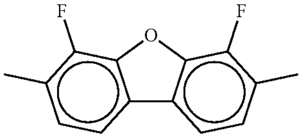

$Z^{ST}$ each, independently of one another, denote —CO—O—, —O—CO—, $-CF_2O-$, $-OCF_2-$, $-CH_2O-$, $-OCH_2-$, $-CH_2-$, $-CH_2CH_2-$, $-(CH_2)_4-$, $-CH{=}CH-CH_2O-$, $-C_2F_4-$, $-CH_2CF_2-$, $-CF_2CH_2-$, —CF═CF—, —CH═CF—, —CF═CH—, —CH═CH—, —C≡C— or a single bond, $L^1$ and $L^2$ each, independently of one another, denote F, Cl, $CF_3$ or $CHF_2$, p denotes 1 or 2, q denotes 1, 2, 3, 4, 5, 6, 7, 8, 9 or 10.

Of the compounds of the formulae ST-1 to ST-18, special preference is given to the compounds of the formulae ST-1
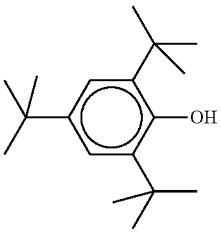
ST-2a
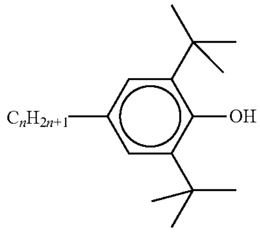
where n=1, 2, 3, 4, 5, 6 or 7, preferably n=1 or 7
ST-3a
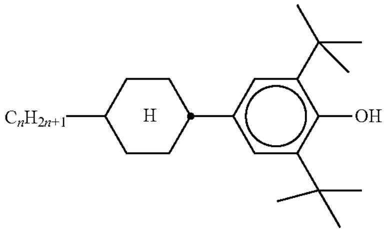
where n=1, 2, 3, 4, 5, 6 or 7, preferably n=3
ST-3b
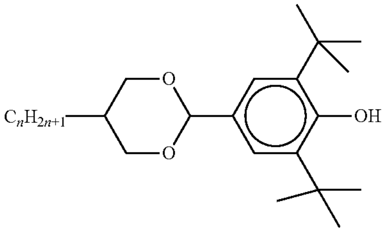
where n=1, 2, 3, 4, 5, 6 or 7, preferably n=3
ST-8-1
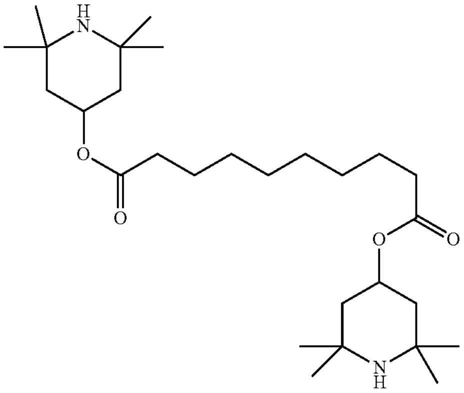
ST-9-1
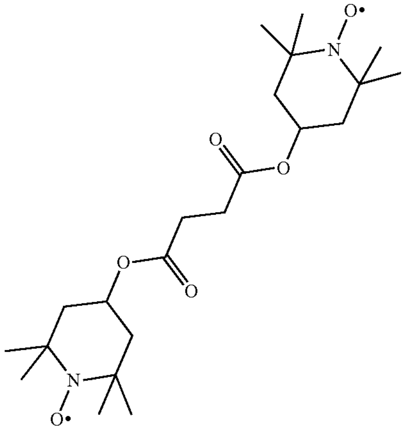
ST-12
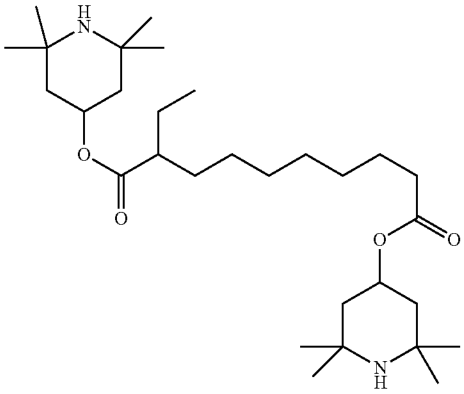
ST-15
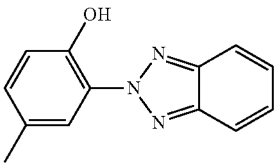

-continued

ST-16

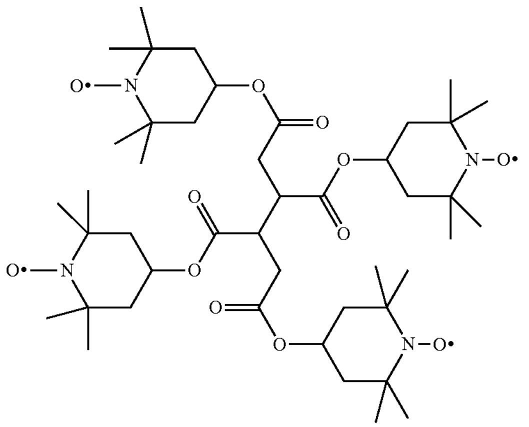

ST-17

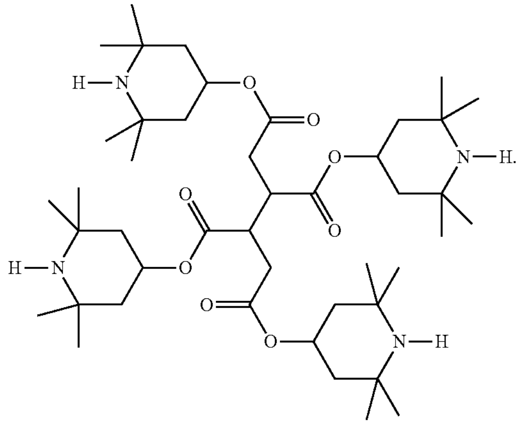

In the compounds of the formulae ST-3a and ST-3b, n preferably denotes 3. In the compounds of the formula ST-2a, n preferably denotes 7.

Very particularly preferred liquid-crystalline mixtures according to the invention comprise one or more stabilizers from the group of the compounds of the formulae ST-2a-1, ST-3a-1, ST-3b-1, ST-8-1, ST-9-1 and ST-12:

ST-2a-1

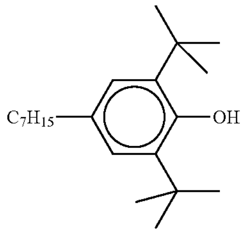

ST-3a-1

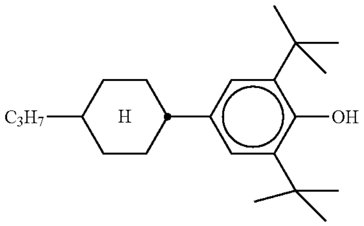

-continued

ST-3b-1

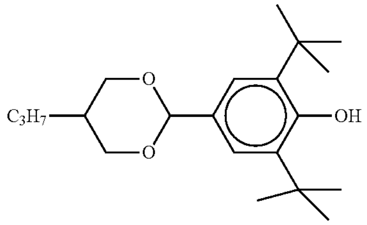

ST-8-1

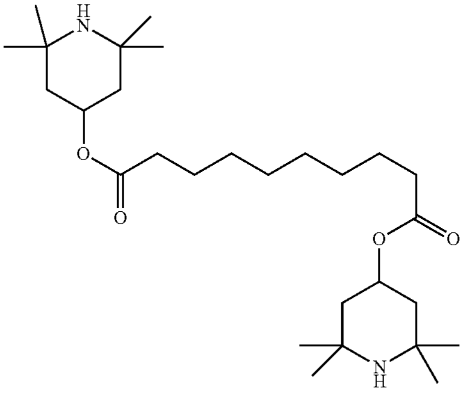

ST-9-1

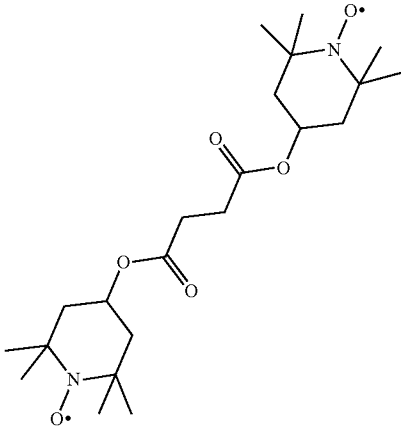

ST-12

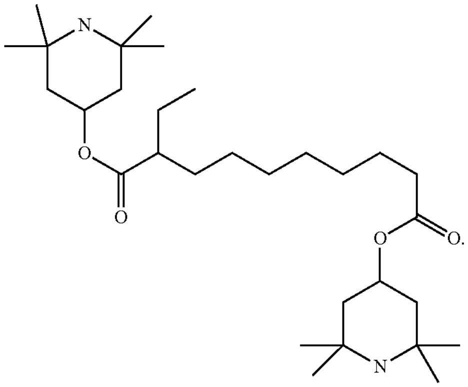

The one or more stabilizers, preferably the one or more compounds selected from the compounds of the formulae ST-1 to ST-18, are preferably each present in the liquid-crystal media according to the invention in an amount of from 0.005% by weight to 0.5% by weight, based on the mixture.

If the mixtures according to the invention comprise two or more compounds from the group of the compounds of the formulae ST-1 to ST-18, the overall concentration of these compounds is preferably in the range of from 0.01% by weight to 2.5% by weight, more preferably in the range of from 0.05% by weight to 1.0% by weight, based on the mixtures.

However, the total proportion of the compounds of the formulae ST-1 to ST-18, based on the mixture according to the invention, should preferably not exceed 3% by weight.

In a preferred embodiment the liquid-crystalline medium as provided and used according to the invention comprises one or more chiral dopants.

Preferably these chiral dopants have an absolute value of the helical twisting power (HTP) in the range of from 1 $\mu m^{-1}$ to 150 $\mu m^{-1}$, preferably in the range of from 10 $\mu m^{-1}$ to 100 $\mu m^{-1}$. In case the media comprise two or more chiral dopants, these may have opposite signs of their HTP values. This condition is preferred for some specific embodiments, as it allows to compensate the chirality of the respective compounds to some degree and, thus, may be used to compensate various temperature dependent properties of the resulting media in the devices. Generally, however, it is preferred that most, preferably all of the chiral compounds optionally present in the media according to the present invention have the same sign of their HTP values.

Preferably the chiral dopants present in the media according to the invention are mesogenic compounds and most preferably they exhibit a mesophase on their own.

The temperature dependence of the HTP of the individual compounds may be high or low. The temperature dependence of the pitch of the medium can be compensated by mixing compounds having different temperature dependence of the HTP in corresponding ratios.

For the optically active component, a large variety of chiral dopants known in the art may be used, such as, for example, cholesteryl nonanoate, R- and S-811, R- and S-1011, R- and S-2011, R- and S-3011, R- and S-4011, R- and S-5011, B(OC)2C*H-C-3 or CB15 (all Merck KGaA, Darmstadt).

Particularly suitable dopants are compounds which contain one or more chiral groups and one or more mesogenic groups, or one or more aromatic or alicyclic groups which form a mesogenic group with the chiral group.

Suitable chiral groups are, for example, chiral branched hydrocarbon radicals, chiral ethanediols, binaphthols or dioxolanes, furthermore mono- or polyvalent chiral groups selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral groups are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral groups and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820. Examples are also compounds listed in Table B below.

Particular preference is given to chiral dopants selected from the group consisting of compounds of the following formulae A-I to A-III and A-Ch:

A-I

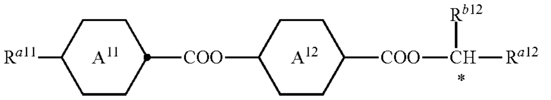

A-II

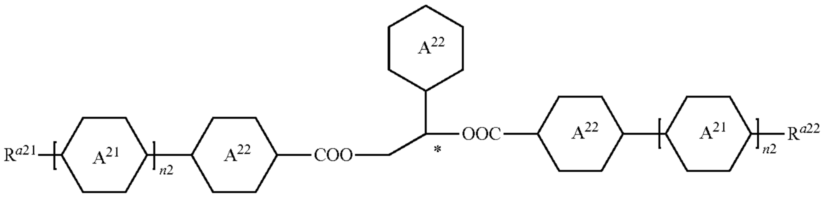

A-III

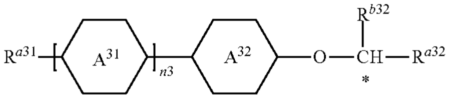

A-Ch

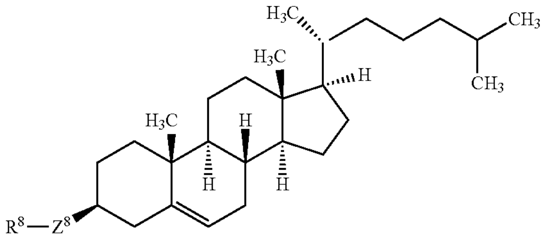

in which $R^{a11}$, $R^{a12}$ and $R^{b12}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —OO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl, with the proviso that $R^{a12}$ is different from $R^{b12}$, $R^{a21}$ and $R^{a22}$, independently of one another, denote alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably both are alkyl, more preferably n-alkyl, $R^{a31}$, $R^{a32}$ and $R^{b32}$, independently of one another, denote straight-chain or branched alkyl having 1 to 15 C atoms, in which, in addition, one or more non-adjacent $CH_2$ groups may each be replaced, independently of one another, by —C($R^z$)═C($R^z$)—, —C≡C—, —O—, —S—, —CO—, —OO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl, with the proviso that $R^{a32}$ is different from $R^{b32}$;

$R^z$ denotes H, $CH_3$, F, Cl, or CN, preferably H or F, $R^8$ has one of the meanings of $R^{a11}$ given above, preferably alkyl, more preferably n-alkyl having 1 to 15 C atoms, $Z^8$ denotes —C(O)O—, $CH_2O$, $CF_2O$ or a single bond, preferably —C(O)O—, $A^{11}$ is defined as $A^{12}$ below, or alternatively denotes

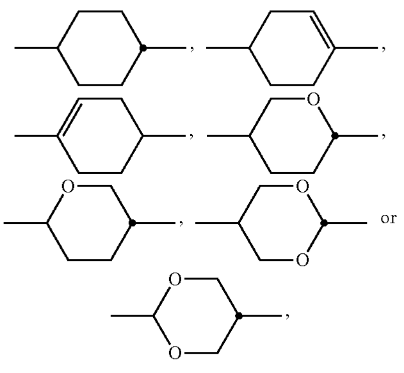

$A^{12}$ denotes

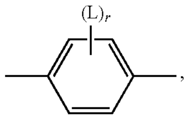

preferably

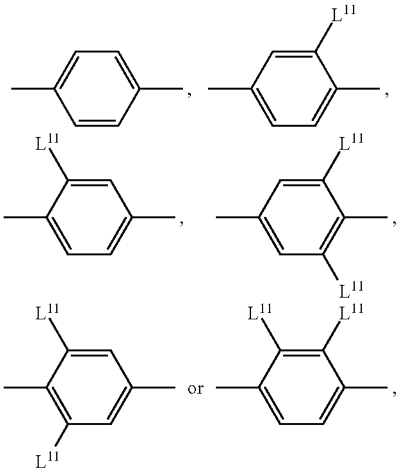

in which r is 0, 1, 2, 3 or 4,

L and $L^{11}$, on each occurrence, independently of one another, denote alkyl, alkenyl or alkoxy having up to 12 C atoms, in which one or more H atoms are each optionally replaced with halogen, halogen, $SF_5$ or CN, preferably Me (methyl), Et (ethyl), Cl or F, particularly preferably F.

$A^{21}$ denotes

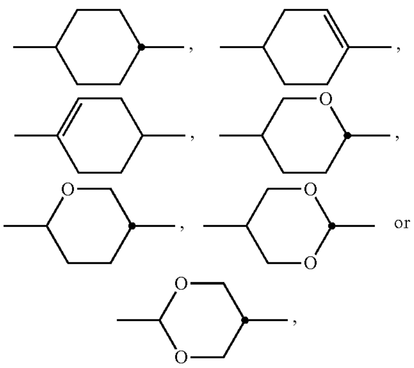

$A^{22}$ has the meanings given for $A^{12}$ $A^{31}$ has the meanings given for $A^{11}$, or alternatively denotes

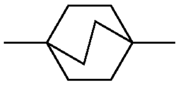

$A^{32}$ has the meanings given for $A^{12}$, n2 on each occurrence, identically or differently, is 0, 1 or 2, and n3 is 1, 2 or 3.

Particular preference is given to chiral dopants selected from the group consisting of the compounds of the following formulae:

A-I-1

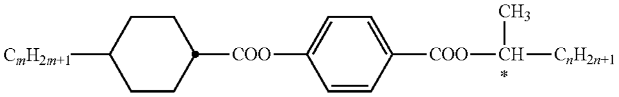

A-II-1

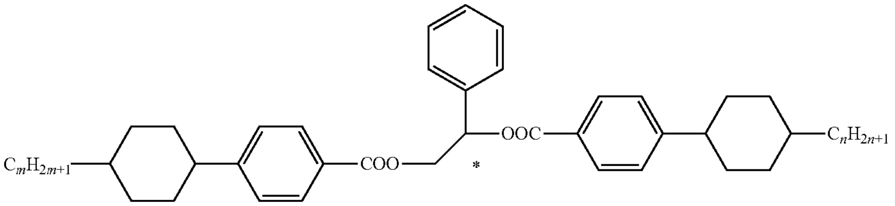

A-III-1

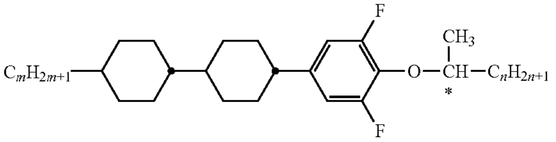

A-III-2

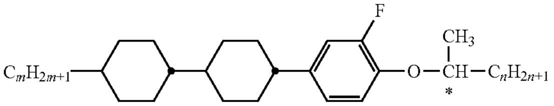

A-III-3

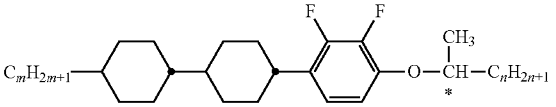

A-III-4

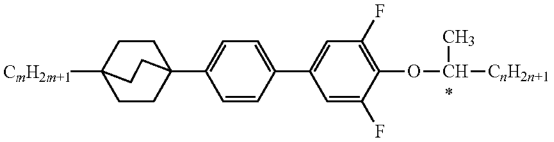

A-III-5

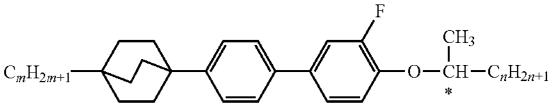

A-III-6

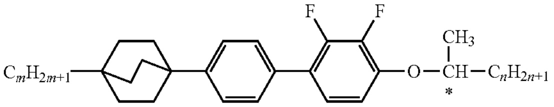

A-III-7

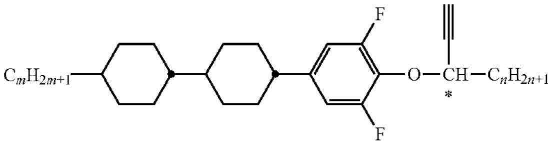

A-III-8

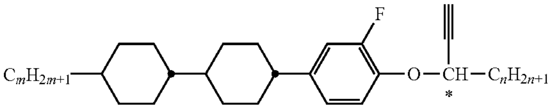

A-III-9

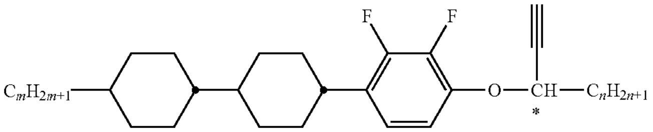

in which m is, on each occurrence, identically or differently, an integer from 1 to 9 and n is, on each occurrence, identically or differently, an integer from 2 to 9.

Particularly preferred compounds of formulae A-I to A-III and A-Ch are compounds of formula A-III.

Further preferred dopants are derivatives of the isosorbide, isomannitol or isoiditol of the following formula A-IV:

A-IV

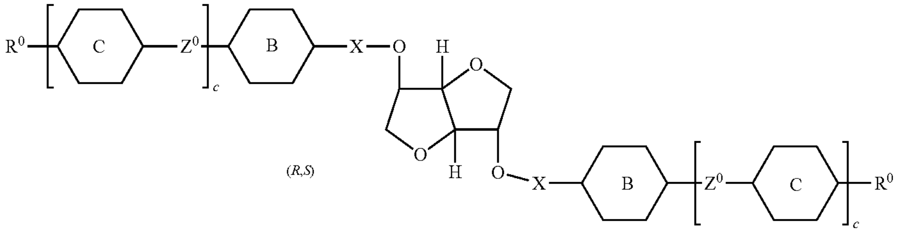

in which the group

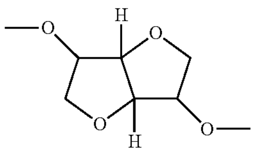

is

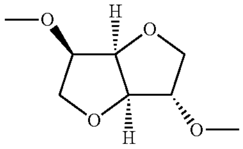, (dianhydrosorbitol)

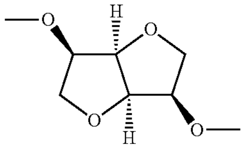, or (dianhydromannitol)

-continued

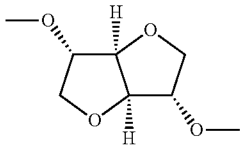, (dianhydroiditol)

preferably dianhydrosorbitol, wherein rings B and C, parameter c, and groups X, $Z^0$, and $R^0$ are defined below. Further preferred dopants are chiral ethanediols, such as, for example, diphenylethanediol (hydrobenzoin), in particular mesogenic hydrobenzoin derivatives of the following formula A-V:

A-V

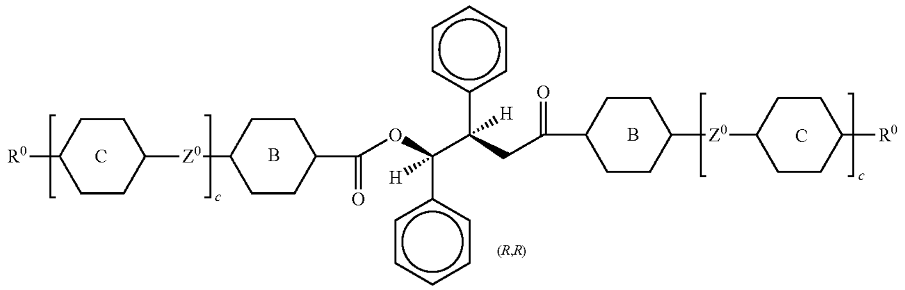

including the (R,S), (S,R), (R,R) and (S,S) enantiomers, which are not shown, in which

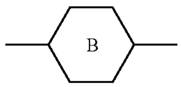 and 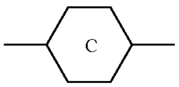

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, X is $CH_2$ or —C(O)—, $Z^0$ is —COO—, —OCO—, —$CH_2CH_2$— or a single bond, and $R^0$ is alkyl, alkoxy, alkylcarbonyl, alkoxycarbonyl or alkylcarbonyl-oxy having 1-12 carbon atoms.

Chiral compounds preferably used according to the present invention are selected from the group consisting of the formulae shown below.

Examples of compounds of formula A-IV are:
A-IV-1
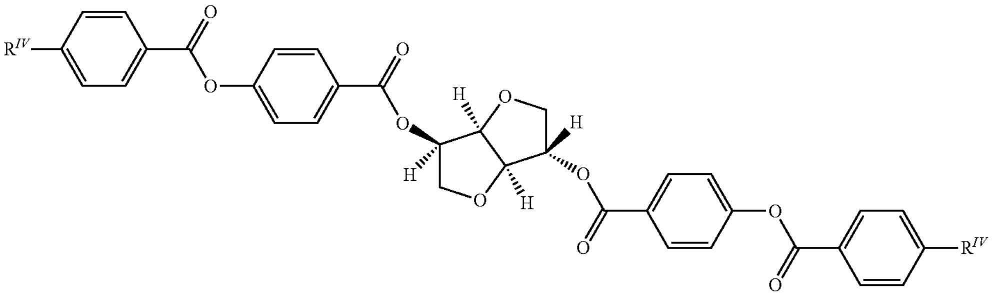
A-IV-2
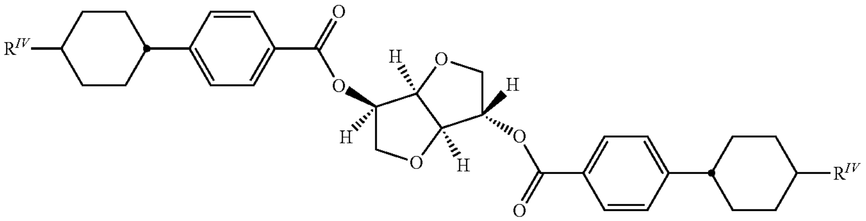
A-IV-3
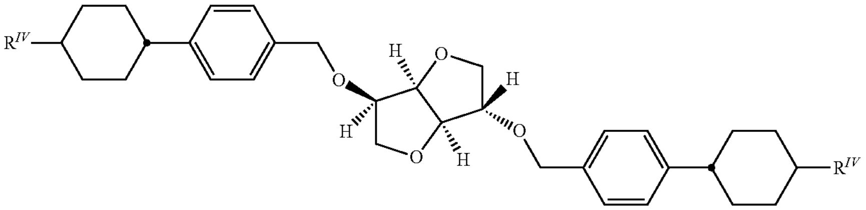
A-IV-4
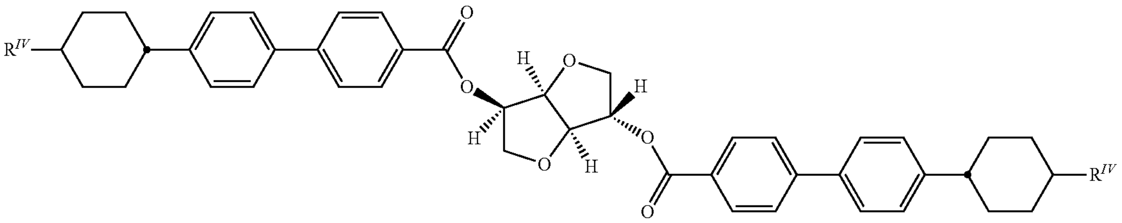
A-IV-5
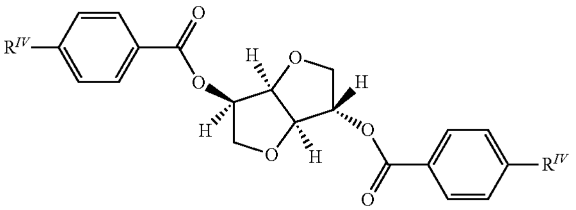
A-IV-6
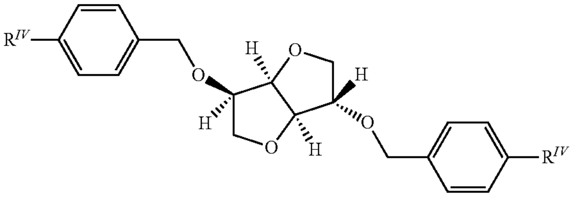
A-IV-7
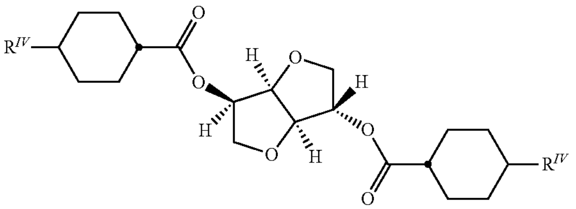
A-IV-8
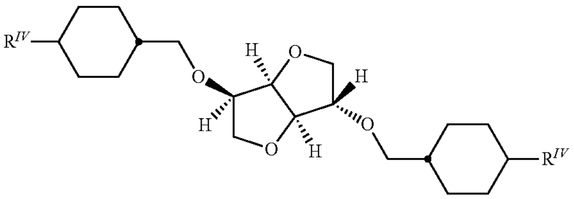
wherein $R^{IV}$ has the meanings given for $R^0$.

The compounds of the formula A-V are described in GB-A-2,328,207.

Very particularly preferred chiral dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

A-VI

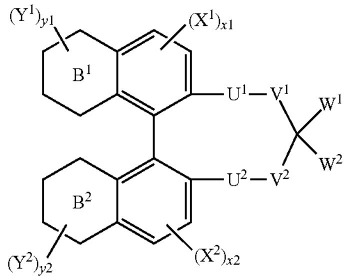

in which $X^1$, $X^2$, $Y^1$ and $Y^2$ are each, independently of one another, F, Cl, Br, I, CN, SCN, $SF_5$, straight-chain or branched alkyl having from 1 to 25 carbon atoms, which is unsubstituted or monosubstituted or polysubstituted by F, Cl, Br, I or CN and in which, in addition, one or more non-adjacent $CH_2$ groups may each, independently of one another, be replaced by —O—, —S—, —NH—, $NR^0$—, —CO—, —COO—, —OCO—, —OCOO—, —S—CP—, —CO—S—, —CH═CH— or —C≡C— in such a way that O and/or S atoms are not bonded directly to one another, a polymerizable group or cycloalkyl or aryl having up to 20 carbon atoms, which may optionally be monosubstituted or polysubstituted by halogen, preferably F, or by a polymerizable group, $R^0$ is H or alkyl having 1 to 12 C atoms, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may each be replaced by N and one or more non-adjacent $CH_2$ groups may each be replaced by O or S, $W^1$ and $W^2$ are each, independently of one another, —$Z^1$-$A^1$-($Z^2$-$A^2$)$_m$-R, and one of the two is alternatively $R^1$ or $A^3$, but both are not simultaneously H, or

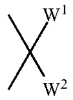 is 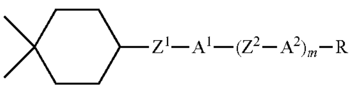 or

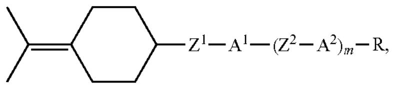

$U^1$ and $U^2$ are each, independently of one another, $CH_2$, O, S, CO or CS, $V^1$ and $V^2$ are each, independently of one another, $(CH_2)_n$, in which from one to four non-adjacent $CH_2$ groups may each be replaced by O or S, and one of $V^1$ and $V^2$ and, in the case where

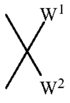 is 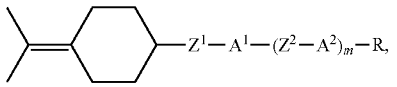

both are a single bond, n is 0, 1, 2 or 3, $Z^1$ and $Z^2$ are each, independently of one another, —O—, —S—, —CO—, —COO—, —OCO—, —O—COO—, —CO—$NR^0$—, —$NR^0$—CO—, —O—$CH_2$—, —$CH_2$—O—, —S—$CH_2$—, —$CH_2$—S—, —$CF_2$—O—, —O—$CF_2$—, —$CF_2$—S—, —S—$CF_2$—, —$CH_2$—$CH_2$—, —$CF_2$—$CH_2$—, —$CH_2$—$CF_2$—, —$CF_2$—$CF_2$—, —CH═N—, —N═CH—, —N═N—, —CH═CH—, —CF═CH—, —CH═CF—, —CF═CF—, —C≡C—, a combination of two of these groups, where no two O and/or S and/or N atoms are bonded directly to one another (preferably —CH═CH—COO—, or —COO—CH═CH—), or a single bond, $A^1$, $A^2$ and $A^3$ are each, independently of one another, 1,4-phenylene, in which one or two non-adjacent CH groups may each be replaced by N, 1,4-cyclohexylene, in which one or two non-adjacent $CH_2$ groups may each be replaced by O or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydro-naphthalene-2,6-diyl, where each of these groups is unsubstituted or monosubstituted or polysubstituted by L, and in addition $A^1$ can be a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may each be replaced by F or Cl, m is in each case, independently, 0, 1, 2 or 3, and R and $R^1$ are each, independently of one another, H, F, Cl, Br, I, CN, SCN, $SF_5$, straight-chain or branched alkyl having from 1 or 3 to carbon atoms respectively, which may optionally be mono-substituted or polysubstituted by F, Cl, Br, I or CN, and in which one or more non-adjacent $CH_2$ groups may each be replaced by —O—, —S—, —NH—, —$NR^0$—, —CO—, —COO—, —OCO—, —O—COO—, —S—CO—, —CO—S—, —CH═CH— or —C≡C—, where no two O and/or S atoms are bonded directly to one another, or a polymerizable group.

Particular preference is given to chiral binaphthyl derivatives of the formula A-VI-1

A-VI-1

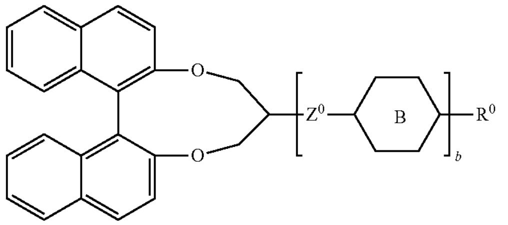

in which ring B, $R^0$ and $Z^0$ are as defined for the formulae A-IV and A-V, and b is 0, 1, or 2, in particular those selected from the following formulae A-VI-1a to A-VI-1c:

A-VI-1a

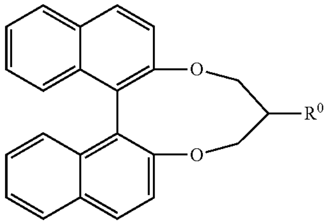

A-VI-1b

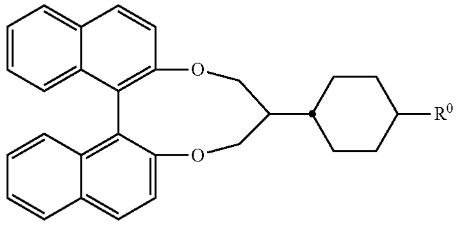

A-VI-1c

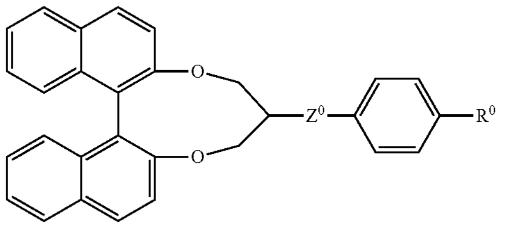

in which ring B, $R^0$ and $Z^0$ are as defined for the formula A-VI-1, and $R^0$ as defined for formula A-IV or H or alkyl having from 1 to 4 carbon atoms, and b is 0, 1 or 2, and $Z^0$ is, in particular, —OCO— or a single bond.

Particular preference is furthermore given to chiral binaphthyl derivatives of the formula A-VI-2

A-VI-2

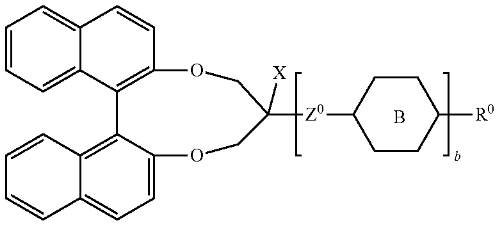

in which X is H, F, Cl, CN or $R^0$, preferably F, ring B, $R^0$ and $Z^0$ are as defined for the formulae A-IV and A-V, and b is 0, 1, or 2, in particular those selected from the following formulae A-VI-2a to A-VI-2f:

A-VI-2a

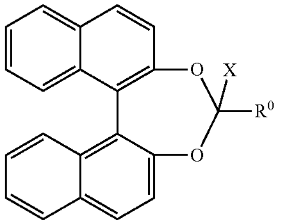

A-VI-2b

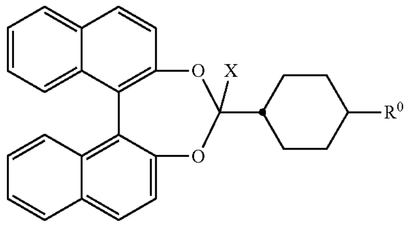

A-VI-2c

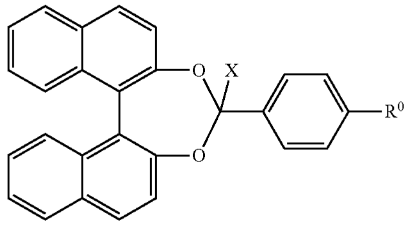

A-VI-2d

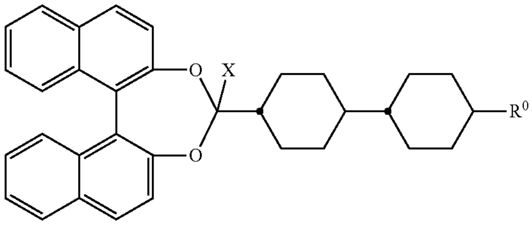

-continued

A-VI-2e

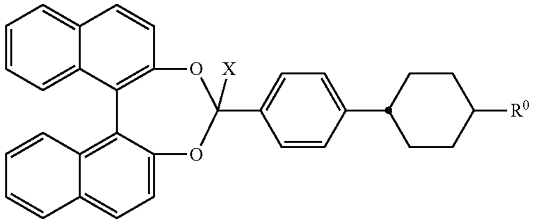

A-VI-2f

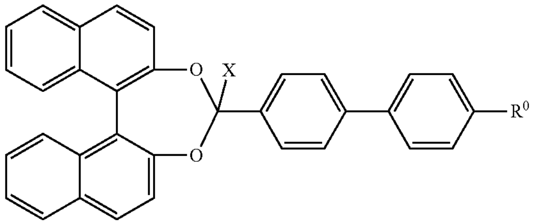

in which $R^0$ is as defined for the formula A-VI, and X is H, F, Cl, CN or $R^0$, preferably F.

The concentration of the optionally comprised one or more chiral dopants in the liquid-crystalline medium is preferably in the range from 0.001% by weight to 20% by weight, more preferably from 0.05% by weight to 5% by weight, even more preferably from 0.1% by weight to 2% by weight, and in particular from 0.5% by weight to 1.5% by weight. These preferred concentration ranges apply in particular to the chiral dopant S-4011 or R-4011 and S-5011 or R-5011 (all from Merck KGaA) and for chiral dopants having the same or a similar HTP.

Preferably, the liquid-crystalline medium additionally comprises one or more compounds of the formula IV

IV

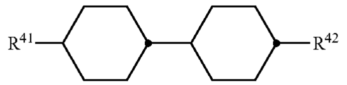

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

IV-1

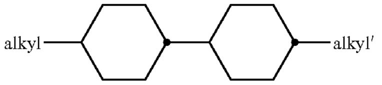

-continued

IV-2

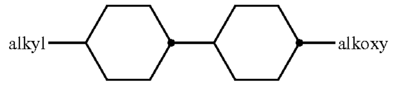

IV-3

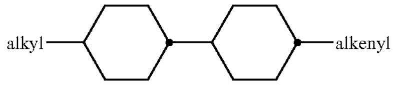

IV-4

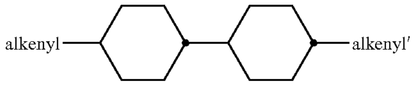

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

The media preferably comprise one or more compounds of formula IV-1 and/or IV-2 and/or IV-3.

The medium preferably comprises one or more compounds selected from the group of compounds of formulae IV-1 and IV-2, preferably in a total amount of at least 5% by weight, more preferably in the range of from 10% by weight to 25% by weight and even more preferably in the range of from 15% by weight to 20% by weight.

Preferably, the medium comprises one or more compounds selected from the compounds of the formulae IV-1-1 to IV-1-5

IV-1-1

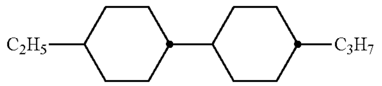

IV-1-2

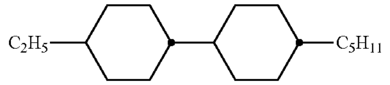

IV-1-3

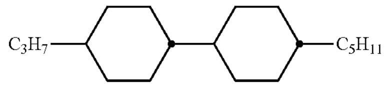

IV-1-4

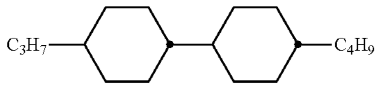

IV-1-5

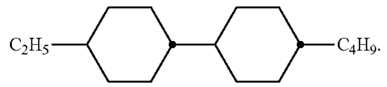

It is particularly preferred that the medium according to the invention comprises one or more compounds selected from the compounds of the formulae IV-2-1, IV-2-2 and IV-2-3

IV-2-1

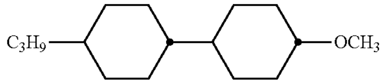

IV-2-2

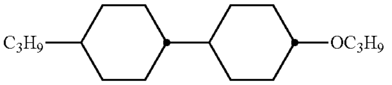

IV-2-3

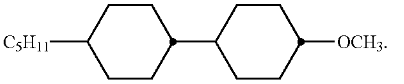

Very preferably, the medium according to the invention comprises a compound of formula IV-3, in particular selected from the compounds of the formulae IV-3-1 to IV-3-5

IV-3-1

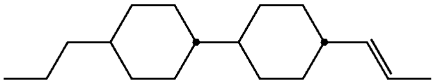

IV-3-2

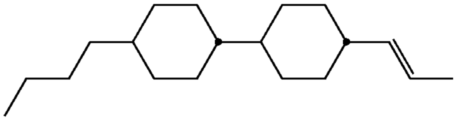

IV-3-3

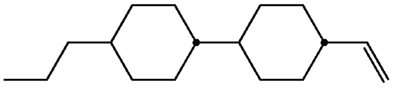

IV-3-4

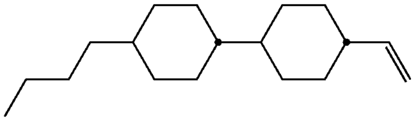

IV-3-5

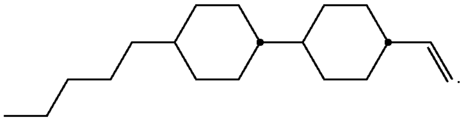

The medium preferably comprises one or more compounds of formula IV-3, in particular the compound of formula IV-3-3, preferably in an amount of at least 5% by weight, more preferably in an amount of at least 9% by weight and even more preferably in an amount of at least 11% by weight.

Very preferably, the medium according to the invention comprises a compound of formula IV-4, in particular selected from the compounds of the formulae IV-4-1 and IV-4-2

IV-4-1

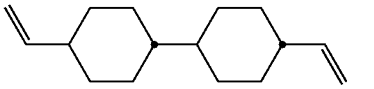

IV-4-2

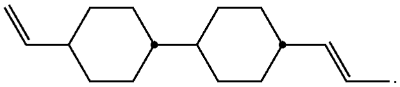

In an embodiment the liquid-crystalline medium preferably comprises one or more compounds of the formula IVa IVa

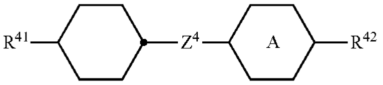

in which $R^{41}$ and $R^{42}$ each, independently of one another, denote a straight-chain alkyl, alkoxy, alkenyl, alkoxyalkyl or alkoxy radical having up to 12 C atoms, and

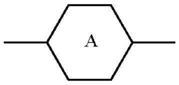

denotes

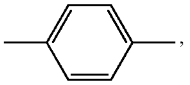,

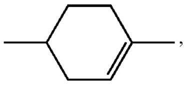,

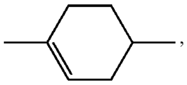,

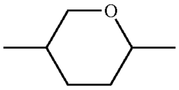

or

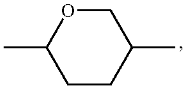, $Z^4$ denotes a single bond, $—CH_2CH_2—$, $—CH{=}CH—$, $—CF_2O—$, $—OCF_2—$, $—CH_2O—$, $—OCH_2—$, $—COO—$, $—OCO—$, $—C_2F_4—$, $—C_4H_8—$ or $—CF{=}CF—$.

Preferred compounds of the formula IVa are indicated below:

IVa-1

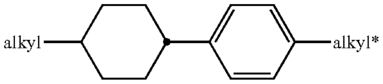

IVa-2

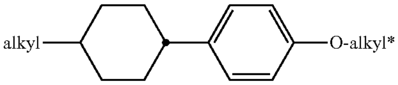

IVa-3

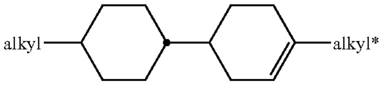

IVa-4

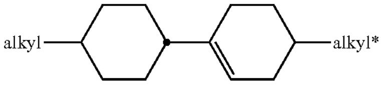

in which alkyl and alkyl* each, independently of one another, denote a straight-chain alkyl radical having 1 to 6 C atoms.

The medium according to the invention preferably comprises at least one compound of the formula IVa-1 and/or formula IVa-2.

The proportion of compounds of the formula IVa in the mixture as a whole is preferably at least 5% by weight.

The medium preferably comprises one or more compounds of formula IVa-2, preferably in a total amount of 5% by weight or more, more preferably 8% by weight or more, even more preferably 10% by weight or more and in particular 15% by weight or more.

Preferably, the liquid-crystalline medium comprises one or more compounds of the formulae Y-1 to Y-6

Y-1

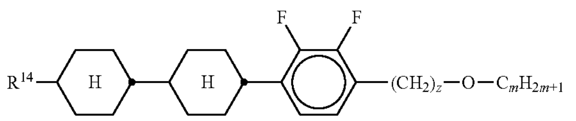

Y-2

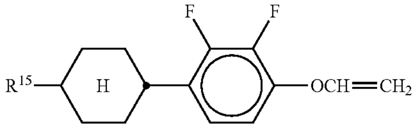

Y-3

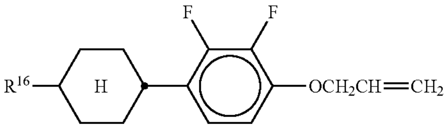

Y-4

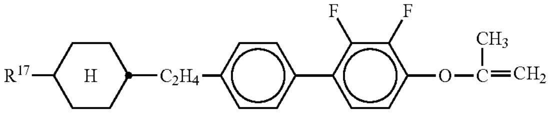

Y-5

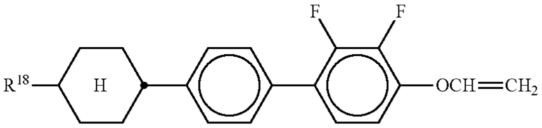

Y-6

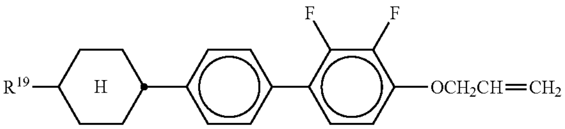

in which $R^{14}$-$R^{19}$ each, independently of one another, denote an alkyl or alkoxy radical having 1-6 C atoms, and z and m each, independently of one another, denote 1-6.

The medium according to the invention particularly preferably comprises one or more compounds of the formulae Y-1 to Y-6 in amounts of 5% by weight or more.

The proportion of compounds of the formula IIA in the medium as a whole is preferably at least 20% by weight, more preferably at least 25% by weight, even more preferably at least 30% by weight and in particular at least 35% by weight.

The liquid-crystalline media as provided and used according to the invention particularly preferably comprise one or more compounds selected from the group of the compounds of formulae IIA-1 and IIA-2 in a total amount of at least 10% by weight, more preferably at least 20% by weight, even more preferably at least 25% by weight and in particular at least 30% by weight, and/or one or more compounds of formula IIA-4, preferably in a total amount of at least 5% by weight, more preferably at least 10% by weight, and/or one or more compounds selected from the group of compounds of formulae IV-1 and IV-2, preferably in a total amount of at least 5% by weight, more preferably in the range of from 10% by weight to 25% by weight and even more preferably in the range of from 15% by weight to 20% by weight, and/or one or more compounds of formula IV-3, in particular the compound of formula IV-3-3, preferably in an amount of at least 5% by weight, more preferably in an amount of at least 9% by weight and even more preferably in an amount of at least 11% by weight, and/or one or more compounds of formula IVa-2, preferably in a total amount of 5% by weight or more, more preferably 8% by weight or more, even more preferably 10% by weight or more and in particular 15% by weight or more, and/or one or more compounds of formula V-1, preferably in a total amount of 8% by weight or more, more preferably 10% by weight or more, even more preferably 12% by weight or more and in particular 15% by weight or more, and/or one or more compounds of formula V-2, preferably in a total amount of at least 5% by weight, more preferably in the range of from 5% by weight to 7% by weight, and/or one or more compounds of formula V-10, preferably in a total amount of at least 5% by weight, more preferably in the range of from 8% by weight to 15% by weight, and/or one or more compounds of formula V-18, preferably in a total amount of at least 5% by weight, more preferably in the range of from 7% by weight to 13% by weight.

The media preferably comprise at least 3 compounds of the formula IIA, more preferably at least 4 compounds of the formula IIA and in particular at least 5 compounds of the formula IIA.

Polymerizable compounds, either non-mesogenic or mesogenic, the latter referred to as reactive mesogens (RMs), may furthermore be added to the mixtures according to the invention, preferably in concentrations of 0.1% by weight to 20% by weight.

The mixtures according to the invention may furthermore comprise conventional additives, such as, for example, stabilizers, antioxidants, UV absorbers, nanoparticles, microparticles, etc.

The liquid-crystalline medium according to the invention or the nematic host preferably exhibit very broad nematic phase ranges. In particular, the liquid-crystalline medium as used in the switching device preferably has a nematic phase at the operating temperature of the switching device. It is particularly preferably nematically liquid crystalline in a range of +/−20° C., very particularly preferably in a range of +/−30° C. above and below the operating temperature of the switching device. Preferably, the liquid-crystalline media have favorable values of the capacitive threshold, relatively high values of the voltage holding ratio and at the same time very good low-temperature stabilities at −20° C., −30° C. and −40° C., as well as low rotational viscosities and short response times and in addition preferably exhibit improvements in terms of the rotational viscosity $\gamma_1$.

In particular, the liquid-crystal media according to the invention preferably have high values for the voltage holding ratio in liquid-crystal cells.

All physical properties and physicochemical or electro-optical parameters are determined by generally known methods, in particular according to "Merck Liquid Crystals, Physical Properties of Liquid Crystals", Status November 1997, Merck KGaA, Germany and are given for a temperature of 20° C., unless explicitly stated otherwise.

Herein, unless explicitly stated otherwise, all concentrations are given in weight percent, i.e. percent data denote percent by weight, and relate to the respective complete mixture, and all temperature values indicated are in ° C.

Transmission and scattering of light preferably refer to the transmission and scattering of electromagnetic radiation in the spectral range from 380 nm to 780 nm.

For the present invention, the term "threshold voltage" relates to the capacitive threshold ($V_0$), also known as the Freedericks threshold, unless explicitly indicated otherwise.

Herein and in the Working Examples, the structures of the liquid-crystal compounds are indicated by means of acronyms. Unless indicated otherwise, the transformation into chemical formulae is carried out in accordance with Tables 1-3. All radicals $C_nH_{2n+1}$, $C_mH_{2m+1}$ and $C_{m'}H_{2m'+1}$ or $C_nH_{2n}$ and $C_mH_{2m}$ are straight-chain alkyl radicals or alkylene radicals, in each case having n, m, m' or z C atoms respectively. n, m, m' and z each, independently of one another, denote 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

TABLE 1

| Ring elements | |
|---|---|
| 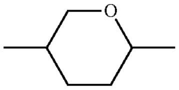 A | 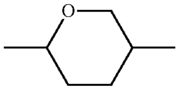 AI |
| 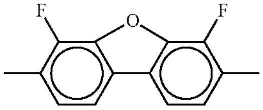 B | 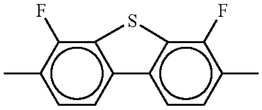 B(S) |
| 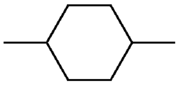 C | |
| 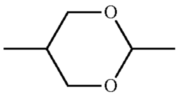 D | 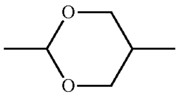 DI |
| 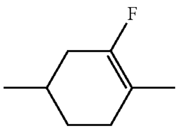 F | 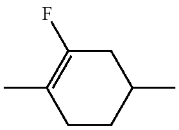 FI |
| 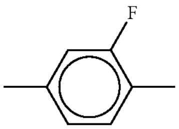 G | 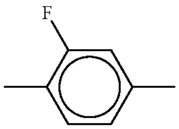 GI |

TABLE 1-continued

| Ring elements | |
|---|---|
| 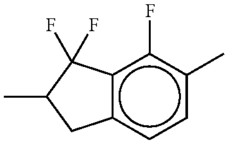 K | |
| 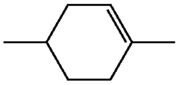 L | 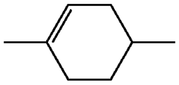 LI |
| 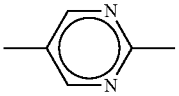 M | 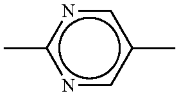 MI |
| 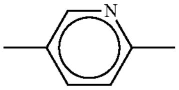 N | 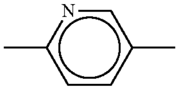 NI |
| 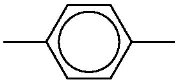 P | |
| 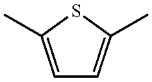 S | |
| 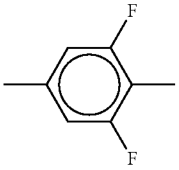 U | 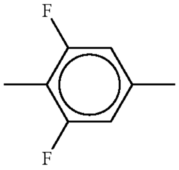 UI |
| 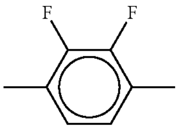 Y | |
| 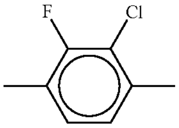 Y(F,Cl) | 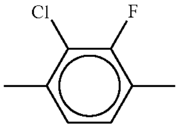 Y(Cl,F) |

TABLE 2

| Bridging members | |
|---|---|
| E | $—CH_2CH_2—$ |
| V | —CH═CH— |
| T | —C≡O— |
| W | $—CF_2CF_2—$ |

TABLE 2-continued

| Bridging members | | | |
|---|---|---|---|
| Z | —COO— | Zl | —OCO— |
| O | $—CH_2O—$ | Ol | $—OCH_2—$ |
| Q | $—CF_2O—$ | Ql | $—OCF_2—$ |

TABLE 3

| Side chains | | | |
|---|---|---|---|
| Left-hand side chain | | Right-hand side chain | |
| n- | $C_nH_{2n+1}—$ | -n | $—C_nH_{2n+1}$ |
| nO- | $C_nH_{2n+1}—O—$ | -On | $—O—C_nH_{2n+1}$ |
| V- | $CH_2$═CH— | -V | —CH═$CH_2$ |
| nV- | $C_nH_{2n+1}$—CH═CH— | -nV | $—C_nH_{2n}$—CH═$CH_2$ |
| Vn- | $CH_2$═CH-$C_nH_{2n}—$ | -Vn | —CH═CH—$C_nH_{2n+1}$ |
| nVm- | $C_nH_{2n+1}$—CH═CH—$C_mH_{2m}—$ | -nVm | $—C_nH_{2n}$—CH═CH—$C_mH_{2n1+1}$ |
| N- | N≡C— | -N | —C≡N |
| F- | F— | -F | —F |
| Cl- | Cl— | -Cl | —Cl |
| M- | $CFH_2—$ | -M | $—CFH_2$ |
| D- | $CF_2H—$ | -D | $—CF_2H$ |
| T- | $CF_3—$ | -T | $—CF_3$ |
| MO- | $CFH_2O—$ | -OM | $—OCFH_2$ |
| DO- | $CF_2HO—$ | -OD | $—OCF_2H$ |
| TO- | $CF_3O—$ | -OT | $—OCF_3$ |
| T- | $CF_3—$ | -T | $—CF_3$ |
| A- | H—C≡C— | -A | —C≡C—H |

Among and/or besides the compounds of the formula IIA, the mixtures according to the invention preferably comprise one or more of the compounds from Table A indicated below.

TABLE A

The following abbreviations are used:
n, m, m', z each, independently of one another, denote 1, 2, 3, 4, 5, 6, 7, 8 or 9, preferably 1, 2, 3, 4, 5 or 6;
$(O)C_mH_{2m+1}$ means $OC_mH_{2m+1}$ or $C_mH_{2m+1}$

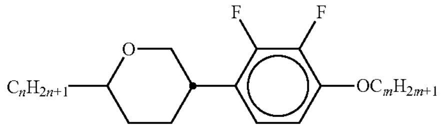

AIY-n-Om

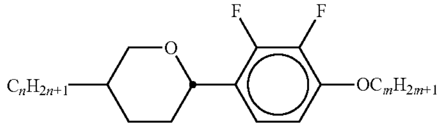

AY-n-Om

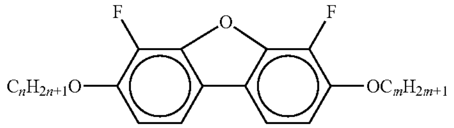

B-nO-Om

TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
| --- |
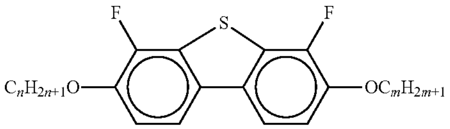
B(S)-nO-Om
BCH-nm
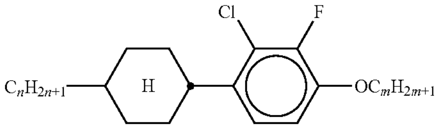
CY(Cl,F)-n-Om
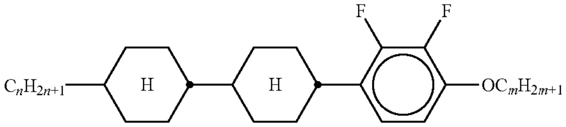
CCY-n-Om
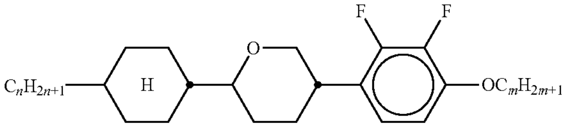
CAIY-n-Om
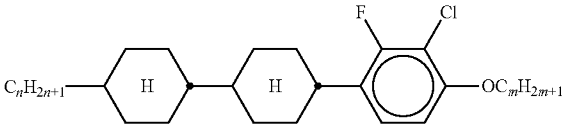
CCY(F,Cl)-n-Om
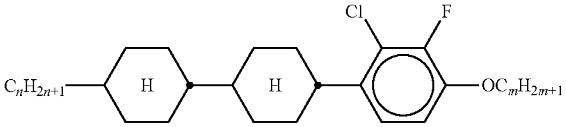
CCY(Cl,F)-n-Om
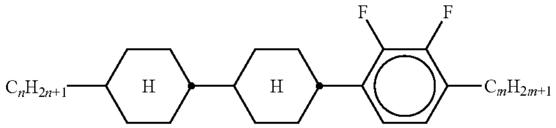
CCY-n-m TABLE A-continued
The following abbreviations are used:
n, m, m', z each, independently of one another, denote 1, 2, 3, 4, 5, 6, 7, 8 or 9, preferably 1, 2, 3, 4, 5 or 6;
(O)$C_mH_{2m+1}$ means $OC_mH_{2m+1}$ or $C_mH_{2m+1}$
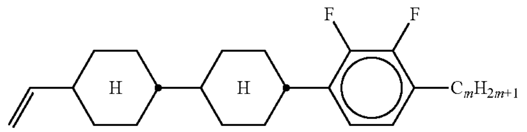
CCY-V-m
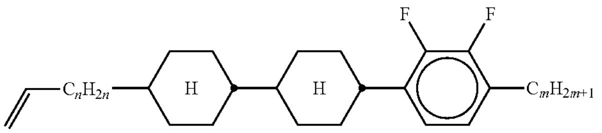
CCY-Vn-m
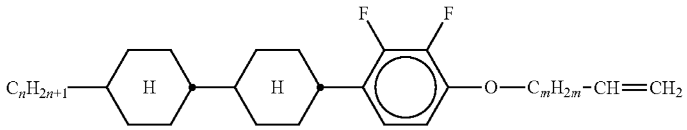
CCY-n-OmV
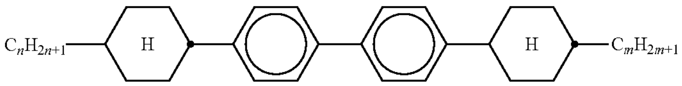
CBC-nm
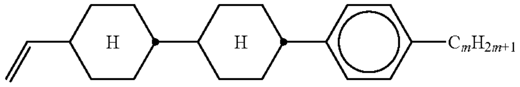
CCP-V-m
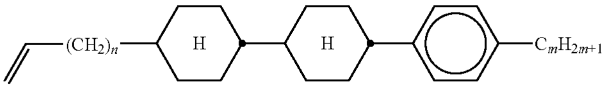
CCP-Vn-m
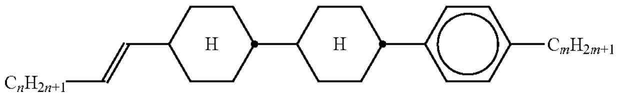
CCP-nV-m
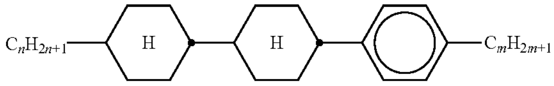
CCP-n-m
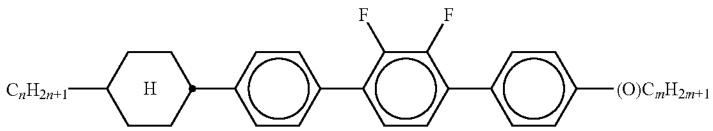
CPYP-n-(O)m TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
|---|
| 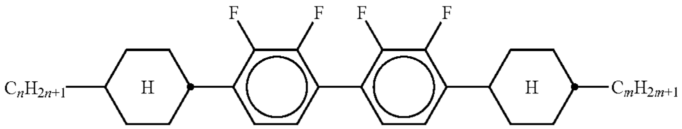 CYYC-n-m |
| 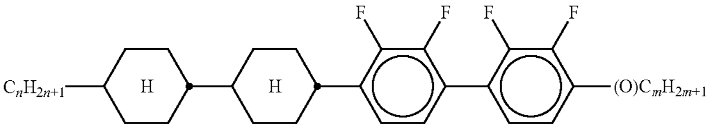 CCYY-n-(O)m |
| 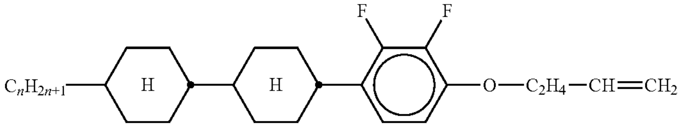 CCY-n-O2V |
| 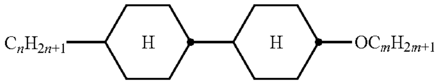 CCH-nOm |
| 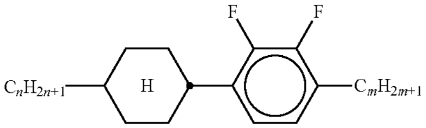 CY-n-m |
| 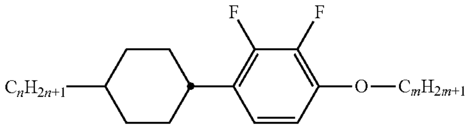 CY-n-Om |
| 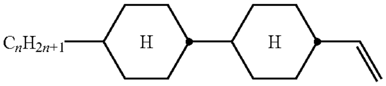 CC-n-V |
| 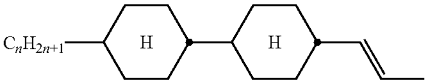 CC-n-V1 |
| 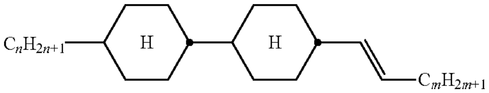 CC-n-Vm |

TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
|---|
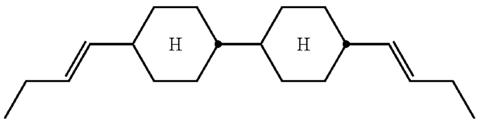
CC-2V-V2
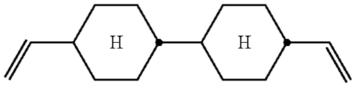
CC-V-V
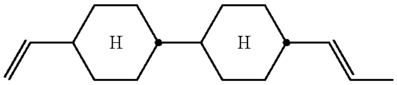
CC-V-V1
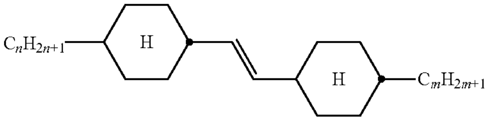
CVC-n-m
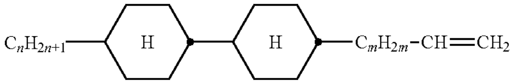
CC-n-mV
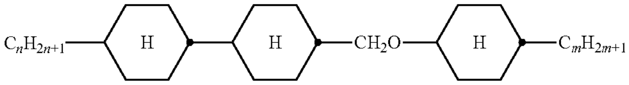
CCOC-n-m
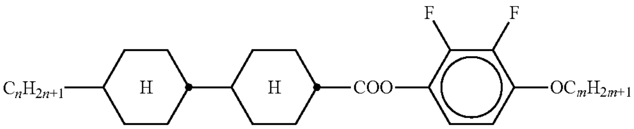
CP-nOmFF
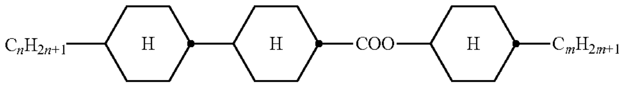
CH-nm
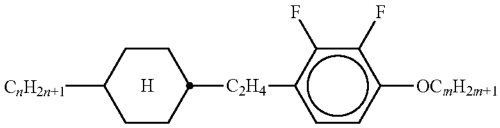
CEY-n-Om TABLE A-continued
The following abbreviations are used:
n, m, m', z each, independently of one another, denote 1, 2, 3, 4, 5, 6, 7, 8 or 9, preferably 1, 2, 3, 4, 5 or 6;
(O)$C_mH_{2m+1}$ means $OC_mH_{2m+1}$ or $C_mH_{2m+1}$
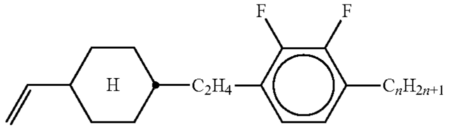
CEY-V-n
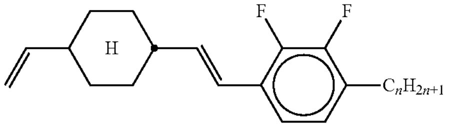
CVY-V-n
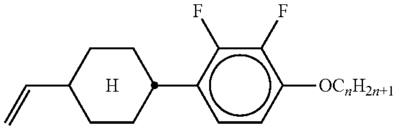
CY-V-On
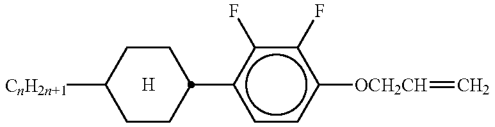
CY-n-O1V
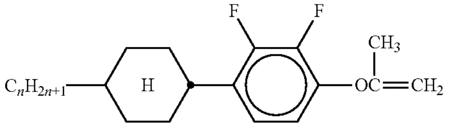
CY-n-OC($CH_3$)$=$$CH_2$
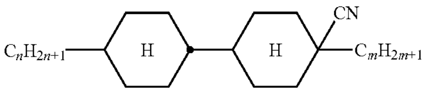
CCN-nm
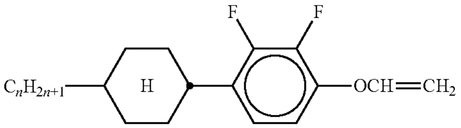
CY-n-OV
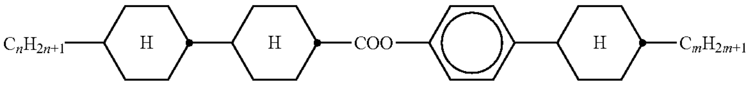
CCPC-nm TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
|---|
| 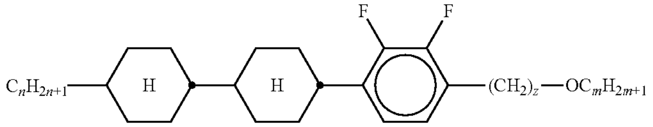 |
| CCY-n-zOm |
| 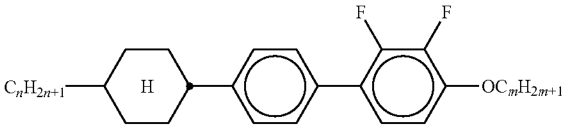 |
| CPY-n-Om |
| 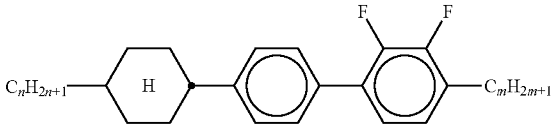 |
| CPY-n-m |
| 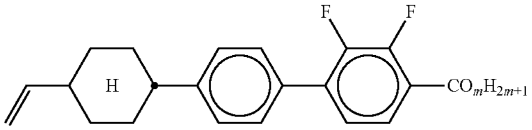 |
| CPY-V-Om |
| 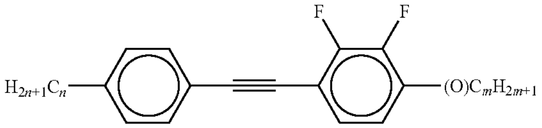 |
| PTY-n-(O)m |
| 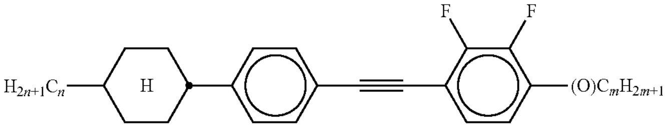 |
| CPTY-n-(O)m |
| 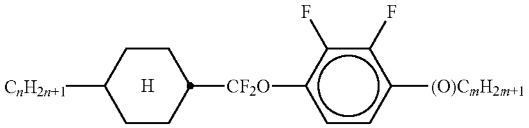 |
| CQY-n-(O)m |
| 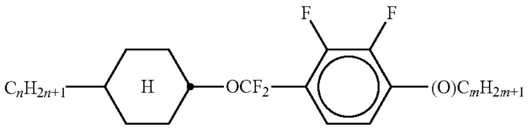 |
| CQIY-n-(O)m |

TABLE A-continued
| The following abbreviations are used: n, m, m', z each, independently of one another, denote 1, 2, 3, 4, 5, 6, 7, 8 or 9, preferably 1, 2, 3, 4, 5 or 6; $(O)C_mH_{2m+1}$ means $OC_mH_{2m+1}$ or $C_mH_{2m+1}$ |
|---|
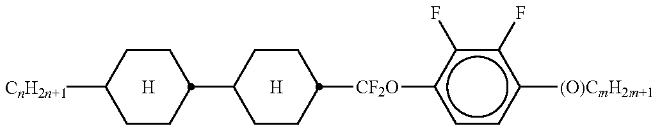
CCQY-n-(O)m
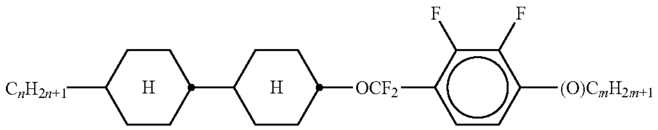
CCQIY-n-(O)m
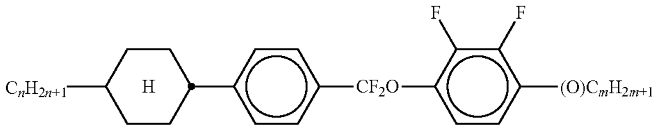
CPQY-n-(O)m
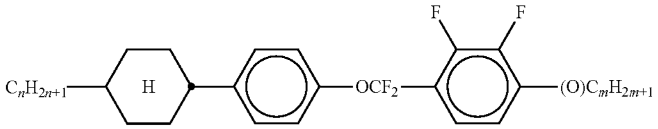
CPQIY-n-(O)m
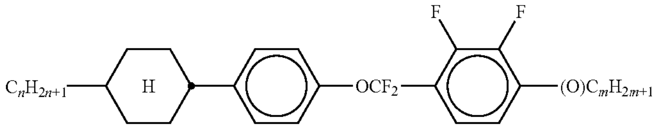
CPQIY-n-(O)m
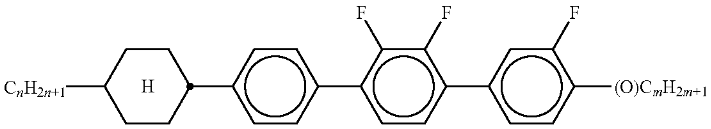
CPYG-n-(O)m
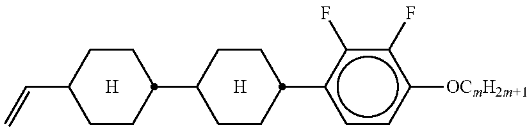
CCY-V-Om TABLE A-continued
The following abbreviations are used:
n, m, m', z each, independently of one another, denote 1, 2, 3, 4, 5, 6, 7, 8 or 9, preferably 1, 2, 3, 4, 5 or 6;
(O)$C_mH_{2m+1}$ means $OC_mH_{2m+1}$ or $C_mH_{2m+1}$
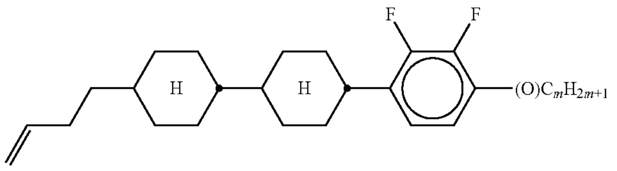
CCY-V2-(O)m
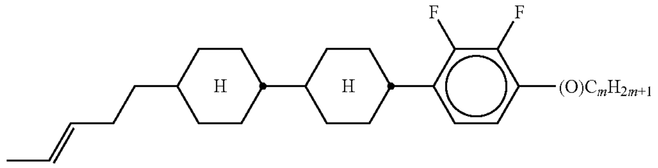
CCY-1V2-(O)m
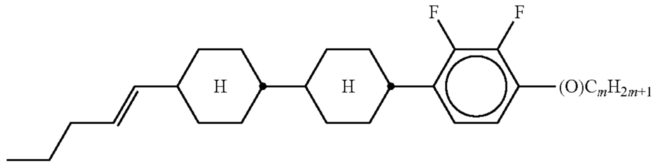
CCY-3V-(O)m
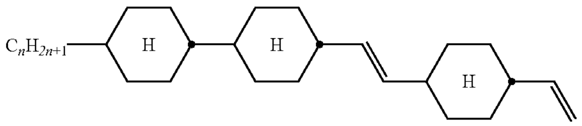
CCVC-n-V
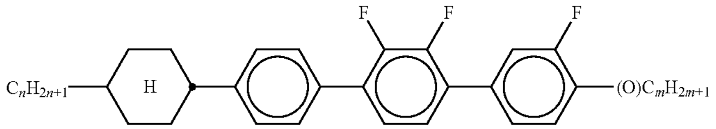
CPYG-n-(O)m
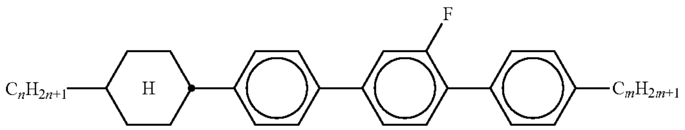
CPGP-n-m
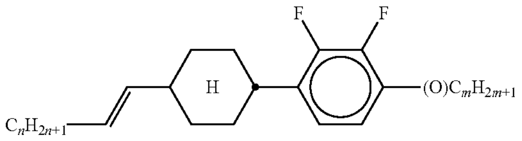
CY-nV-(O)m TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
|---|
| 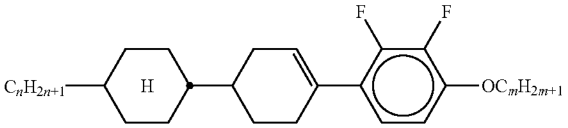 |
| CLY-n-Om |
| 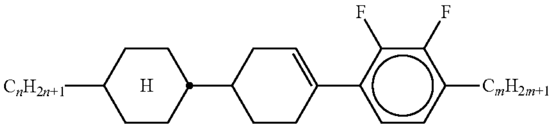 |
| CLY-n-m |
| 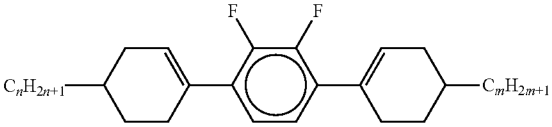 |
| LYLI-n-m |
| 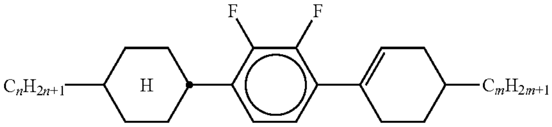 |
| CYLI-n-m |
| 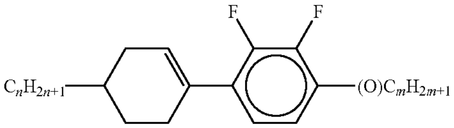 |
| LY-n-(O)m |
| 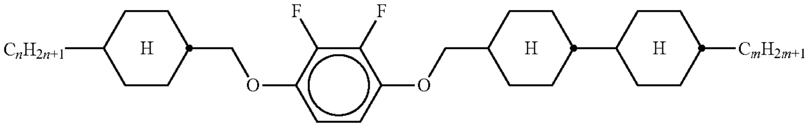 |
| COYOICC-n-m |
| 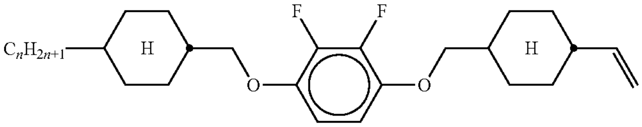 |
| COYOIC-n-V |
| 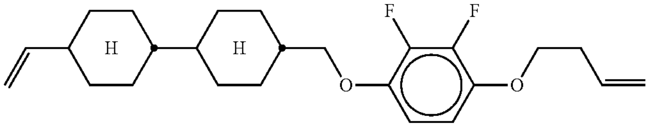 |
| CCOY-V-O2V |

TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
|---|
| 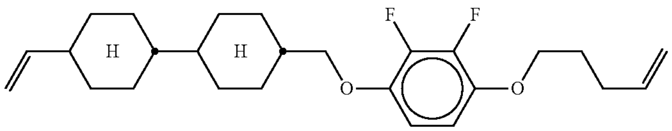 |
| CCOY-V-O3V |
| 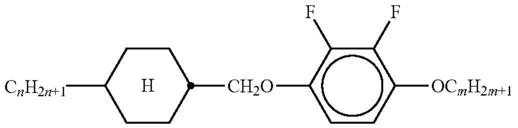 |
| COY-n-Om |
| 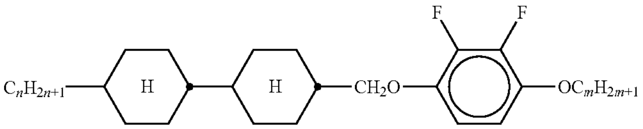 |
| CCOY-n-Om |
| 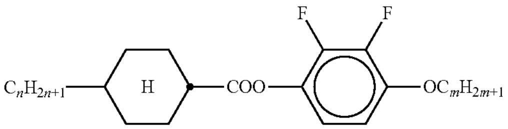 |
| D-nOmFF |
| 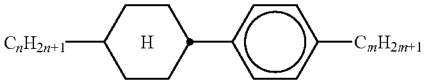 |
| PCH-nm |
| 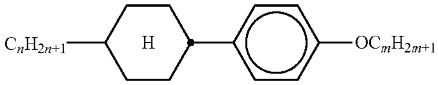 |
| PCH-nOm |
| 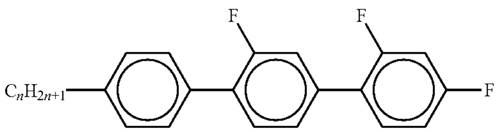 |
| PGIGI-n-F |
| 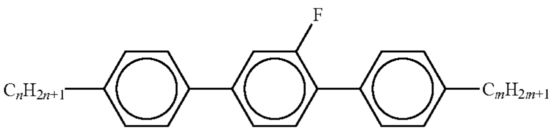 |
| PGP-n-m |

TABLE A-continued
The following abbreviations are used:
n, m, m', z each, independently of one another, denote 1, 2, 3, 4, 5, 6, 7, 8 or 9, preferably 1, 2, 3, 4, 5 or 6;
$(O)C_mH_{2m+1}$ means $OC_mH_{2m+1}$ or $C_mH_{2m+1}$
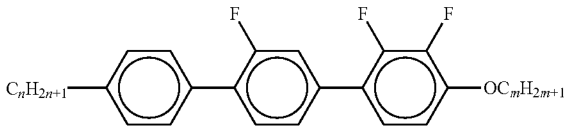
PGIY-n-Om
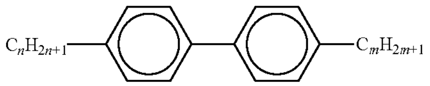
PP-n-m
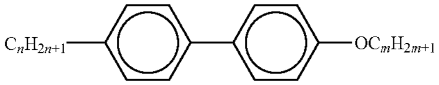
PP-n-Om
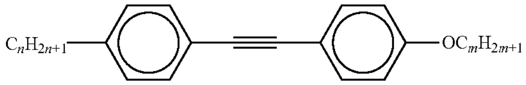
PTP-n-Om
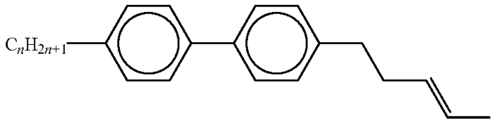
PP-n-2V1
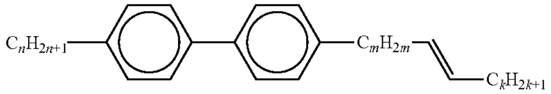
PP-n-mVK
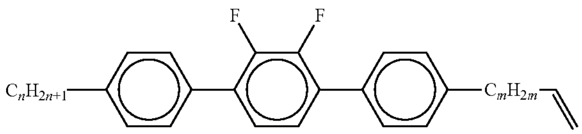
PYP-n-mV
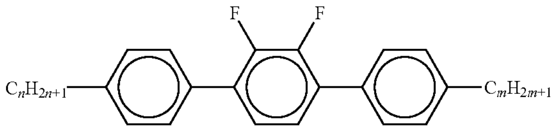
PYP-n-m TABLE A-continued
The following abbreviations are used:
n, m, m', z each, independently of one another, denote 1, 2, 3, 4, 5, 6, 7, 8 or 9, preferably 1, 2, 3, 4, 5 or 6;
(O)$C_mH_{2m+1}$ means $OC_mH_{2m+1}$ or $C_mH_{2m+1}$
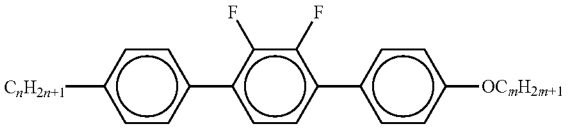
PYP-n-Om
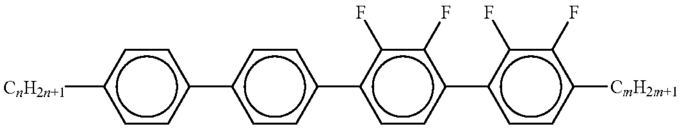
PPYY-n-m
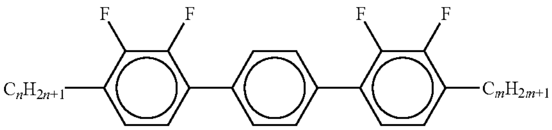
YPY-n-m
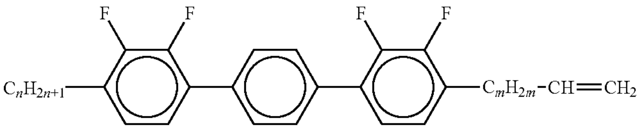
YPY-n-mV
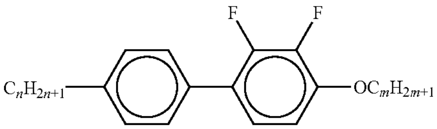
PY-n-Om
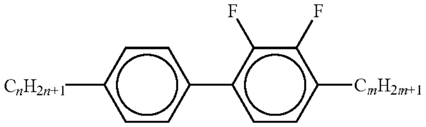
PY-n-m
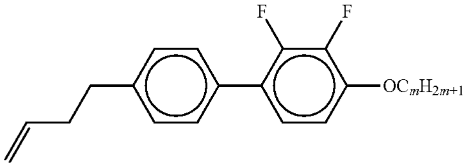
PY-V2-Om TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
| --- |
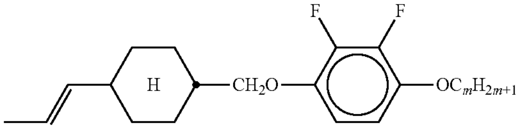
COY-1V-Om
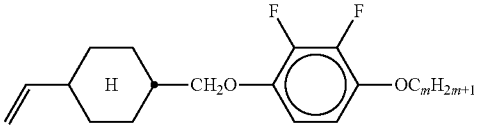
COY-V-Om
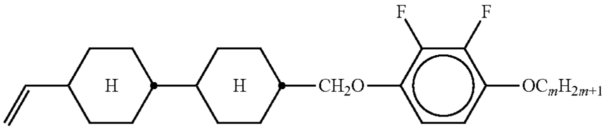
CCOY-V-Om
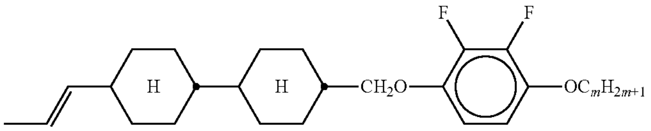
CCOY-1V-Om
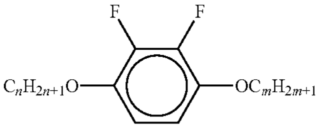
Y-nO-Om
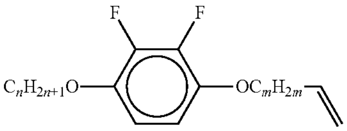
Y-nO-OmV
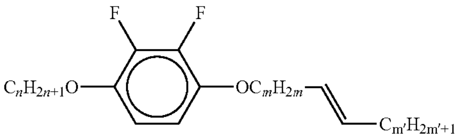
Y-nO-OmVm'

TABLE A-continued
| The following abbreviations are used: n, m, m', z each, independently of one another, denote 1, 2, 3, 4, 5, 6, 7, 8 or 9, preferably 1, 2, 3, 4, 5 or 6; (O)$C_mH_{2m+1}$ means $OC_mH_{2m+1}$ or $C_mH_{2m+1}$ |
|---|
| 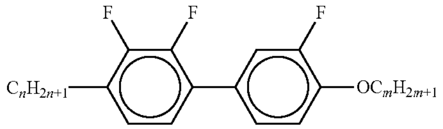 |
| YG-n-Om |
| 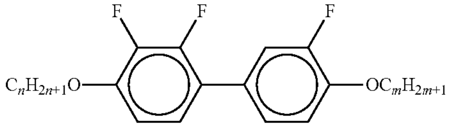 |
| YG-nO-Om |
| 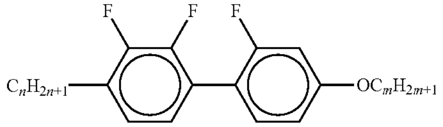 |
| YGI-n-Om |
| 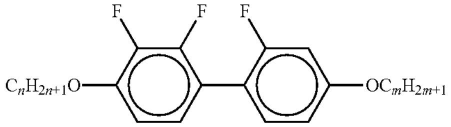 |
| YGI-nO-Om |
| 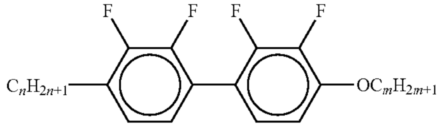 |
| YY-n-Om |
| 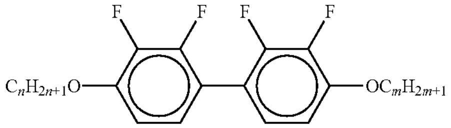 |
| YY-nO-Om |
| 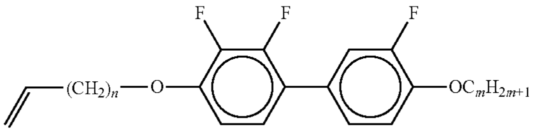 |
| YG-VnO-Om |
| 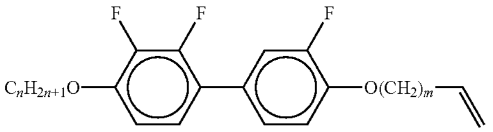 |
| YG-nO-OmV |

TABLE A-continued

| The following abbreviations are used: n, m, m', z each, independently of one another, denote 1, 2, 3, 4, 5, 6, 7, 8 or 9, preferably 1, 2, 3, 4, 5 or 6; $(O)C_mH_{2m+1}$ means $OC_mH_{2m+1}$ or $C_mH_{2m+1}$ |
| --- |
| 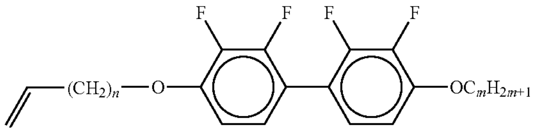 YY-VnO-Om |

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The mixtures may also comprise further additives known to the person skilled in the art and described in the literature, such as, for example, UV absorbers, antioxidants, nanoparticles and free-radical scavengers. For example, stabilizers or chiral dopants may be added. Suitable stabilizers for the mixtures according to the invention are, in particular, those listed in Table C.

TABLE B

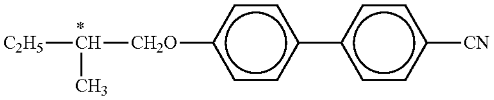

C 15

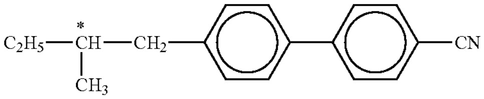

CB 15

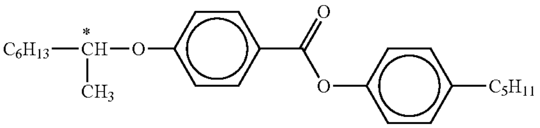

CM 21

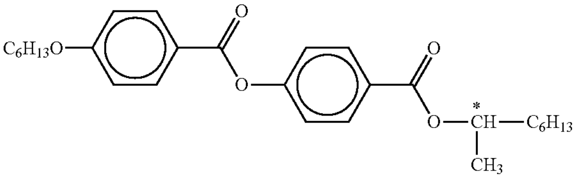

R/S-811

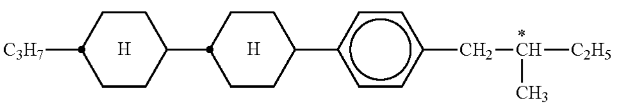

CM 44

TABLE B-continued
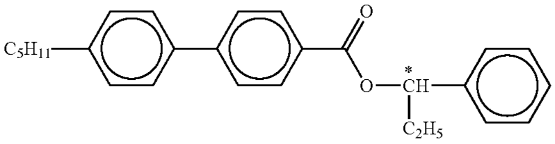
CM 45
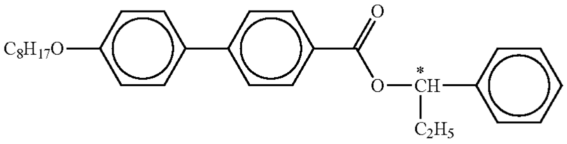
CM 47
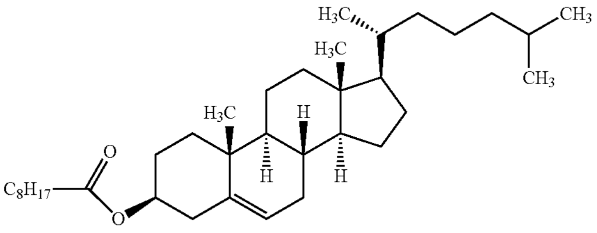
CN
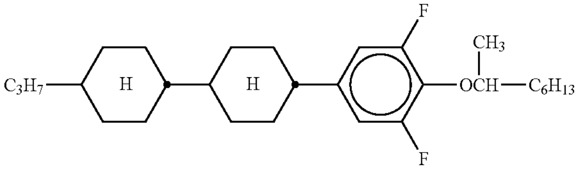
R/S-2011
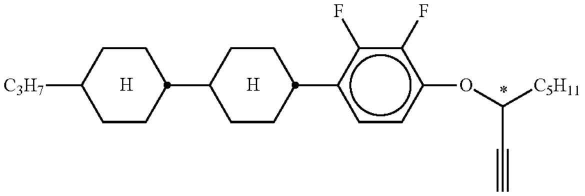
R/S-3011
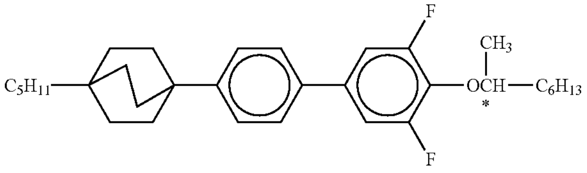
R/S-4011
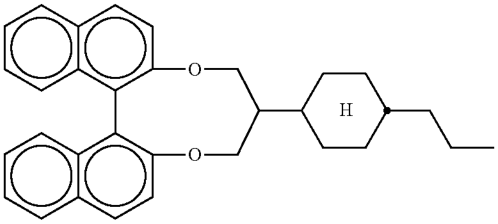
R/S-5011

TABLE B-continued

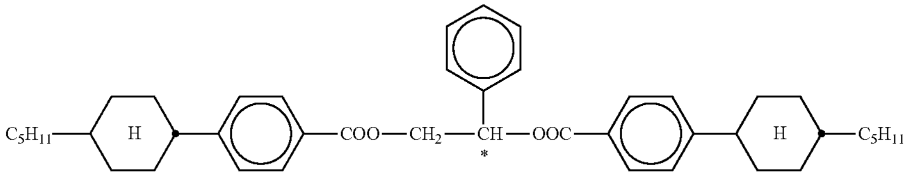

R/S-1011

Table B shows possible chiral dopants which may optionally be added to the mixtures according to the invention. The mixtures preferably comprise 0-10% by weight, in particular 0.01-5% by weight and particularly preferably 0.1-3% by weight of chiral dopants. If the mixtures comprise only one chiral dopant, it is preferably employed in an amount of 0.01-4% by weight, more preferably 0.1-1.0% by weight.

TABLE C

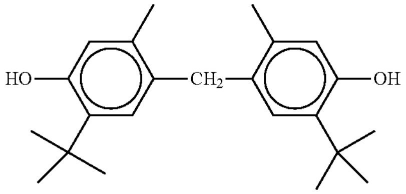

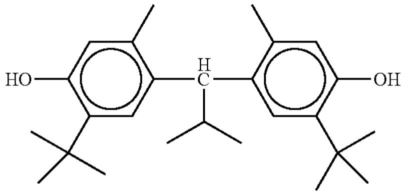

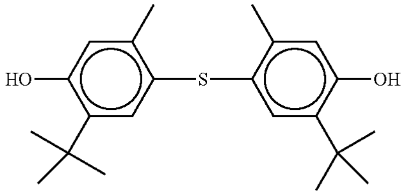

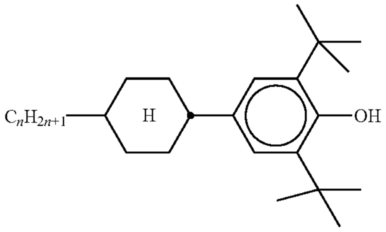

n = 1, 2, 3, 4, 5, 6 or 7

TABLE C-continued
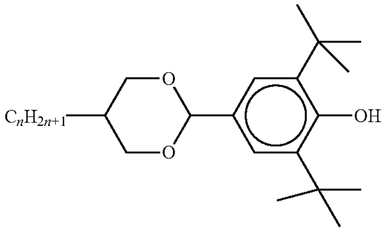
n = 1, 2, 3, 4, 5, 6 or 7
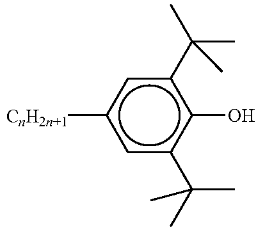
n = 1, 2, 3, 4, 5, 6 or 7
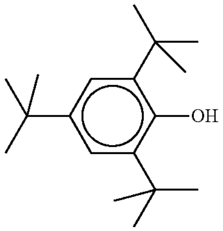
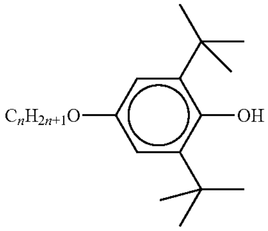
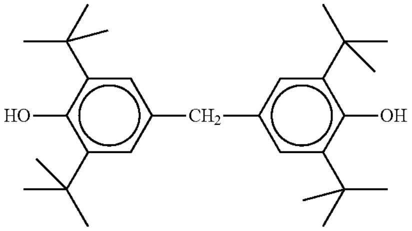
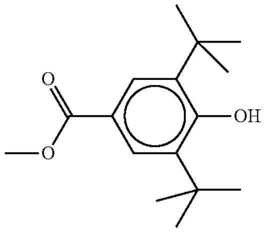

TABLE C-continued
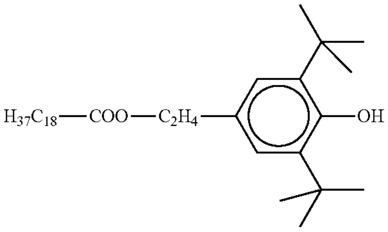
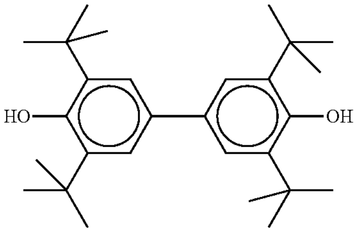
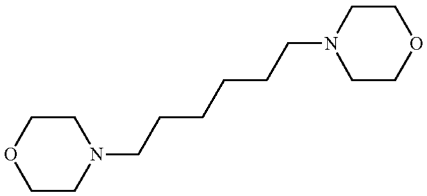 [SMILES: C(CCCN1CCOCC1)CCN1CCOCC1]
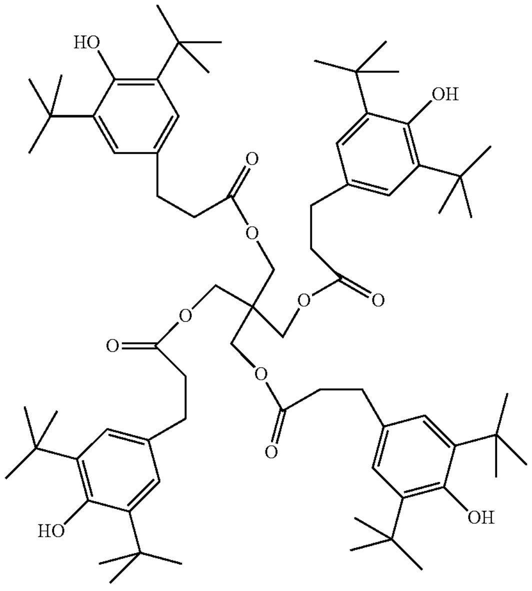 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
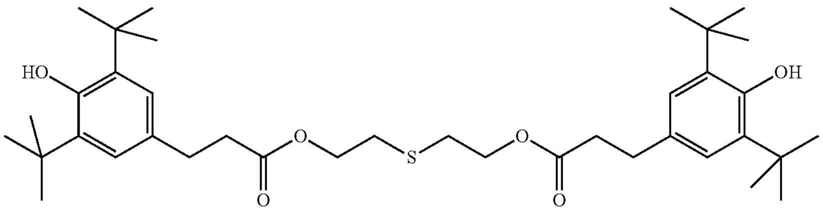 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
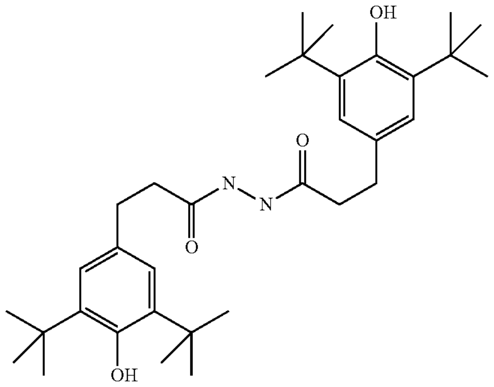 [SMILES: CC(C)(C)c1cc(CCC(=O)NNC(=O)CCc2cc(C(C)(C)C)c(O)c(C(C)(C)C)c2)cc(C(C)(C)C)c1O]
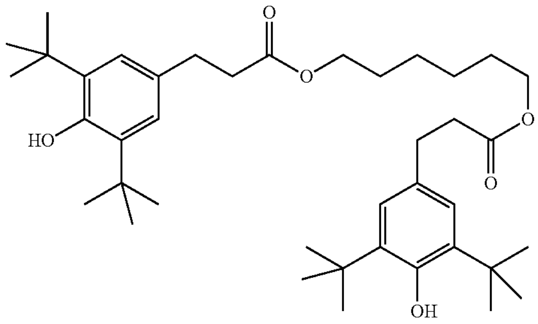 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
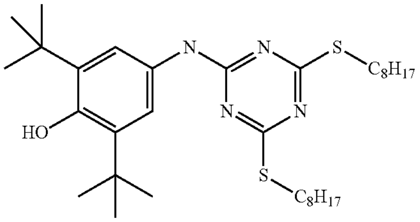
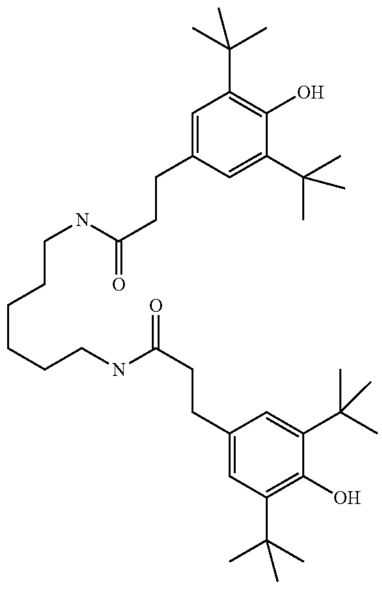 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
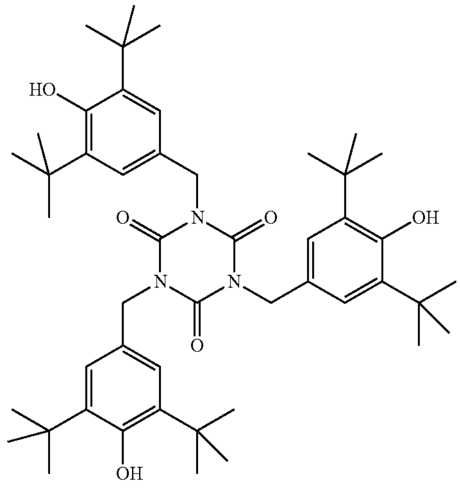 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
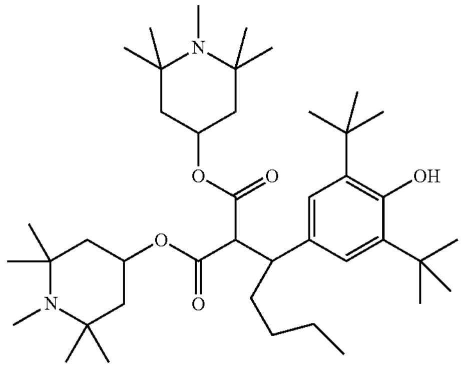 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
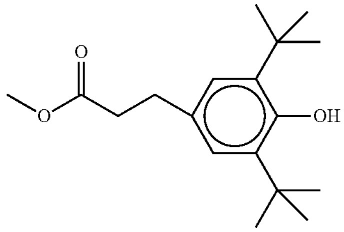
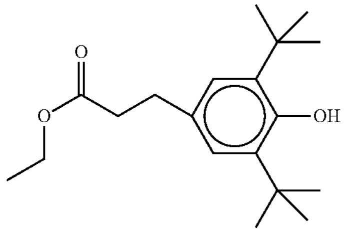
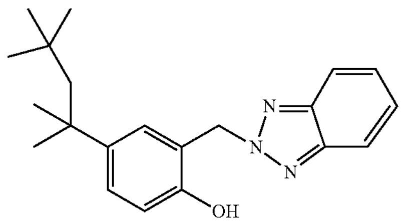 [SMILES: CC(C)(C)CC(C)(C)c1ccc(O)c(Cn2nc3ccccc3n2)c1]

TABLE C-continued
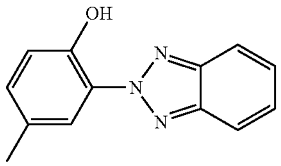 [SMILES: Cc1ccc(O)c(-n2nc3ccccc3n2)c1]
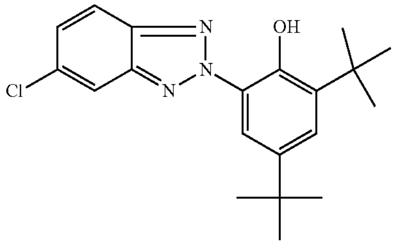 [SMILES: CC(C)(C)c1cc(-n2nc3ccc(Cl)cc3n2)c(O)c(C(C)(C)C)c1]
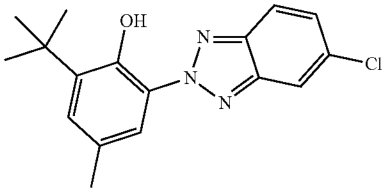 [SMILES: Cc1cc(-n2nc3ccc(Cl)cc3n2)c(O)c(C(C)(C)C)c1]
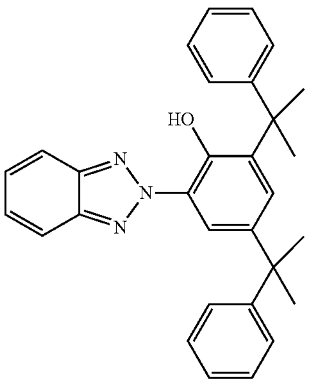 [SMILES: CC(C)(c1ccccc1)c1cc(-n2nc3ccccc3n2)c(O)c(C(C)(C)c2ccccc2)c1]
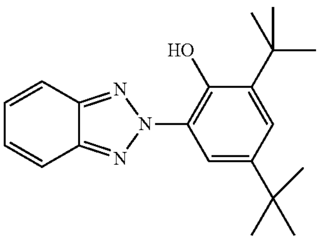 [SMILES: CC(C)(C)c1cc(-n2nc3ccccc3n2)c(O)c(C(C)(C)C)c1]
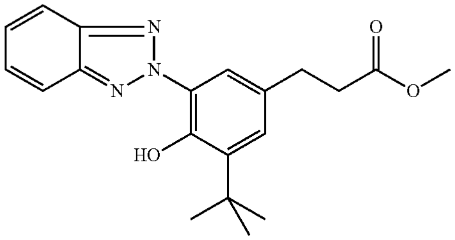 [SMILES: COC(=O)CCc1cc(-n2nc3ccccc3n2)c(O)c(C(C)(C)C)c1]

TABLE C-continued
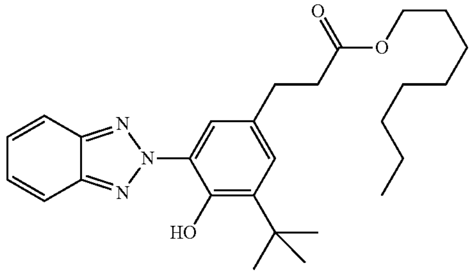 [SMILES: CCCCCCCCOC(=O)CCc1cc(-n2nc3ccccc3n2)c(O)c(C(C)(C)C)c1]
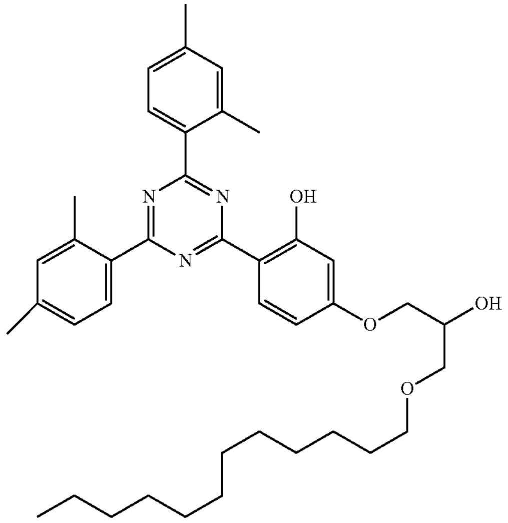
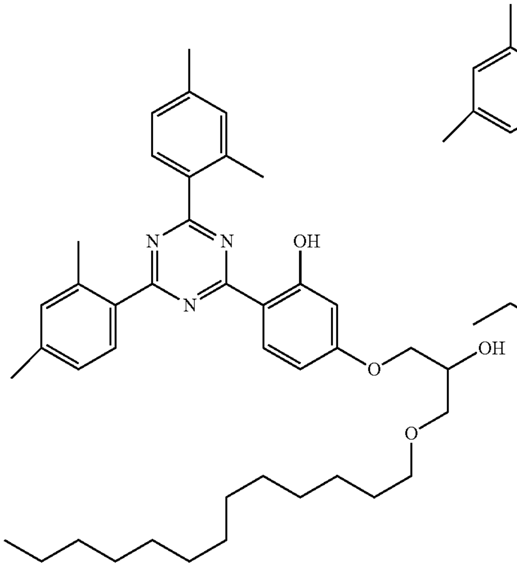
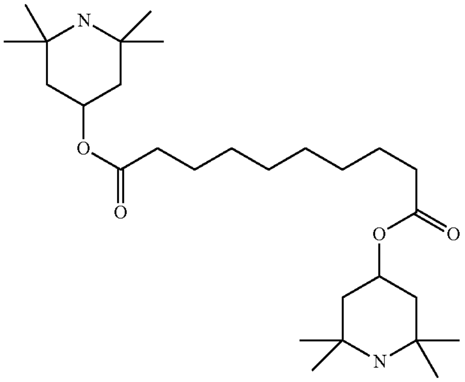

TABLE C-continued
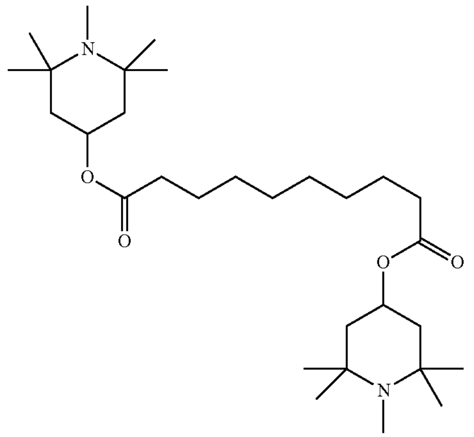
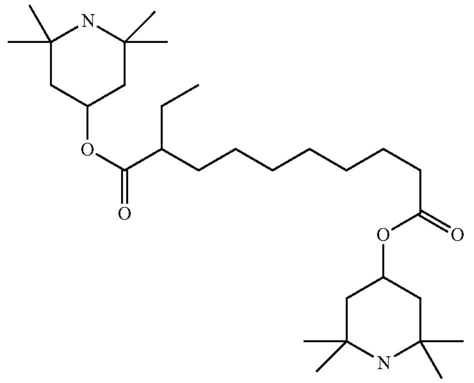
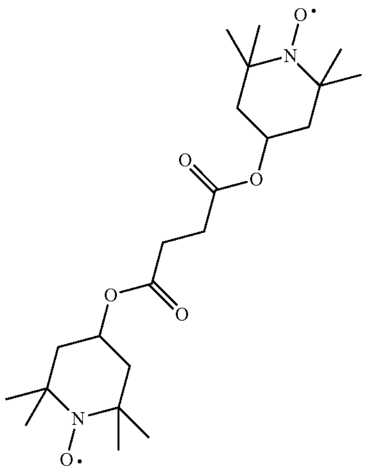

TABLE C-continued

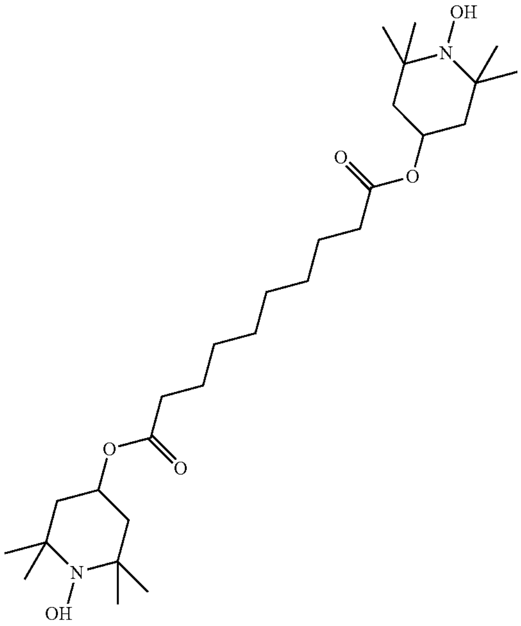

Stabilizers which can preferably be added to the mixtures according to the invention in amounts of 0-10% by weight, preferably 0.01-3% by weight, are shown below.

The medium according to the invention particularly preferably comprises Tinuvin® 770 (bis(2,2,6,6-tetramethyl-4-piperidyl) sebacate), preferably in amounts of 0.001-5% by weight, based on the liquid-crystalline medium.

Examples of preferred dichroic dyes which may optionally be added to the liquid-crystalline media according to the invention are listed in Table D.

TABLE D

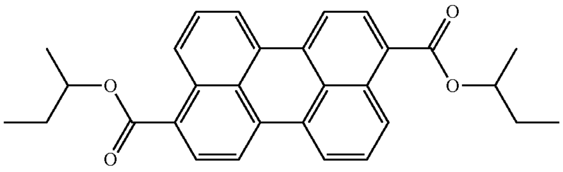 [SMILES: CCC(C)OC(=O)c1ccc2c3cccc4c(C(=O)OC(C)CC)ccc(c5cccc1c52)c43]

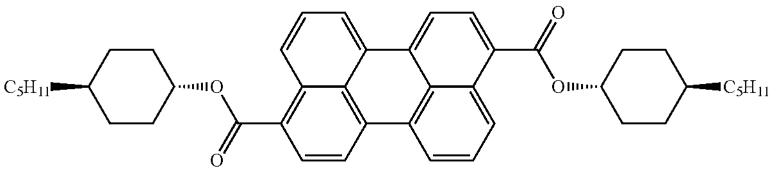

TABLE D-continued
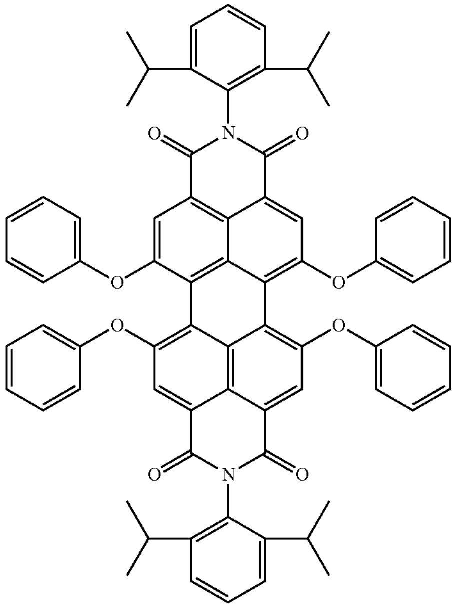 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]
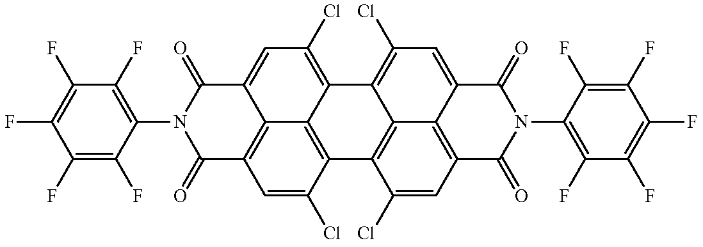 [SMILES: O=C1c2cc(Cl)c3c4c(Cl)cc5c6c(cc(Cl)c(c7c(Cl)cc(c2c37)C(=O)N1c1c(F)c(F)c(F)c(F)c1F)c64)C(=O)N(c1c(F)c(F)c(F)c(F)c1F)C5=O]
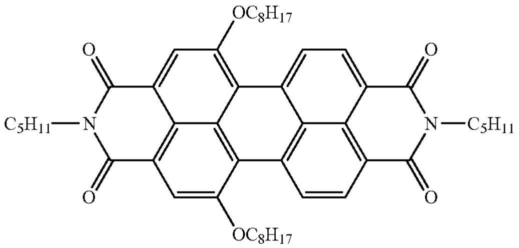
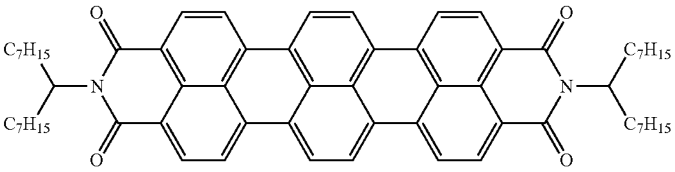

TABLE D-continued
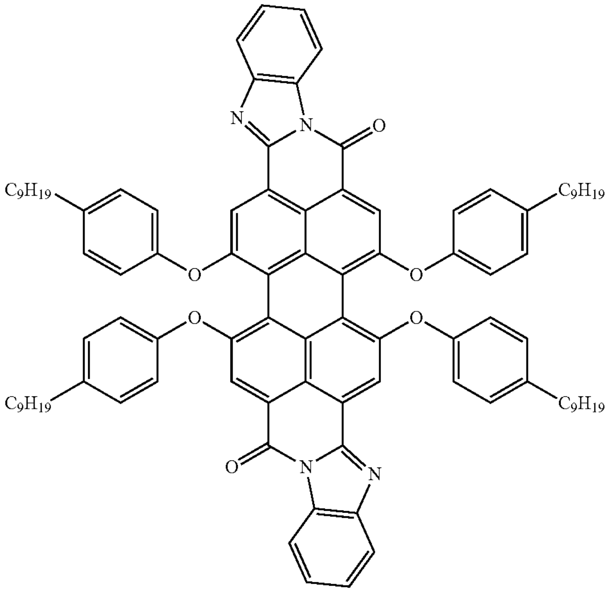
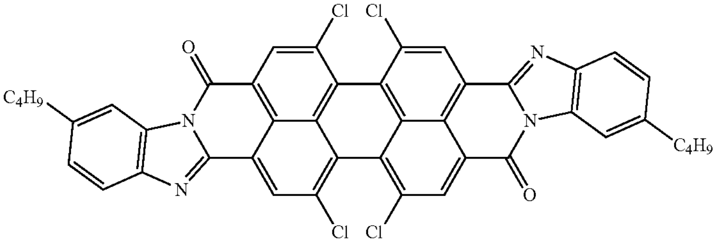
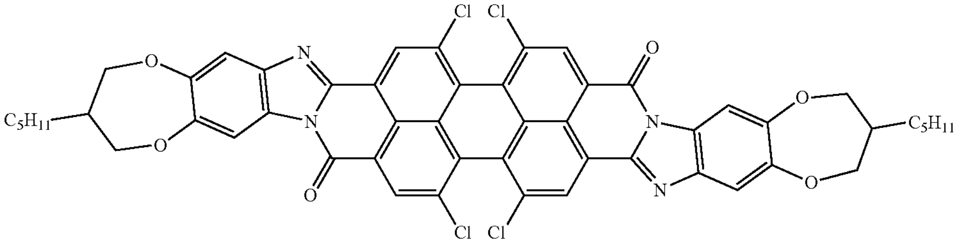
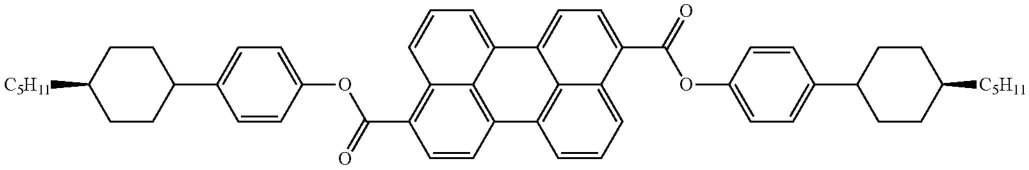
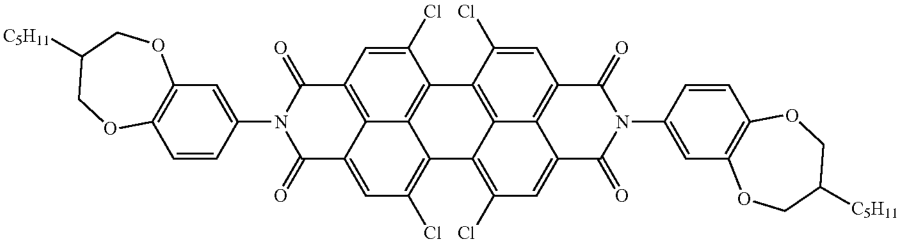

TABLE D-continued
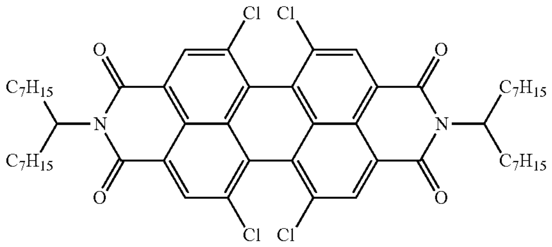
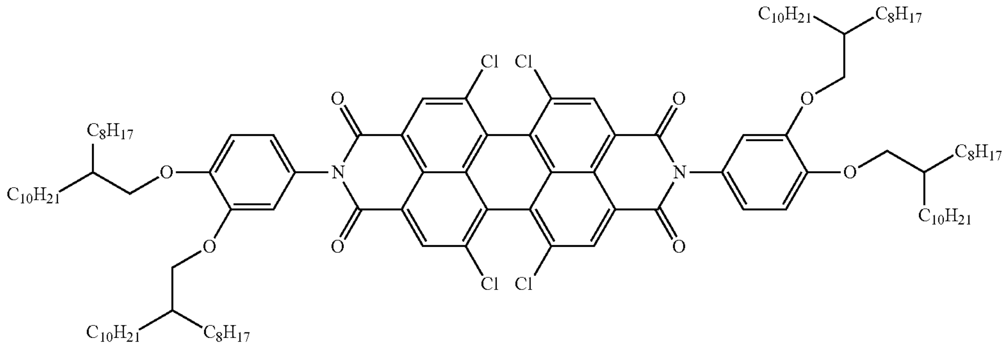
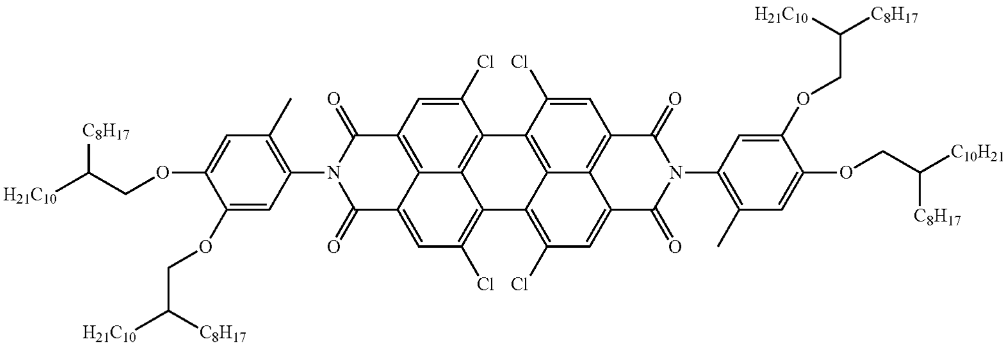
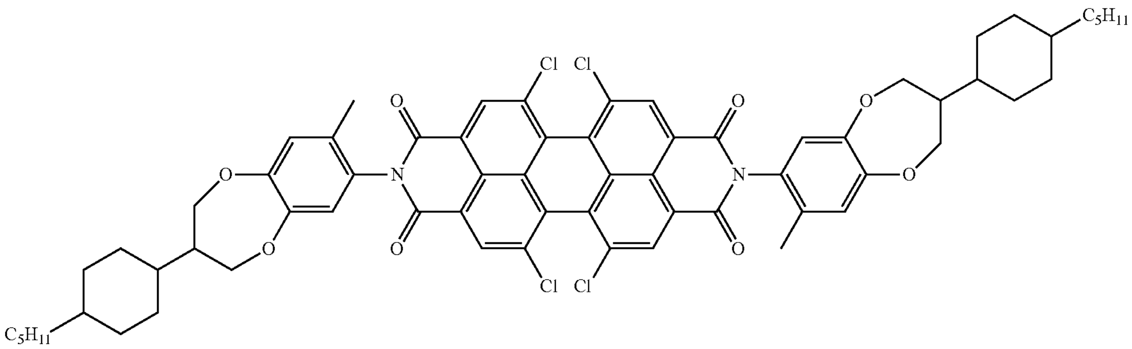
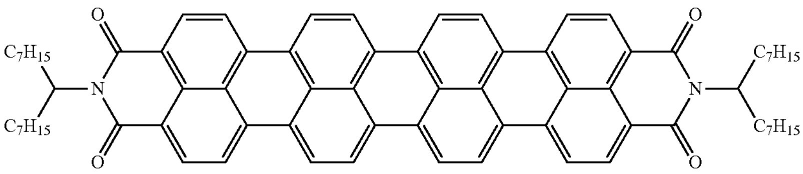

TABLE D-continued
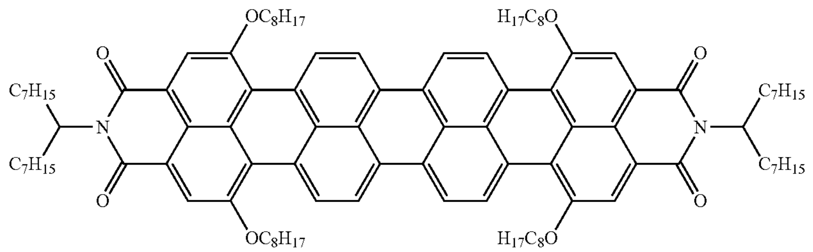
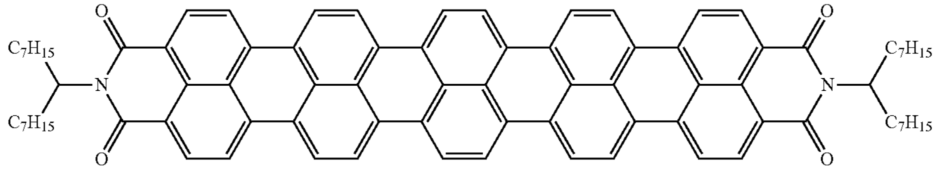
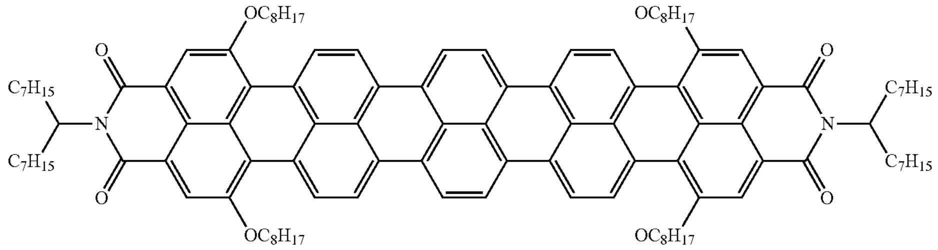
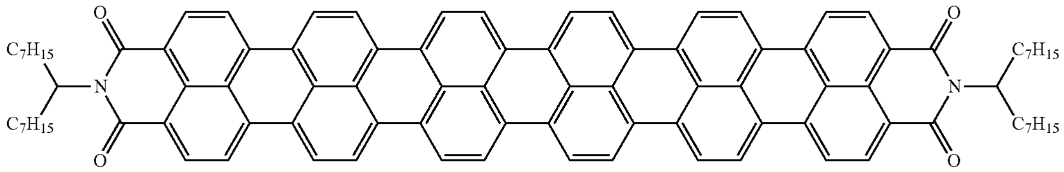
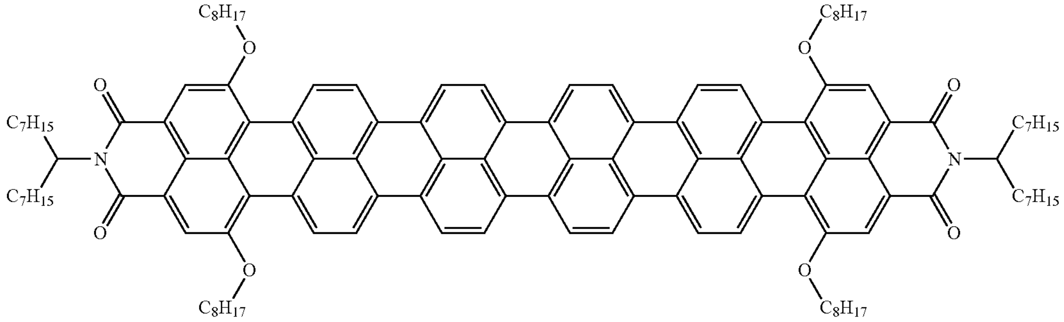
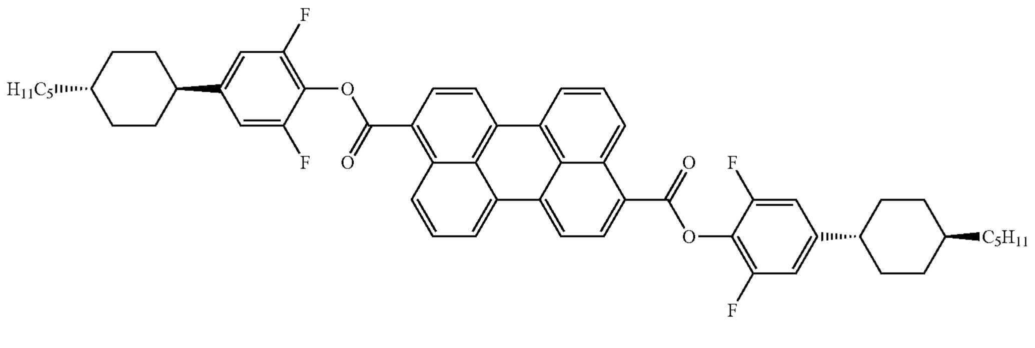

TABLE D-continued
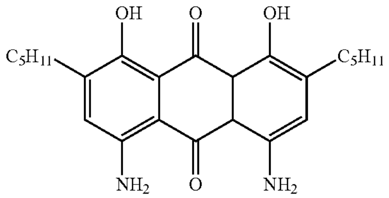
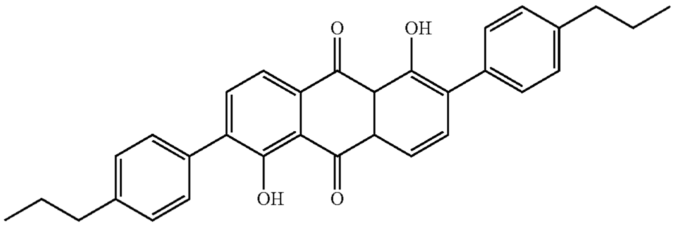 [SMILES: CCCc1ccc(C2=C(O)C3C(=O)c4ccc(-c5ccc(CCC)cc5)c(O)c4C(=O)C3C=C2)cc1]
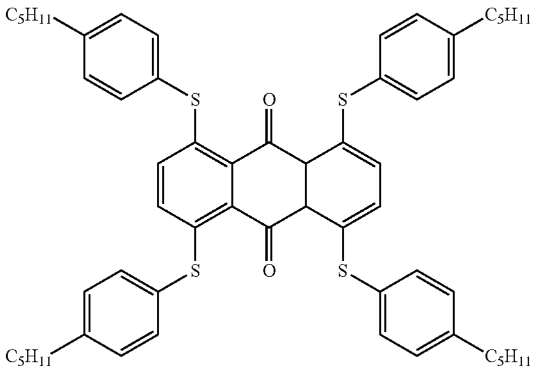
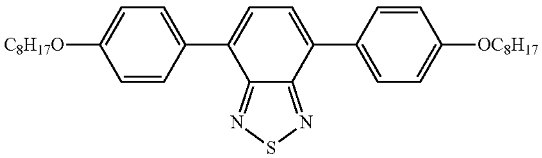
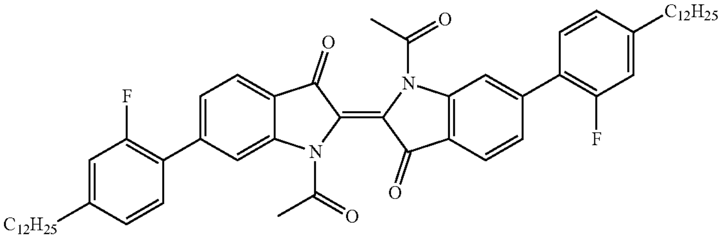
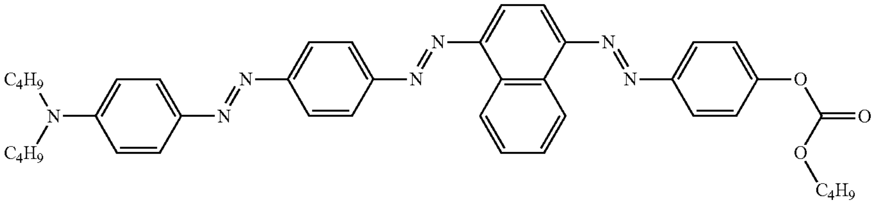

TABLE D-continued

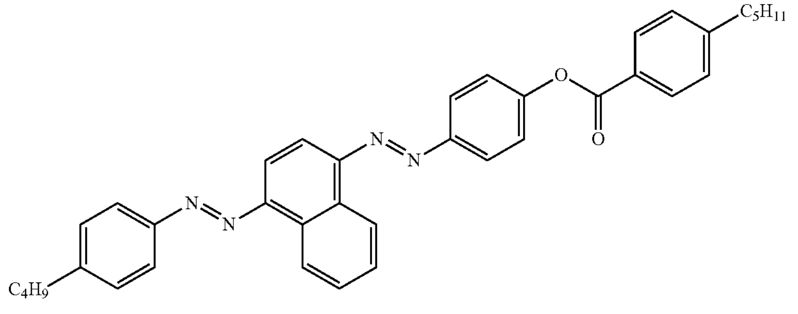

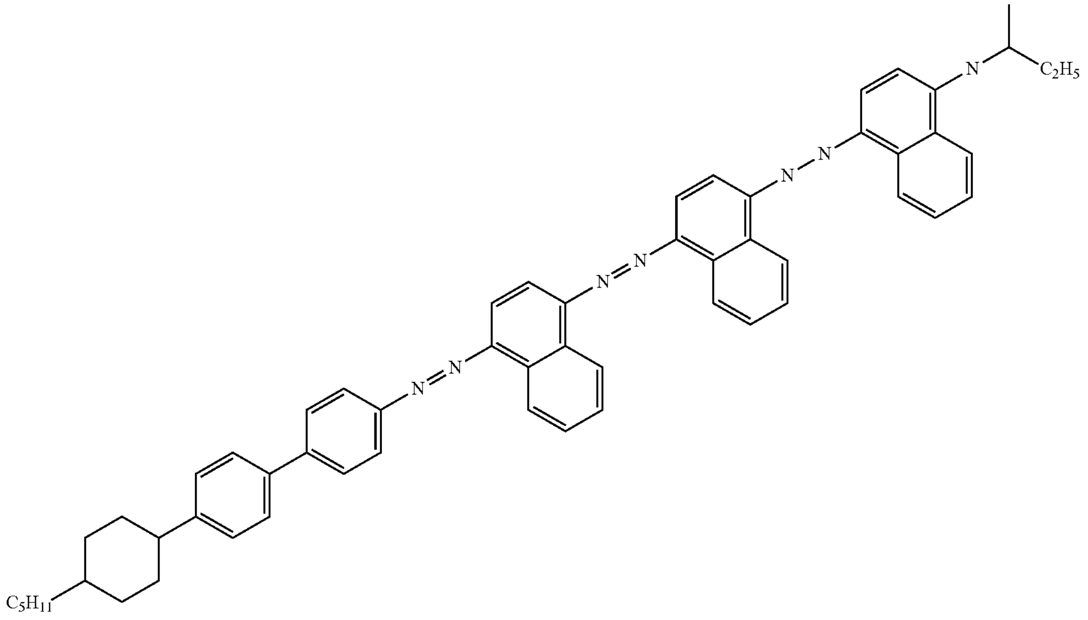

The following Examples are merely illustrative of the present invention and they should not be considered as limiting the scope of the invention in any way. The Examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

Working Examples

Unless indicated otherwise, parts or percent data denote parts by weight or percent by weight based on the mixture as a whole.

The symbols and abbreviations have the following meanings:

$V_o$ threshold voltage, capacitive [V] at 20° C.

Δn the optical anisotropy measured at 20° C. and 589 nm

Δε the dielectric anisotropy at 20° C. and 1 kHz cl.p. clearing point [° C.]

$K_1$ elastic constant, "splay" deformation at 20° C. [pN]

$K_3$ elastic constant, "bend" deformation at 20° C. [pN]

$\gamma_1$ rotational viscosity measured at 20° C. [mPa·s], determined by the rotation method in a magnetic field LTS low-temperature stability (nematic phase), determined in test cells.

The term "threshold voltage" for the present invention relates to the capacitive threshold ($V_0$), unless explicitly indicated otherwise. In the Examples, as is generally usual, the optical threshold can also be indicated, for example for 10% relative contrast ($V_{10}$).

Mixture Examples

The liquid-crystalline media M1 to M10 are prepared as follows:

Mixture M1

| | | | |
|---|---|---|---|
| CCOC-3-3 | 3.0% | Clearing point [° C.]: | 120.1 |
| CCOC-4-3 | 3.0% | Δn [589 nm, 20° C.]: | 0.089 |
| CCP-3-1 | 8.0% | Δε [1 kHz, 20° C.]: | −2.4 |
| CCP-3-3 | 5.0% | | |
| CCY-2-1 | 8.0% | | |
| CCY-3-1 | 8.0% | | |
| CCY-3-O2 | 5.0% | | |
| CCY-3-O3 | 5.5% | | |
| CCY-4-O2 | 5.5% | | |
| CCY-5-O2 | 5.0% | | |
| CH-33 | 4.0% | | |
| CH-35 | 4.0% | | |
| CH-43 | 4.0% | | |
| CH-45 | 4.0% | | |

-continued

| | |
|---|---|
| CY-3-O4 | 7.0% |
| PCH-3O2 | 21.0% |

Mixture M2

| | | | |
|---|---|---|---|
| CCOC-3-3 | 3.0% | Clearing point [° C.]: | 121.6 |
| CCOC-4-3 | 3.0% | Δn [589 nm, 20° C.]: | 0.089 |
| CCP-3-1 | 8.0% | Δε [1 kHz, 20° C.]: | −2.8 |
| CCP-3-3 | 5.0% | ε⊥ [1 kHz, 20° C.]: | 6.0 |
| CCY-2-1 | 8.0% | | |
| CCY-3-1 | 8.0% | | |
| CCY-3-O2 | 5.5% | | |
| CCY-3-O3 | 5.5% | | |
| CCY-4-O2 | 5.5% | | |
| CCY-5-O2 | 5.5% | | |
| CH-33 | 4.0% | | |
| CH-35 | 4.0% | | |
| CH-43 | 4.0% | | |
| CH-45 | 4.0% | | |
| CY-3-O2 | 11.0% | | |
| PCH-3O2 | 16.0% | | |

Mixture M3

| | | | |
|---|---|---|---|
| CY-3-O2 | 12.5% | Clearing point [° C.]: | 123.1 |
| CY-5-O2 | 12.0% | Δn [589 nm, 20° C.]: | 0.087 |
| CCY-3-O2 | 12.0% | Δε [1 kHz, 20° C.]: | −4.2 |
| CCY-4-O2 | 10.0% | | |
| CCY-5-O2 | 6.5% | | |
| CCY-3-O1 | 6.5% | | |
| CCH-3O1 | 8.0% | | |
| CCH-3O3 | 5.5% | | |
| CCP-3-1 | 9.0% | | |
| CCPC-33 | 3.0% | | |
| CCPC-34 | 3.0% | | |
| CCPC-35 | 2.0% | | |
| CH-33 | 3.0% | | |
| CH-35 | 2.0% | | |
| CH-43 | 3.0% | | |
| CH-45 | 2.0% | | |

Mixture M4

| | | | |
|---|---|---|---|
| CC-3-V | 13.5% | Clearing point [° C.]: | 121 .9 |
| CCH-23 | 4.0% | Δn [589 nm, 20° C.]: | 0.071 |
| CCH-3O1 | 4.0% | Δε [1 kHz, 20° C.]: | −2.2 |
| CCH-3O3 | 4.0% | ε⊥ [1 kHz, 20° C.]: | 5.2 |
| CCH-34 | 4.0% | | |
| CCH-5O1 | 4.0% | | |
| CCOC-3-3 | 3.0% | | |
| CCOC-4-3 | 3.0% | | |
| CCPC-33 | 4.0% | | |
| CCPC-34 | 4.0% | | |
| CCPC-35 | 4.0% | | |
| CCY-3-O2 | 5.0% | | |
| CCY-3-O3 | 5.0% | | |
| CCY-4-O2 | 5.0% | | |
| CCY-5-O2 | 5.0% | | |
| CH-33 | 4.0% | | |
| CH-35 | 4.0% | | |
| CH-43 | 4.0% | | |
| CH-45 | 4.0% | | |
| CY-3-O2 | 12.5% | | |

Mixture M5

The following mixture is prepared, wherein the compound II-a-1 is specified and shown in the description above.

| | |
|---|---|
| CC-3-V | 13.5% |
| CCH-23 | 4.0% |
| CCH-3O1 | 4.0% |
| CCH-3O3 | 4.0% |
| CCH-34 | 4.0% |
| CCH-5O1 | 4.0% |
| CCOC-3-3 | 3.0% |
| CCOC-4-3 | 3.0% |
| CCPC-33 | 4.0% |
| CCPC-34 | 4.0% |
| CCPC-35 | 4.0% |
| CCY-3-O2 | 5.0% |
| compound II-a-1 | 5.0% |
| CCY-4-O2 | 5.0% |
| CCY-5-O2 | 5.0% |
| CH-33 | 4.0% |
| CH-35 | 4.0% |
| CH-43 | 4.0% |
| CH-45 | 4.0% |
| CY-3-O2 | 12.5% |

Mixture M6

| | | | |
|---|---|---|---|
| CC-3-V | 12.0 | Clearing point [° C.]: | 118.5 |
| CCH-23 | 4.0 | Δn [589 nm, 20° C.]: | 0.072 |
| CCH-3O1 | 4.0% | Δε [1 kHz, 20° C.]: | −1.9 |
| CCH-3O3 | 4.0% | | |
| CCH-34 | 3.5% | | |
| CCH-5O1 | 3.0% | | |
| CCOC-3-3 | 3.0% | | |
| CCOC-4-3 | 3.0% | | |
| CCPC-33 | 4.0% | | |
| CCPC-34 | 4.0% | | |
| CCPC-35 | 4.0% | | |
| CCY-3-1 | 2.5% | | |
| CCY-3-O2 | 5.0% | | |
| CCY-3-O3 | 5.0% | | |
| CCY-4-O2 | 5.0% | | |
| CCY-5-O2 | 5.0% | | |
| CH-33 | 4.0% | | |
| CH-35 | 4.0% | | |
| CH-43 | 4.0% | | |
| CH-45 | 4.0% | | |
| PCH-3O2 | 8.0% | | |
| Y-4O-O4 | 5.0% | | |

Mixture M7

| | | | |
|---|---|---|---|
| CC-3-V | 9.5% | Clearing point [° C.]: | 116.6 |
| CCH-23 | 4.0% | Δn [589 nm, 20° C.]: | 0.071 |
| CCH-3O1 | 4.0% | Δε [1 kHz, 20° C.]: | −1.8 |
| CCH-3O3 | 4.0% | | |
| CCH-34 | 4.0% | | |
| CCH-5O1 | 4.0% | | |
| CCOC-3-3 | 3.0% | | |
| CCOC-4-3 | 3.0% | | |
| CCPC-33 | 4.0% | | |
| CCPC-34 | 4.0% | | |
| CCPC-35 | 4.0% | | |
| CCY-3-1 | 2.0% | | |
| CCY-3-O2 | 4.5% | | |
| CCY-3-O3 | 5.0% | | |
| CCY-4-O2 | 5.0% | | |
| CCY-5-O2 | 5.0% | | |
| CH-33 | 4.0% | | |
| CH-35 | 4.0% | | |
| CH-43 | 4.0% | | |
| CH-45 | 4.0% | | |
| PCH-3O2 | 10.0% | | |
| Y-4O-O4 | 5.0% | | |

Mixture M8

| | | | |
|---|---|---|---|
| CC-3-V | 11.5% | Clearing point [° C.]: | 119.8 |
| CCH-23 | 4.0% | Δn [589 nm, 20° C.]: | 0.071 |
| CCH-3O1 | 4.0% | Δε [1 kHz, 20° C.]: | −2.0 |
| CCH-3O3 | 4.0% | | |
| CCH-34 | 4.0% | | |
| CCH-5O1 | 4.0% | | |
| CCOC-3-3 | 3.0% | | |
| CCOC-4-3 | 3.0% | | |
| CCPC-33 | 4.0% | | |
| CCPC-34 | 4.0% | | |
| CCPC-35 | 4.0% | | |
| CCY-3-O2 | 5.0% | | |
| CCY-3-O3 | 5.0% | | |
| CCY-4-O2 | 5.0% | | |
| CCY-5-O2 | 5.0% | | |
| CH-33 | 4.0% | | |
| CH-35 | 4.0% | | |
| CH-43 | 4.0% | | |
| CH-45 | 4.0% | | |
| CY-3-O2 | 6.0% | | |
| CCY-3-1 | 1.0% | | |
| PCH-3O2 | 5.0% | | |
| Y-4O-O4 | 2.5% | | |

Mixture M9

| | | | |
|---|---|---|---|
| CC-3-V | 11.5% | Clearing point [° C.]: | 120.2 |
| CCH-23 | 5.0% | Δn [589 nm, 20° C.]: | 0.069 |
| CCH-3O1 | 5.0% | Δε [1 kHz, 20° C.]: | −2.0 |
| CCH-3O3 | 5.0% | | |
| CCH-34 | 5.0% | | |
| CCH-5O1 | 5.0% | | |
| CCOC-3-3 | 3.0% | | |
| CCOC-4-3 | 3.0% | | |
| CCPC-33 | 4.0% | | |
| CCPC-34 | 4.0% | | |
| CCPC-35 | 3.0% | | |
| CCY-3-O2 | 5.0% | | |
| CCY-3-O3 | 5.0% | | |
| CCY-4-O2 | 5.0% | | |
| CCY-5-O2 | 5.0% | | |
| CH-33 | 4.0% | | |
| CH-35 | 4.0% | | |
| CH-43 | 4.0% | | |
| CH-45 | 4.0% | | |
| CY-3-O2 | 10.5% | | |

Mixture M10

| | | | |
|---|---|---|---|
| CCH-23 | 4.0% | Clearing point [° C.]: | 128.9 |
| CCH-3O1 | 4.0% | Δn [589 nm, 20° C.]: | 0.087 |
| CCH-3O3 | 3.0% | Δε [1 kHz, 20° C.]: | −3.2 |
| CCH-34 | 4.0% | ε⊥ [1 kHz, 20° C.]: | 6.4 |
| CCH-35 | 4.0% | | |
| CCH-5O1 | 4.0% | | |
| CCP-3-1 | 5.0% | | |
| CCP-3-3 | 5.0% | | |
| CCPC-33 | 4.0% | | |
| CCPC-34 | 4.0% | | |
| CCPC-35 | 4.0% | | |
| CCY-2-1 | 5.0% | | |
| CCY-3-1 | 5.0% | | |
| CCY-3-O1 | 5.0% | | |
| CCY-3-O2 | 5.0% | | |
| CCY-3-O3 | 5.0% | | |
| CCY-4-O2 | 5.0% | | |
| CCY-5-O2 | 5.0% | | |
| CLY-3-O2 | 6.0% | | |
| CY-3-O2 | 10.0% | | |
| CY-5-O2 | 4.0% | | |

Mixtures M11 and M12

Mixtures M11 and M12 are respectively prepared by mixing 99.90% of mixture M1 or respectively mixture M4 each with 0.10% of the compound of formula

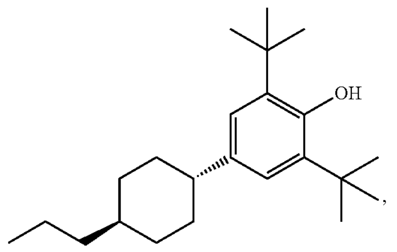 [SMILES: CCC[C@H]1CC[C@H](c2cc(C(C)(C)C)c(O)c(C(C)(C)C)c2)CC1]

designated as ST-A in the following.

Mixture M13

Mixture M13 is prepared by mixing 99.80% of mixture M9 with 0.10% of the compound ST-A shown for mixtures M11 and M12 above and 0.10% of the compound of formula

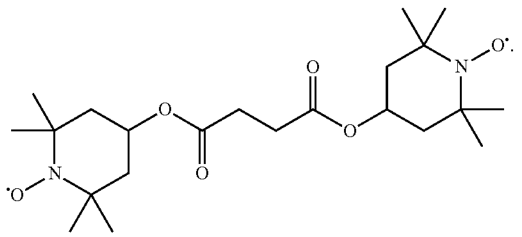

Mixture M14

Mixture M14 is prepared by mixing 99.80% of mixture M3 with 0.20% of chiral dopant R-5011 available from Merck KGaA, Darmstadt, Germany and shown in Table B above.

Mixture M15

Mixture M15 is prepared by mixing 99.504% of mixture M2 with 0.030% of the compound ST-A and 0.466% of chiral dopant S-811 available from Merck KGaA, Darmstadt, Germany and shown in Table B above.

Mixture M16

Mixture M16 is prepared by mixing 99.035% of mixture M2 with 0.030% of the compound ST-A and 0.935% of chiral dopant S-811.

Mixture M17

Mixture M17 is prepared by mixing 99.915% of mixture M4 with 0.030% of the compound ST-A and 0.055% of chiral dopant R-5011.

Mixture M18

Mixture M18 is prepared by mixing 99.915% of mixture M5 with 0.030% of the compound ST-A and 0.055% of chiral dopant R-5011.

Mixture M19

Mixture M19 is prepared by mixing 98.86% of mixture M10 with 0.03% of the compound ST-A and 1.11% of chiral dopant S-811.

Mixture M20

Mixture M20 is prepared by mixing 99.658% of mixture M2 with 0.030% of the compound ST-A and 0.312% of chiral dopant S-811.

Mixture M21

Mixture M21 is prepared by mixing 99.532% of mixture M4 with 0.030% of the compound ST-A and 0.438% of chiral dopant S-811.

Use Examples

Use Example 1

An electro-optical cell comprising mixture M1 sandwiched between two transparent ITO-coated PET substrates with homeotropic alignment is laminated to a glass substrate using a PVB interlayer at a temperature of 117.5° C. The laminated product has suitable electro-optical properties.

Use Example 2

An electro-optical cell comprising mixture M15 sandwiched between two transparent ITO-coated glass substrates with homeotropic alignment is laminated to a glass substrate using an EVA interlayer at a temperature of 117.5° C. The laminated product has suitable electro-optical properties.

The invention claimed is:

1. A process for the preparation of a window element, comprising providing a switchable optical cell which comprises a switchable layer interposed between a first transparent substrate and a second transparent substrate, wherein the switchable optical cell is electrically switchable, and wherein the switchable optical cell has a layer structure comprising, in sequence, the first transparent substrate, a first electrode layer, a first alignment layer, the switchable layer, a second alignment layer, a second transparent electrode layer, and the second transparent substrate, wherein the switchable layer comprises a liquid-crystalline medium having a negative dielectric anisotropy, a clearing point of greater than 140° C. to 170° C., and an optical anisotropy Δn in the range of from 0.075 to 0.1, and the switchable layer is a homeotropically aligned liquid crystal layer comprising the liquid-crystalline medium, wherein in the presence of an electric field the switchable layer has a twisted configuration or a supertwisted configuration, wherein the liquid-crystalline medium comprises three or more dichroic dyes, and wherein the switchable layer has a thickness in the range from 4 μm to 10 μm, and laminating the switchable optical cell to a third substrate via a thermoplastic interlayer arranged between the first or second transparent substrate of the switchable optical cell and the third substrate, wherein, during the laminating, heating to a temperature of 110° C. or more is carried out; and wherein the first transparent substrate and the second transparent substrate are made of plastic and are optically isotropic, and the third substrate is curved, made of glass, and is optically isotropic and transparent.

2. The process according to claim 1, wherein the thermoplastic interlayer is an interlayer of an ionoplast, ethylene vinyl acetate, polyvinyl butyral, or thermoplastic polyurethane.

3. A window element, comprising a switchable optical cell having a layer structure comprising in this order:

a first transparent substrate, a first electrode layer, a first alignment layer, a switchable layer, a second alignment layer, a second electrode layer, and a second transparent substrate, wherein the switchable layer comprises a liquid-crystalline medium having a negative dielectric anisotropy, a clearing point of greater than 140° C. to 170° C., and an optical anisotropy Δn in the range of from 0.075 to 0.1, wherein the liquid-crystalline medium comprises three or more dichroic dyes, and the switchable layer is a homeotropically aligned liquid crystal layer comprising the liquid-crystalline medium, and wherein the switchable layer has a thickness in the range from 4 μm to 10 μm, wherein the switchable optical cell is laminated to a third substrate via a thermoplastic interlayer arranged between the first or second transparent substrate of the switchable optical cell and the third substrate, and wherein the switchable optical cell is electrically switchable, and wherein the first transparent substrate and the second transparent substrate are made of plastic and are optically isotropic, and the third substrate is curved, made of glass, and is optically isotropic and transparent, and wherein in the presence of an electric field the switchable layer has a twisted configuration or a supertwisted configuration.

4. The window element according to claim 3, wherein the switchable optical cell further comprises one or more polarizer layers and optionally one or more optical retarder layers.

5. The window element according to claim 3, wherein the liquid-crystalline medium comprises:

one or more compounds of formula IIA

IIA

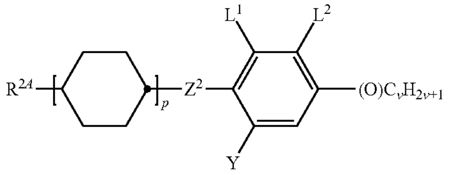

wherein $R^{2A}$ denotes H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

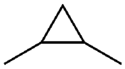, 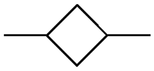, 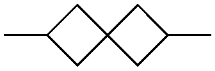, 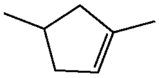, 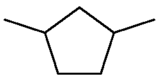,

—C≡C—, —$CF_2O$—, —$OCF_2$—, —OC—O— or —O—CO— in such a way that O atoms are not linked directly to one another, $L^1$ and $L^2$ each, independently of one another, denote F, Cl, $CF_3$ or $CHF_2$, Y denotes H, F, Cl, $CF_3$, $CHF_2$ or $CH_3$, $Z^2$ denotes a single bond, $—CH_2CH_2—$, $—CH—CH—$, $—CF_2O—$, $—OCF_2—$, $—CH_2O—$, $—OCH_2—$, $—COO—$, $—OCO—$, $—C_2F_4—$, $—CF{=}CF—$ or $—CH{=}CHCH_2O—$, p denotes 0, 1 or 2, and V denotes 1 to 7.

6. The window element according to claim 5, wherein said one or more compounds of formula IIA are selected from the compounds of formulae IIA-1 and IIA-2

IIA-1

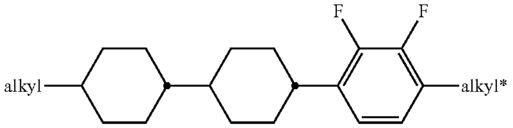

IIA-2

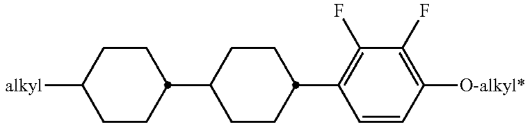

wherein alkyl and alkyl* each, independently of one another, denote a straight-chain alkyl radical having 1 to 7 C atoms.

7. The window element according to claim 5, wherein the liquid-crystalline further comprises one or more compounds of formula V

V

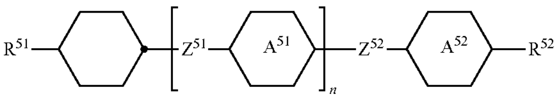

in which $R^{51}$ and $R^{52}$ each, independently of one another, denotes H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

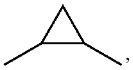, 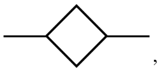, 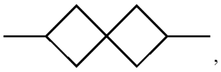, 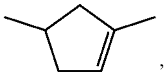, 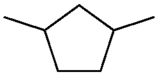,

—C≡C—, $—CF_2O—$, $—OCF_2—$, —OC—O— or —O—CO— in such a way that O atoms are not linked directly to one another,

 and 

identically or differently, denote

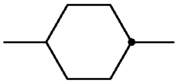, 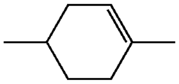 or

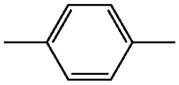, $Z^{51}$, $Z^{52}$ each, independently of one another, denote $—CH_2—CH_2—$, $—CH_2—O—$, $—CH{=}CH—$, —C≡C—, —COO— or a single bond, and n is 1 or 2.

8. The window element according to claim 5, wherein the liquid-crystalline medium further comprises one or more compounds of formula V-1

V-1

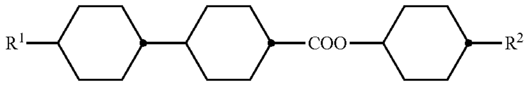

wherein $R^1$ and $R^2$ each, independently of one another, have one of the meanings indicated for $R^{2A}$ in claim 5.

9. The window element according to claim 5, wherein the liquid-crystalline medium further comprises a chiral dopant.

10. The window element according to claim 5, wherein the liquid-crystalline medium does not contain compounds of the formulae

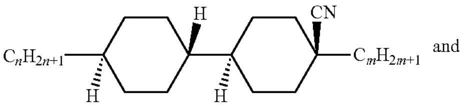 and

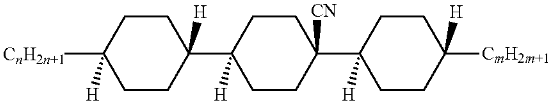

in which n and m each, independently of one another, denote 1 to 7.

11. The window element according to claim 3, wherein the liquid crystalline medium has an optical anisotropy Δn of from 0.075 to 0.095.

12. The window element according to claim 3, wherein the liquid crystalline medium has an optical anisotropy Δn in the range of from 0.075 to 0.090.

13. The window element according to claim 3, wherein the liquid-crystalline medium contains a compound of formula CCOC-n-m

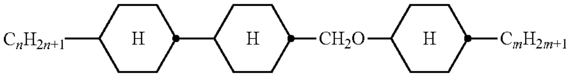

CCOC-n-m wherein n and m are each independently 1, 2, 3, 4, 5, 6, 7, 8 or 9, and/or a compound of formula CCOC-n-m
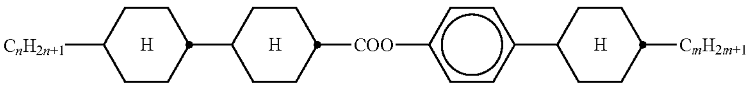
CCPC-nm
wherein n and m are each independently 1, 2, 3, 4, 5, 6, 7, 8 or 9.
14. A building window or a vehicle window comprising the window element according to claim 3.
* * * * *